(12) United States Patent
Jin

(10) Patent No.: US 11,421,591 B2
(45) Date of Patent: Aug. 23, 2022

(54) ROTOR SYSTEM AND CONTROL METHOD THEREOF, AS WELL AS GAS TURBINE GENERATOR SET AND CONTROL METHOD THEREOF

(71) Applicant: TECHNOLOGIES' XANADU OF RESONATORY-SOLAR-SYSTEMED CO., LTD., Beijing (CN)

(72) Inventor: Pu Jin, Beijing (CN)

(73) Assignee: TECHNOLOGIES' XANADU OF RESONATORY-SOLAR-SYSTEMED CO., LTD., Beijing (CN)

( * ) Notice: Subject to any disclaimer, the term of this patent is extended or adjusted under 35 U.S.C. 154(b) by 133 days.

(21) Appl. No.: 16/961,550

(22) PCT Filed: Aug. 31, 2018

(86) PCT No.: PCT/CN2018/103401
§ 371 (c)(1),
(2) Date: Jul. 10, 2020

(87) PCT Pub. No.: WO2019/137022
PCT Pub. Date: Jul. 18, 2019

(65) Prior Publication Data
US 2021/0062715 A1 Mar. 4, 2021

(30) Foreign Application Priority Data

Jan. 12, 2018 (CN) .......................... 201810030888.1

(51) Int. Cl.
*F02C 6/00* (2006.01)
*F01D 5/02* (2006.01)
(Continued)

(52) U.S. Cl.
CPC .................. *F02C 6/00* (2013.01); *F01D 3/00* (2013.01); *F01D 5/02* (2013.01); *F01D 25/16* (2013.01);
(Continued)

(58) Field of Classification Search
CPC ...... F02C 6/00; F02C 7/06; F02C 7/24; F02C 9/00; F01D 5/02; F01D 3/00; F01D 25/16;
(Continued)

(56) References Cited

U.S. PATENT DOCUMENTS

| 5,014,518 A | * | 5/1991 | Thomson ................ F25B 11/04 62/88 |
| 5,667,308 A | * | 9/1997 | Nose ...................... F01D 25/164 384/100 |

(Continued)

FOREIGN PATENT DOCUMENTS

| CN | 105317465 A | 2/2016 |
| CN | 205135718 U | 4/2016 |

(Continued)

OTHER PUBLICATIONS

International Search Report of PCT/CN2018/103401.
Written Opinion of PCT/CN2018/103401.

*Primary Examiner* — Jesse S Bogue
*Assistant Examiner* — Loren C Edwards
(74) *Attorney, Agent, or Firm* — Dragon Sun Law Firm, PC; Jinggao Li, Esq.; Nathaniel Perkins

(57) ABSTRACT

Provided is a rotor system, including a rotating shaft, a shaft body of the rotating shaft being of an integrated structure and the rotating shaft being horizontally arranged; and a motor, an air compressor, a turbine, a thrust bearing and at least two radial bearings which are arranged on the rotating shaft. The thrust bearing and the at least two radial bearings (Continued)

are all non-contact bearings. The thrust bearing is arranged at a preset position on one side of the turbine close to the air compressor. The preset position is such a position that the center of gravity of the rotor system can be located between two radial bearings that are farthest apart among the at least two radial bearings.

20 Claims, 23 Drawing Sheets

(51) Int. Cl.

| | | |
|---|---|---|
| *F02C 7/06* | (2006.01) | |
| *F02C 7/24* | (2006.01) | |
| *F16C 32/04* | (2006.01) | |
| *F01D 3/00* | (2006.01) | |
| *F01D 25/16* | (2006.01) | |
| *F02C 9/00* | (2006.01) | |

(52) U.S. Cl.
CPC .................. *F02C 7/06* (2013.01); *F02C 7/24* (2013.01); *F02C 9/00* (2013.01); *F16C 32/0406* (2013.01); *F05D 2220/32* (2013.01); *F05D 2240/24* (2013.01); *F05D 2240/51* (2013.01); *F05D 2240/52* (2013.01); *F05D 2240/53* (2013.01); *F05D 2240/54* (2013.01); *F05D 2240/60* (2013.01)

(58) Field of Classification Search
CPC ............. F05D 2220/32; F05D 2240/24; F05D 2240/51; F05D 2240/52; F05D 2240/53; F05D 2240/54; F05D 2240/60; F16C 17/024; F16C 32/0406; F16C 32/0614; H02K 7/09
See application file for complete search history.

(56) References Cited

U.S. PATENT DOCUMENTS

| | | | |
|---|---|---|---|
| 2005/0089392 A1* | 4/2005 | Lubell | ..................... F01D 25/16 415/104 |
| 2007/0269151 A1* | 11/2007 | Nardi | ...................... F16C 33/12 384/279 |
| 2017/0114661 A1* | 4/2017 | Schwarz | ............... F01D 21/006 |

FOREIGN PATENT DOCUMENTS

| | | |
|---|---|---|
| CN | 105705746 A | 6/2016 |
| CN | 206352515 U | 7/2017 |

* cited by examiner

ROTOR SYSTEM AND CONTROL METHOD THEREOF, AS WELL AS GAS TURBINE GENERATOR SET AND CONTROL METHOD THEREOF

CROSS REFERENCE TO RELATED APPLICATION

This application is a national stage application of PCT Application No. PCT/CN2018/103401. This application claims priority from PCT Application No. PCT/CN2018/103401 filed Aug. 31, 2018 and Chinese Patent Application No. 201810030888.1 filed in China on Jan. 12, 2018, the contents of which are incorporated herein in the entirety by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference

TECHNCIAL FIELD

The present disclosure relates to the field of the rotor technology, and more particularly, to a rotor system and a control method thereof, as well as a gas turbine generator set and a control method thereof.

BACKGROUND

A gas turbine mainly includes three major components: an air compressor, a combustion chamber and a turbine. After entering the air compressor, air is compressed into high-temperature and high-pressure air, and then supplied to the combustion chamber to be mixed with a fuel and combusted. The resulting high-temperature and high-pressure gas expands and works in the turbine. When a rotor rotates at a high speed, the rotor will be subjected to forces in a radial direction and in an axial direction. In order to limit the radial and axial movements of a rotating shaft, radial bearings and thrust bearings need to be mounted in the rotor system. The traditional radial bearings and thrust bearings are all ordinary contact bearings. As the rotor speed increases, especially when the rotor speed exceeds 40,000 rpm, the ordinary contact bearings cannot meet the requirements on a working speed in the presence of relatively large mechanical wear.

With regard to a gas turbine generator set, a gas turbine rotor rotates a high speed to enable a generator rotor to rotate so as to generate electricity. In the prior art, a coupling is usually used to connect the gas turbine rotor to the generator rotor. The presence of the coupling restricts a mounting position of the thrust bearing, because the axial force suffered by the rotor will further increase as the rotor speed increases. If the thrust bearing is placed between the air compressor and the turbine, the center of gravity of the entire rotor system will be biased toward the turbine side, resulting in poor stability of the rotor system. If the thrust bearing is arranged on one side of the coupling facing the generator, the axial force of the rotor all acts on the coupling, and thus the coupling is likely to be damaged.

It can be seen that there is an urgent need to provide a new rotor system to solve the above problems in the existing gas turbine generator set.

Therefore, a heretofore unaddressed need exists in the art to address the aforementioned deficiencies and inadequacies.

SUMMARY

The present disclosure provides a rotor system and a control method thereof, as well as a gas turbine generator set and a control method thereof, to solve the above problems in the existing gas turbine generator set.

In one aspect, the present disclosure provides a rotor system, including: a rotating shaft, a shaft body of the rotating shaft being of an integrated structure and the rotating shaft being horizontally arranged; a motor, an air compressor and a turbine which are arranged on the rotating shaft in sequence; and at least two radial bearings and a thrust bearing which are arranged on the rotating shaft, wherein the thrust bearing is arranged at a preset position on one side of the turbine close to the air compressor, and the preset position is such a position that the center of gravity of the rotor system can be located between two radial bearings that are farthest apart among the at least two radial bearings.

Optionally, the at least two radial bearings include a first radial bearing and a second radial bearing, the first radial bearing being arranged on one side of the motor away from the air compressor, and the second radial bearing being arranged between the air compressor and the turbine, wherein the thrust bearing is arranged between the first radial bearing and the motor; or the thrust bearing is arranged on one side of the first radial bearing away from the motor; or the thrust bearing is arranged between the motor and the air compressor.

Optionally, the at least two radial bearings further include a third radial bearing, the third radial bearing being arranged between the motor and the air compressor.

Optionally, the at least two radial bearings further include a fourth radial bearing arranged on one side of the turbine away from the air compressor, wherein the thrust bearing is arranged between the first radial bearing and the motor; or the thrust bearing is arranged on one side of the first radial bearing away from the motor; or the thrust bearing is arranged between the motor and the air compressor; or the thrust bearing is arranged between the air compressor and the second radial bearing.

Optionally, the fourth radial bearing is a hydrodynamic-hydrostatic gas hybrid radial bearing.

Optionally, a heat insulation layer is arranged on one side of the turbine close to the second radial bearing.

Optionally, the motor is a dynamic-pressure bearing motor, and a portion of the rotating shaft corresponding to a bearing of the motor is provided with a first dynamic pressure generating groove.

Optionally, the motor is a starter-generator integrated motor.

Optionally, the rotor system further includes a locking device configured to lock the rotating shaft when the rotating shaft is in a static state.

Optionally, a portion of the rotating shaft where each bearing is mounted is coated with an anti-wear coating.

Optionally, the thrust bearing is a gas-magnetic hybrid thrust bearing; and at least one of the at least two radial bearings is a gas-magnetic hybrid radial bearing or a hydrodynamic-hydrostatic gas hybrid radial bearing.

Optionally, when the second radial bearing is the gas-magnetic hybrid radial bearing, a magnetic component of the second radial bearing is arranged in a region of the second radial bearing away from the turbine.

Optionally, the gas-magnetic hybrid thrust bearing is a foil-type gas-magnetic hybrid thrust bearing including: a first thrust disc fixedly connected to the rotating shaft; and a first stator and a second stator which are arranged on the rotating shaft in a penetrating manner, and are arranged on two opposite sides of the first thrust disc respectively. Each of the first stator and the second stator includes a first magnetic bearing and a first foil bearing; a plurality of first magnetic components is arranged on each first magnetic bearing in a circumferential direction; and each first foil bearing is provided with a second magnetic component capable of interacting with the plurality of first magnetic components and generating magnetic forces with the plurality of first magnetic components, wherein each first foil bearing is arranged between the corresponding first magnetic bearing and the first thrust disc and has a first gap with the first thrust disc, and each first foil bearing is movable in an axial direction of the rotating shaft under the magnetic forces between the first magnetic components and the second magnetic component.

Optionally, each first foil bearing includes a first foil bearing pedestal fixedly connected to the first magnetic bearing pedestal, and a first foil and a second foil which are arranged on the first foil bearing pedestal, wherein the first foil is mounted on the first foil bearing pedestal, and the second foil is stacked on one side of the first foil close to the first thrust disc.

Optionally, the second foil is a flat foil; the second magnetic component is arranged on the second foil, such that the second foil is movable in the axial direction of the rotating shaft under the magnetic forces between the first magnetic components and the second magnetic component; and the first foil is an elastically deformable foil that is elastically deformable as the second foil moves.

Optionally, the gas-magnetic hybrid thrust bearing is a slot-type gas-magnetic hybrid thrust bearing including: a second thrust disc fixedly connected to the rotating shaft and provided with a third magnetic component; and a third stator and a fourth stator which are arranged on the rotating shaft in a penetrating manner, wherein the third stator and the fourth stator are arranged on two opposite sides of the second thrust disc respectively; each of the third stator and the fourth stator includes a second magnetic bearing, wherein a plurality of fourth magnetic components capable of generating magnetic forces with the third magnetic component is arranged on the second magnetic bearing in a circumferential direction; the second magnetic bearing has a second gap with the second thrust disc, and the second thrust disc is movable in the axial direction of the rotating shaft under the magnetic forces between the third magnetic component and the plurality of fourth magnetic components; and second dynamic pressure generating grooves are formed in an end surface of the second thrust disc facing the third stator and the fourth stator, or end surfaces of the third stator and the fourth stator facing the second thrust disc.

Optionally, a first static-pressure intake throttle hole is formed in each of the third stator and the fourth stator, wherein one end of the first static-pressure intake throttle hole is communicated with the second gap, and the other end of the first static-pressure intake throttle hole is connected to an external gas source so as to convey the external gas source into the second gap.

Optionally, the gas-magnetic hybrid radial bearing is a foil-type gas-magnetic hybrid radial bearing including: a third magnetic bearing arranged on the rotating shaft in a sleeving manner and provided with a plurality of fifth magnetic components in a circumferential direction; and a second foil bearing arranged on the rotating shaft in a sleeving manner, located between the third magnetic bearing and the rotating shaft, and provided with a sixth magnetic component capable of generating magnetic forces with the plurality of fifth magnetic components, wherein the second foil bearing has a third gap with the rotating shaft; and the second foil bearing is movable in the radial direction of the rotating shaft under the magnetic forces between the plurality of fifth magnetic components and the sixth magnetic component.

Optionally, the gas-magnetic hybrid radial bearing is a foil-type gas-magnetic hybrid radial bearing including: a fourth magnetic bearing arranged on the rotating shaft in a sleeving manner and provided with a plurality of seventh magnetic components in a circumferential direction. A third dynamic pressure generating groove is formed in a sidewall of the fourth magnetic bearing facing the rotating shaft, or a circumferential surface of the rotating shaft facing the fourth magnetic bearing, wherein the fourth magnetic bearing has a fourth gap with the rotating shaft, and the rotating shaft is movable in the radial direction of the rotating shaft under the magnetic forces of the plurality of seventh magnetic components.

Optionally, a second static-pressure intake throttle hole is further formed in the fourth magnetic bearing, wherein one end of the second static-pressure intake throttle hole is communicated with the fourth gap, and the other end of the second static-pressure intake throttle hole is connected to an external gas source so as to convey the external gas source into the fourth gap.

Optionally, in the rotor system, the thrust bearing and the radial bearing adjacent to the thrust bearing are integrated to form an integrated bearing, the integrated bearing including: a third bearing shell which is a hollow rotating body and provided with a first receiving cavity and a second receiving cavity; a radial sub-bearing which is arranged in the first receiving cavity and disposed on the rotating shaft in a penetrating manner, and has a fifth radial gap with the rotating shaft; and a thrust sub-bearing which is arranged in the second receiving cavity and includes a third thrust disc, and a fifth stator and a sixth stator arranged on two sides of the thrust disc respectively, wherein the thrust disc is fixedly connected to the rotating shaft, and the fifth stator and the sixth stator are arranged on the rotating shaft respectively in a penetrating manner; and each of the fifth stator and the sixth stator has a sixth gap with the third thrust disc.

Optionally, the radial sub-bearing includes a fifth magnetic bearing which is arranged on the rotating shaft in a sleeving manner and has a fifth gap with the rotating shaft, wherein a plurality of eighth magnetic components is arranged on the fifth magnetic bearing in a circumferential direction; the rotating shaft is movable in the radial direction of the rotating shaft under magnetic forces of the plurality of eighth magnetic components; each of the fifth stator and the sixth stator includes a sixth magnetic bearing on which a plurality of ninth magnetic components is arranged in a circumferential direction; a tenth magnetic component is arranged on the third thrust disc; and the third thrust disc is movable in the axial direction of the rotating shaft under magnetic forces between the plurality of ninth magnetic components and the tenth magnetic component.

Optionally, a third static-pressure intake throttle hole is further formed in the third bearing shell, wherein one end of the third static-pressure intake throttle hole is connected to an external gas source, and the other end of the third static-pressure intake throttle hole is communicated with the fifth gap through the radial bearing, and/or communicated with the sixth gap through the fifth stator and the sixth stator so as to convey the external gas source to the fifth gap and/or the sixth gap.

In another aspect, the present disclosure provides a rotor system control method applied to the rotor system as described above, the method including the following steps: powering on a static-pressure bearing in the radial bearing and a static-pressure bearing in the thrust bearing to enable the rotating shaft to move to a preset radial position, such that the thrust disc of the thrust bearing moves to a preset axial position; after a rotating speed of the rotating shaft is accelerated to a working speed, powering off the static-pressure bearing in the radial bearing and the static-pressure bearing in the thrust bearing; in the case that the rotor system is stopped, powering on the static-pressure bearing in the radial bearing and the static-pressure bearing in the thrust bearing; and after the rotating speed of the rotating shaft is reduced to zero, powering off the static-pressure bearing in the radial bearing and the static-pressure bearing in the thrust bearing, wherein the step of powering on the static-pressure bearings includes: powering on a magnetic bearing in each bearing, and/or conveying a gas to a static-pressure intake throttle hole in the bearing; and the step of powering off the static-pressure bearings includes: powering off the magnetic bearing in each bearing, and/or stopping conveying the gas to the static-pressure intake throttle hole in the bearing.

In yet another aspect, the present disclosure provides another rotor system control method applied to the rotor system as described above, the method including the following steps: powering on a static-pressure bearing in the radial bearing and a static-pressure bearing in the thrust bearing to enable the rotating shaft to move to a preset radial position, such that the thrust disc of the thrust bearing moves to a preset axial position; after a rotating speed of the rotating shaft is accelerated to a first preset value, powering off the static-pressure bearing in the radial bearing and the static-pressure bearing in the thrust bearing; when the rotor system is accelerated to a first-order critical speed or a second-order critical speed, powering on the static-pressure bearing in the radial bearing and the static-pressure bearing in the thrust bearing; after the rotor system smoothly passes the first-order critical speed or the second-order critical speed, powering off the static-pressure bearing in the radial bearing and the static-pressure bearing in the thrust bearing; when the rotor system is decelerated to the first-order critical speed or the second-order critical speed, powering on the static-pressure bearing in the radial bearing and the static-pressure bearing in the thrust bearing; after the rotor system smoothly passes the first-order critical speed or the second-order critical speed, powering off the static-pressure bearing in the radial bearing and the static-pressure bearing in the thrust bearing; when the rotating speed of the rotating shaft is decelerated to a second preset value, powering on the static-pressure bearing in the radial bearing and the static-pressure bearing in the thrust bearing; and after the rotating speed of the rotating shaft is reduced to zero, powering off the static-pressure bearing in the radial bearing and the static-pressure bearing in the thrust bearing, wherein the step of powering on the static-pressure bearings includes: powering on a magnetic bearing in each bearing, and/or conveying a gas to a static-pressure intake throttle hole in the bearing; and the step of powering off the static-pressure bearings includes: powering off the magnetic bearing in the bearing, and/or stopping conveying the gas to the static-pressure intake throttle hole in the bearing.

Optionally, the step of powering on the static-pressure bearing in the thrust bearing to enable the thrust disc of the thrust bearing to move to a preset axial position includes: powering on the first magnetic bearings in both the first stator and the second stator, and controlling the first thrust disc to move in the axial direction of the rotating shaft under magnetic forces of the plurality of first magnetic components, such that the first gap between the first thrust disc and the first foil bearing in the first stator is equal to the first gap between the first thrust disc and the first foil bearing in the second stator. The method further includes: when a load is applied to the first thrust disc, moving the first thrust disc in the axial direction of the rotating shaft under the applied load; and when the first gap between the first thrust disc and the first foil bearing in the first stator is not equal to the first gap between the first thrust disc and the first foil bearing in the second stator, powering on the first magnetic bearings in both the first stator and the second stator; and when the first gap between the first thrust disc and the first foil bearing in the first stator is equal to the first gap between the first thrust disc and the first foil bearing in the second stator, powering off the first magnetic bearings in both the first stator and the second stator.

Optionally, the step of powering on the static-pressure bearing in the thrust bearing to enable the thrust disc of the thrust bearing to move to the preset axial position includes: powering on the second magnetic bearings in both the third stator and the fourth stator, and controlling the second thrust disc to move in the axial direction of the rotating shaft under the magnetic forces between the third magnetic component and the plurality of fourth magnetic components, such that a difference between the second gap between the second thrust disc and the second magnetic bearing in the third stator and the second gap between the second thrust disc and the second magnetic bearing in the fourth stator is less than or equal to a predetermined value. The method further includes: when a load is applied to the second thrust disc, moving the second thrust disc in the axial direction of the rotating shaft under the applied load; and when the difference between the second gap between the second thrust disc and the second magnetic bearing in the third stator and the second gap between the second thrust disc and the second magnetic bearing in the fourth stator is greater than the predetermined value, powering on the second magnetic bearing in the third stator or the fourth stator; and when the difference between the second gap between the second thrust disc and the second magnetic bearing in the third stator and the second gap between the second thrust disc and the second magnetic bearing in the fourth stator is less than or equal to the predetermined value, powering off the second magnetic bearing in the third stator or the fourth stator.

Optionally, the step of powering on the static-pressure bearing in the radial bearing to enable the rotating shaft to move to the preset radial position includes: powering on the third magnetic bearing, and controlling the rotating shaft to move in the radial direction of the rotating shaft under the magnetic forces of the plurality of fifth magnetic components, such that the rotating shaft moves to the preset radial position. The method further includes: when the third gap between the rotating shaft and the second foil bearing changes, powering on the third magnetic bearing, such that the second foil bearing corresponding to the side where the gap becomes smaller moves toward a direction close to the rotating shaft under the magnetic forces between the plurality of fifth magnetic components and the sixth magnetic component; and after the rotating shaft is in a balanced radial position, powering off the third magnetic bearing.

Optionally, the step of powering on the static-pressure bearing in the radial bearing to enable the rotating shaft to move to the preset radial position includes: powering on the fourth magnetic bearing, and controlling the rotating shaft to move in the radial direction of the rotating shaft under the magnetic forces of the plurality of seventh magnetic components, such that the rotating shaft moves to the preset radial position. The method further includes: when the fourth gap between the rotating shaft and the fourth magnetic bearing changes, powering on the fourth magnetic bearing, such that the rotating shaft moves in a direction away from the side where the gap becomes smaller under the magnetic forces of the plurality of seventh magnetic components; and after the rotating shaft is in a balanced radial position, powering off the fourth magnetic bearing.

Optionally, the step of powering on the static-pressure bearing in the radial bearing to enable the rotating shaft to move to the preset radial position includes: powering on the fourth magnetic bearing; and/or starting an external gas source, and conveying a gas to the fourth gap via the second static-pressure intake throttle hole; and controlling the rotating shaft to move in the radial direction of the rotating shaft under the magnetic forces of the seventh magnetic components, and/or under the pushing action of the gas, such that the rotating shaft moves to the preset radial position.

In a further aspect, the present disclosure provides a gas turbine generator set, including an intake channel, a combustion chamber, and the rotor system, wherein the intake channel is communicated with an air inlet of the air compressor, an air outlet of the air compressor is communicated with an air inlet of the combustion chamber, and an air outlet of the combustion chamber is communicated with an air inlet of the turbine.

Optionally, the intake channel is formed by a housing of a motor and a housing of the gas turbine generator set.

In yet another aspect, the present disclosure provides a gas turbine generator set control method applied to the gas turbine generator set as described above, the method including the following steps: powering on a static-pressure bearing in the radial bearing and a static-pressure bearing in the thrust bearing to enable the rotating shaft to move to a preset radial position, such that the thrust disc of the thrust bearing moves to a preset axial position; starting the gas turbine generator set, wherein air is compressed by the air compressor and then enters the combustion chamber to be mixed with a fuel in the combustion chamber and combusted, high-temperature and high-pressure gas discharged from the combustion chamber impacts a turbine wheel of the turbine to rotate the turbine wheel, and the turbine wheel drives the motor through the rotating shaft to generate electricity; after a rotating speed of the rotating shaft is accelerated to a working speed, powering off the static-pressure bearing in the radial bearing and the static-pressure bearing in the thrust bearing; during the shutdown of the gas turbine generator set, powering on the static-pressure bearing in the radial bearing and the static-pressure bearing in the thrust bearing; after the rotating speed of the rotating shaft is reduced to zero, powering off the static-pressure bearing in the radial bearing and the static-pressure bearing in the thrust bearing, wherein the step of powering on the static-pressure bearings includes: powering on a magnetic bearing in each bearing, and/or conveying a gas to a static-pressure intake throttle hole in the bearing; and the step of powering off the static-pressure bearings includes: powering off the magnetic bearing in each bearing, and/or stopping conveying the gas to the static-pressure intake throttle hole in the bearing.

In the present disclosure, the shaft body of the rotating shaft in the rotor system is of the integral structure, which solves the problem of limitations on a mounting position of the thrust bearing caused by coupling connection. Further, by adjusting the mounting position of the thrust bearing, the center of gravity of the entire rotor system is located between the two radial bearings that are farthest apart. Thus, different from the traditional cantilever structure, the entire rotor system can maintain the structural stability during high-speed rotation, and meet the requirements of the gas turbine on a high speed.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

In order to describe the technical solutions in the embodiments of the present disclosure more clearly, the following briefly introduces the accompanying drawings required for describing the embodiments in the present disclosure. Apparently, the accompanying drawings in the following description show merely some embodiments of the present disclosure, and a person of ordinary skill in the art may also derive other drawings from these accompanying drawings without consuming creative efforts.

DETAILED DESCRIPTION

Figure 1:
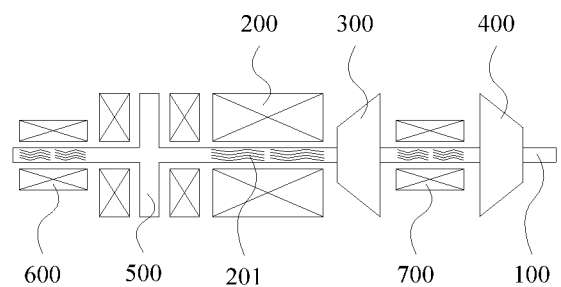
FIG. 1 is a schematic structural diagram of a rotor system as provided in Embodiment 1.

The technical solutions in the embodiments of the present disclosure will be described clearly and completely with reference to the drawings in the embodiments of the present disclosure. It is apparent that the described embodiments are only a part of embodiments of the present disclosure, rather than all of the embodiments. According to the embodiments in the present disclosure, all of the other embodiments obtained by a person of ordinary skill in the art without consuming any creative work fall within the protection scope of the present disclosure.

An embodiment of the present disclosure provides a rotor system. The rotor system includes a rotating shaft, a shaft body of the rotating shaft being of an integrated structure and the rotating shaft being horizontally arranged; a motor, an air compressor and a turbine which are arranged on the rotating shaft in sequence; and two radial bearings and a thrust bearing which are arranged on the rotating shaft, and are all non-contact bearings. The thrust bearing is arranged at a preset position on one side of the turbine close to the air compressor. The preset position is such a position that the center of gravity of the rotor system can be located between two radial bearings that are farthest apart among the at least two radial bearings.

In this embodiment of the present disclosure, the thrust bearing is configured to limit a movement of the rotating shaft in an axial direction, and the radial bearings are configured to limit a movement of the rotating shaft in a radial direction.

With the increase of a rotor speed, ordinary electromagnetic bearings and air bearings have been unable to meet the needs of high-speed rotors. Therefore, in the embodiments of the present disclosure, in order to meet the development needs for high-speed rotation of a rotor, the thrust bearing and the radial bearings may be non-contact bearings.

In this embodiment of the present disclosure, a shaft body of the rotating shaft is of an integrated structure. It can be understood that the shaft body of the rotating shaft is a whole shaft, or the shaft body of the rotating shaft is formed by rigidly connecting a plurality of shaft segments. Because the shaft body of the rotating shaft is of the integrated structure, the strengths of various positions of the shaft body on the rotating shaft are consistent, enabling the mounting position of the thrust bearing on the rotating shaft to be unlimited.

Further, in order to keep the entire rotor system structurally stable during high-speed rotation, the center of gravity of the entire rotor system should be located between two radial bearings that are farthest apart among the at least two radial bearings. In this way, the entire rotor system forms a spindle structure, which is different from the traditional cantilever structure. According to this embodiment of the present disclosure, the stability of the entire rotor system is improved. Since the mounting position of the thrust bearing on the rotating shaft is not limited, in this embodiment of the present disclosure, the mounting position of the thrust bearing can be flexibly adjusted according to parameters such as the number of the radial bearings among the at least two radial bearings, the mounting position of each radial bearing, and the mass of each component in the entire rotor system (including the mass of the thrust bearing itself), such that the center of gravity of the entire rotor system is located between the two radial bearings that are furthest apart. Preferably, the center of gravity of the entire rotor system is located on the air compressor.

In this embodiment of the present disclosure, the rotating shaft is horizontally arranged. Therefore, it may be understood that the rotor system in this embodiment of the present disclosure is a horizontal rotor system, and may be applied to a horizontal unit that needs to use the horizontal rotor system, such as a horizontal gas turbine generator set which will be specifically described below.

In order to better understand the overall technical solution of the rotor system according to the embodiments of the present disclosure, the rotor system provided by the embodiments of the present disclosure will be specifically described in combination with the accompanying drawings.

Embodiment 1

Figure 2:
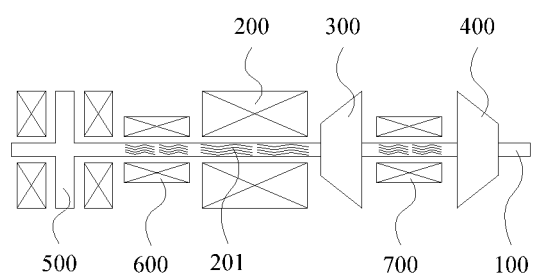
FIG. 2 is a schematic structural diagram of another rotor system as provided in Embodiment 1.
Figure 3:
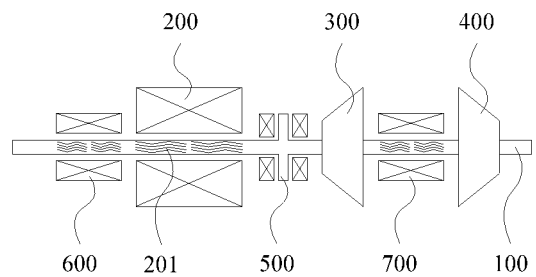
FIG. 3 is a schematic structural diagram of yet another rotor system as provided in Embodiment 1

As shown in FIGS. 1 to 3, a rotor system includes a rotating shaft 100, a shaft body of the rotating shaft being of an integrated structure and the rotating shaft being horizontally arranged; a motor 200, an air compressor 300 and a turbine 400 which are arranged on the rotating shaft 100 in sequence; and a thrust bearing 500, a first radial bearing 600 and a second radial bearing 700 which are arranged on the rotating shaft 100. The first radial bearing 600 is arranged on one side of the motor 200 away from the air compressor 300. The second radial bearing 700 is arranged between the air compressor 300 and the turbine 400.

The thrust bearing 500 is arranged between the first radial bearing 600 and the motor 200, as shown in FIG. 1; or the thrust bearing 500 is arranged on one side of the first radial bearing 600 away from the motor 200, as shown in FIG. 2; or the thrust bearing 500 is arranged between the motor 200 and the air compressor 300, as shown in FIG. 3.

When the mass of the turbine 400 is relatively large, for example, the turbine 400 is made of a metallic material, in order to make the center of gravity of the entire rotor system located between the first radial bearing 600 and the second radial bearing 700, an implementation manner shown in FIG. 1 or FIG. 2 may be adopted.

When the mass of the turbine 400 is relatively small, for example, the turbine 400 is made of a ceramic material or a ceramic fiber composite material, in order to enable the center of gravity of the entire rotor system to be located between the first radial bearing 600 and the second radial bearing 700, an implementation manner shown in FIG. 3 may be adopted.

It should be noted that, for the implementation manner shown in FIG. 3, since the thrust bearing 500 is arranged between the motor 200 and the air compressor 300, in order to prevent a thrust disc of the thrust bearing 500 from blocking an air inlet of the air compressor 300, the implementation manner shown in FIG. 3 is applicable to the thrust bearing 500 having the thrust disc of a relatively small diameter.

At present, non-contact bearings generally include electromagnetic bearings and air bearings. However, the electromagnetic bearings reveal the problems such as excessive energy consumption and heat generation after long-term operation. When a surface linear velocity of the air bearing approaches or exceeds the velocity of sound, the air bearing will generate shock waves, thereby resulting in instability of the bearing and even catastrophic consequences such as collision with the shaft.

Therefore, in consideration of development requirements of a gas turbine or a gas turbine generator set on a high speed, in order to improve the working performances of the thrust bearing and the radial bearings, in this embodiment of the present disclosure, the thrust bearing 500 may be a gas-magnetic hybrid thrust bearing, and the first radial bearing 600 may be a gas-magnetic hybrid radial bearing or a hydrodynamic-hydrostatic gas hybrid radial bearing.

In addition, since the second radial bearing 700 is close to the turbine 400, in consideration of the fact that a magnetic component in a magnetic bearing cannot withstand a high temperature transmitted from the turbine 400, the second radial bearing 700 may be the hydrodynamic-hydrostatic gas hybrid radial bearing.

As another implementation manner, the second radial bearing 700 may also be a gas-magnetic hybrid radial bearing. In this manner, a magnetic component of the second radial bearing 700 is arranged in a region of the second radial bearing 700 away from the turbine 400. That is, no magnetic component is arranged in a region of the second radial bearing 700 close to the turbine 400.

The magnetic component on the second radial bearing 700 can be protected by reducing the thermal energy radiated from the turbine 400 to the second radial bearing 700. Specifically, a heat insulation layer (not shown in drawings) is arranged on one side of the turbine 400 close to the second radial bearing 700. Here, the material of the heat insulation layer may be aerogel or other materials with a good heat insulation performance.

Figure 4:
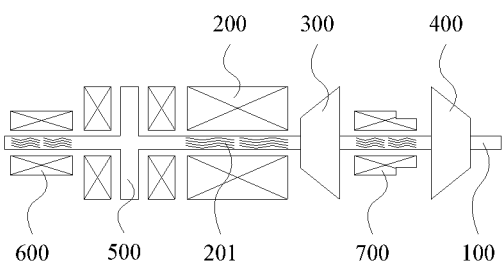
FIG. 4 is a schematic structural diagram in which a magnetic bearing is arranged on a second radial bearing corresponding to FIG. 1.
Figure 5:
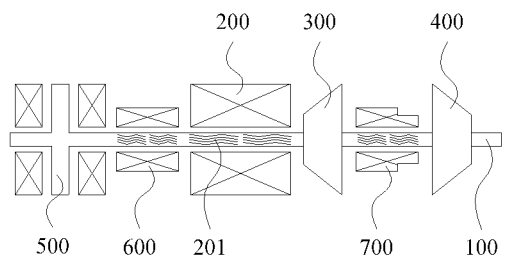
FIG. 5 is a schematic structural diagram in which a magnetic bearing is arranged on a second radial bearing corresponding to FIG. 2.
Figure 6:
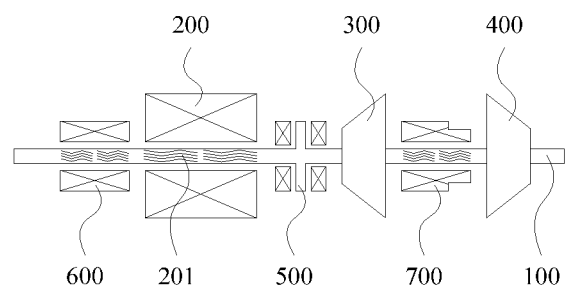
FIG. 6 is a schematic structural diagram in which a magnetic bearing is arranged on a second radial bearing corresponding to FIG. 3.

FIGS. 4 to 6 are schematic diagrams respectively showing that the magnetic component is arranged in the region on the second radial bearing 700 away from the turbine 400 in FIGS. 1 to 3.

In this embodiment of the present disclosure, the air compressor 300 may be a centrifugal air compressor 300. A turbine wheel of the turbine 400 may be a centrifugal turbine wheel. The motor 200 may be a dynamic-pressure bearing motor. First dynamic pressure generating grooves 201 may be formed in a portion of the rotating shaft 100 corresponding to the bearing of the motor 200.

Further, the motor 200 may also be a starter-generator integrated motor.

In this way, at the initial start-up time of the rotor system, the motor 200 may be powered on in a start-up mode to rotate the rotor system. After the rotating speed of the rotor system is increased to a preset rotating speed, a working mode of the motor 200 may be switched to a power generation mode.

Embodiment 2

As shown in FIGS. 7 to 10, a rotor system includes: a rotating shaft 100, a shaft body of the rotating shaft being of an integrated structure and the rotating shaft horizontally arranged; a motor 200, an air compressor 300 and a turbine 400 which are arranged on the rotating shaft 100 in sequence; and a thrust bearing 500, a first radial bearing 600, a second radial bearing 700 and a third radial bearing 800 which are arranged on the rotating shaft 100. The first radial bearing 600 is arranged on one side of the motor 200 away from the air compressor 300. The second radial bearing 700 is arranged between the air compressor 300 and the turbine 400. The third radial bearing 800 is arranged between the motor 200 and the air compressor 300.

Figure 7:
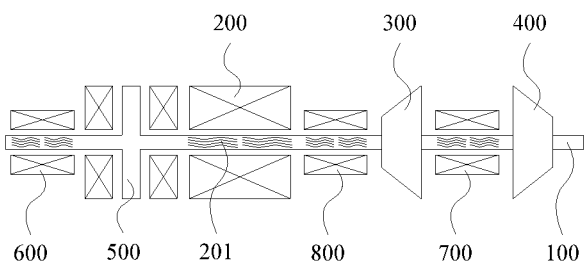
FIG. 7 is a schematic structural diagram of a rotor system as provided in Embodiment 2.
Figure 8:
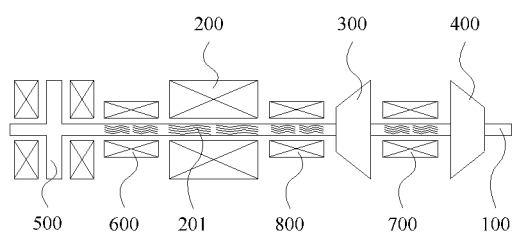
FIG. 8 is a schematic structural diagram of another rotor system as provided in Embodiment 2.
Figure 9:
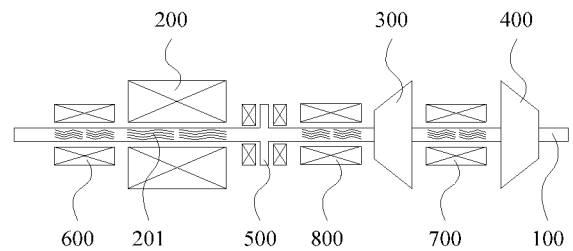
FIG. 9 is a schematic structural diagram of yet another rotor system as provided in Embodiment 2.
Figure 10:
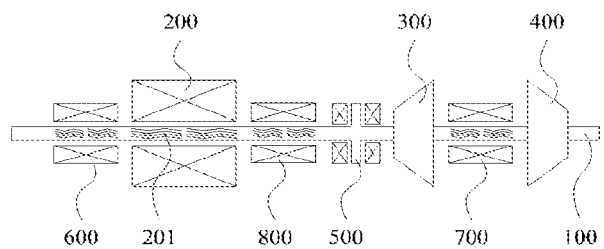
FIG. 10 is a schematic structural diagram of still another rotor system as provided in Embodiment 2.
Figure 11:
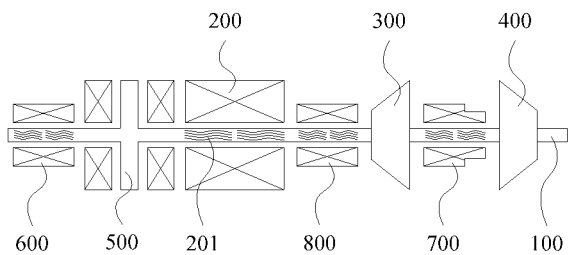
FIG. 11 is a schematic structural diagram in which a magnetic bearing is arranged on a second radial bearing corresponding to FIG. 7.
Figure 12:
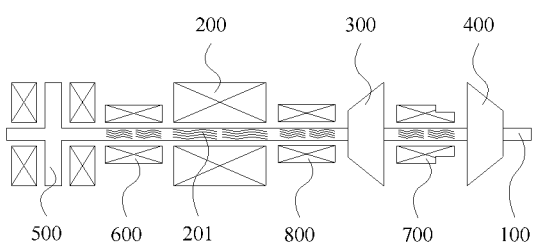
FIG. 12 is a schematic structural diagram in which a magnetic bearing is arranged on a second radial bearing corresponding to FIG. 8.
Figure 13:
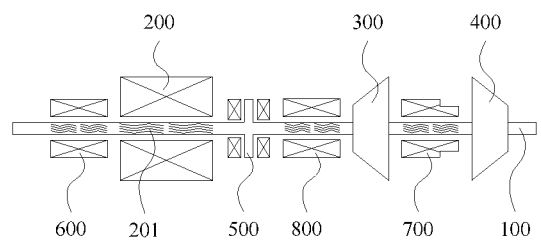
FIG. 13 is a schematic structural diagram in which a magnetic bearing is arranged on a second radial bearing corresponding to FIG. 9.
Figure 14:
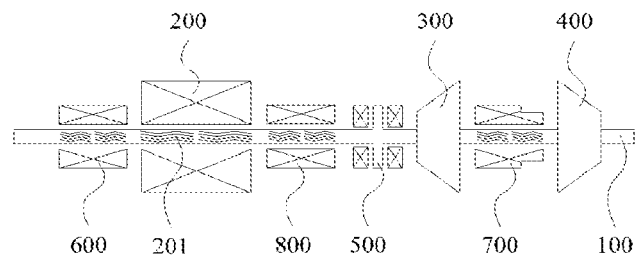
FIG. 14 is a schematic structural diagram in which a magnetic bearing is arranged on a second radial bearing corresponding to FIG. 10.

The thrust bearing 500 is arranged between the first radial bearing 600 and the motor 200, as shown in FIG. 7; or the thrust bearing 500 is arranged on one side of the first radial bearing 600 away from the motor 200, as shown in FIG. 8; or the thrust bearing 500 is arranged between the motor 200 and the air compressor 300, as shown in FIG. 9 or 10.

Since the third radial bearing 800 is provided additionally, in this embodiment of the present disclosure, when the thrust bearing 500 is arranged between the motor 200 and the air compressor 300, the thrust bearing 500 may be arranged between the motor 200 and the third radial bearing 800, as shown in FIG. 9, or may be arranged between the third radial bearing 800 and the air compressor 300, as shown in FIG. 10.

Compared with Embodiment 1, in this embodiment of the present disclosure, the third radial bearing 800 is provided additionally between the motor 200 and the air compressor 300, so that the stability of the entire rotor system is further improved.

In this embodiment of the present disclosure, the thrust bearing 500 may be a gas-magnetic hybrid thrust bearing. The first radial bearing 600 may be a gas-magnetic hybrid radial bearing or a hydrodynamic-hydrostatic gas hybrid radial bearing. Since the second radial bearing 700 is close to the turbine 400, in consideration of the fact that the magnetic component included in the magnetic bearing cannot withstand a high temperature transmitted by the turbine 400, the second radial bearing 700 may be the hydrodynamic-hydrostatic gas hybrid radial bearing.

As another implementation manner, the second radial bearing 700 may also be the gas-magnetic hybrid radial bearing. In this manner, a magnetic component of the second radial bearing 700 is arranged in a region of the second radial bearing 700 away from the turbine 400. That is, no magnetic component is arranged in a region of the second radial bearing 700 close to the turbine 400.

The magnetic component on the second radial bearing 700 can be protected by reducing the thermal energy radiated from the turbine 400 to the second radial bearing 700. Specifically, a heat insulation layer (not shown in drawings) is arranged on one side of the turbine 400 close to the second radial bearing 700. Here, the heat insulation layer may be made of aerogel or other materials.

FIGS. 11 to 14 are schematic diagrams respectively showing that the magnetic component is arranged in the region of the second radial bearing 700 away from the turbine 400 in FIGS. 7 to 10.

The remaining portions may refer to the related description in Embodiment 1, and the same technical effect can be achieved. To avoid repetition, details will not be described in this embodiment of the present disclosure.

Embodiment 3

Figure 15:
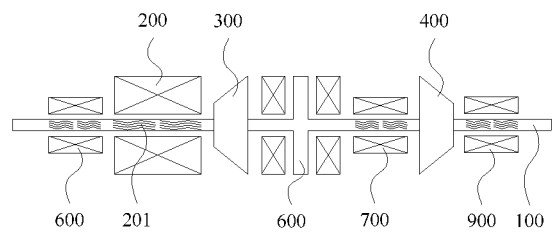
FIG. 15 is a schematic structural diagram of a further rotor system as provided in Embodiment 3.

As shown in FIG. 15, a rotor system includes: a rotating shaft 100, a shaft body of the rotating shaft being of an integrated structure and the rotating shaft being horizontally arranged; a motor 200, an air compressor 300 and a turbine 400 which are arranged on the rotating shaft 100 in sequence; and a thrust bearing 500, a first radial bearing 600, a second radial bearing 700 and a fourth radial bearing 900 which are arranged on the rotating shaft 100. The first radial bearing 600 is arranged on one side of the motor 200 away from the air compressor 300. The second radial bearing 700 is arranged between the air compressor 300 and the turbine 400. The fourth radial bearing 900 is arranged on one side of the turbine 400 away from the air compressor, and the thrust bearing 500 is arranged between the air compressor 300 and the second radial bearing 700.

This embodiment of the present disclosure may be applied to a case where the mass of the motor 200 is excessively large. When the mass of the motor 200 is excessively large, in order to maintain the stability of the rotor system, radial bearings (i.e., the first radial bearing 600 and the fourth radial bearing 900) need to be arranged at both ends of the rotor system, respectively. Meanwhile, the thrust bearing 500 needs to move toward one side of the turbine 400.

In consideration of the fact that the temperature of the turbine 400 is relatively high, when the thrust bearing 500 is a gas-magnetic hybrid thrust bearing, since a magnetic component in a magnetic bearing cannot withstand a high temperature transmitted by the turbine 400, the thrust bearing 500 may be arranged between the air compressor 300 and the second radial bearing 700. Correspondingly, the second radial bearing 700 may be a hydrodynamic-hydrostatic gas hybrid radial bearing.

Generally, the temperature on one side of the turbine 400 close to the fourth radial bearing 900 is higher than the temperature on one side of the turbine 400 close to the second radial bearing 700. Therefore, the fourth radial bearing 900 is preferably a hydrodynamic-hydrostatic gas hybrid radial bearing.

As another implementation manner, the second radial bearing 700 may also be a gas-magnetic hybrid radial bearing. In this manner, a magnetic component of the second radial bearing 700 is arranged in a region of the second radial bearing 700 away from the turbine 400. That is, no magnetic component is arranged in a region of the second radial bearing 700 close to the turbine 400.

The magnetic component on the second radial bearing 700 can be protected by reducing the thermal energy radiated from the turbine 400 to the second radial bearing 700. Specifically, a heat insulation layer (not shown in drawings) is arranged on one side of the turbine 400 close to the second radial bearing 700. Here, the heat insulation layer may be made of aerogel or other materials.

Figure 16:
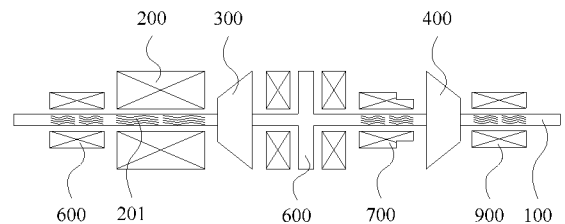
FIG. 16 is a schematic structural diagram in which a magnetic bearing is arranged on a second radial bearing corresponding to FIG. 15.

FIG. 16 is a schematic diagram showing that the magnetic component is arranged in the region of the second radial bearing 700 away from the turbine 400 in FIG. 15.

It should be noted that when the mass of the motor 200 is not too large, the thrust bearing 500 may be arranged between the first radial bearing 600 and the motor 200; or the thrust bearing 500 may be arranged on one side of the first radial bearing 600 away from the motor 200; or the thrust bearing 500 may be arranged between the motor 200 and the air compressor 300. Detailed will not be described as this is easy to understand.

The remaining portions may refer to the related description in Embodiment 1, and the same technical effect can be achieved. To avoid repetition, detailed will not be described in this embodiment of the present disclosure.

Embodiment 4

Figure 17:
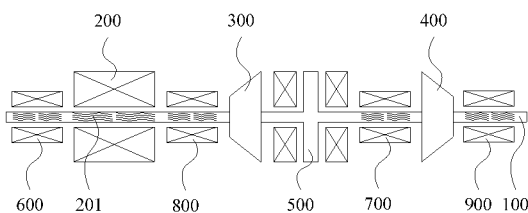
FIG. 17 is a schematic structural diagram of yet further rotor system as provided in Embodiment 4.

As shown in FIG. 17, a rotor system includes: a rotating shaft 100, a shaft body of the rotating shaft being of an integrated structure and the rotating shaft being horizontally arranged; a motor 200, an air compressor 300 and a turbine 400 which are arranged on the rotating shaft 100 in sequence; and a thrust bearing 500, a radial bearing 600, a second radial bearing 700, a third radial bearing 800 and a fourth radial bearing 900 which are arranged on the rotating shaft 100. The first radial bearing 600 is arranged on one side of the motor 200 away from the air compressor 300. The second radial bearing 700 is arranged between the air compressor 300 and the turbine 400. The third radial bearing 800 is arranged between the motor 200 and the air compressor 300. The fourth radial bearing 900 is arranged on one side of the turbine 400 away from the air compressor 300. The thrust bearing 500 is arranged between the air compressor 300 and the second radial bearing 700.

In this embodiment of the present disclosure, in order to further improve the stability of the entire rotor system, based on Embodiment 3, the third radial bearing 800 is provided additionally between the motor 200 and the air compressor 300.

In this embodiment of the present disclosure, the thrust bearing 500 may be a gas-magnetic hybrid thrust bearing, and the second radial bearing 700 and the fourth radial bearing 900 may each be a hydrodynamic-hydrostatic gas hybrid radial bearing.

As another implementation manner, the second radial bearing 700 may also be a gas-magnetic hybrid radial bearing. In this manner, a magnetic component of the second radial bearing 700 is arranged in a region of the second radial bearing 700 away from the turbine 400. That is, no magnetic component is arranged in a region of the second radial bearing 700 close to the turbine 400.

The magnetic component on the second radial bearing 700 can be protected by reducing the thermal energy radiated from the turbine 400 to the second radial bearing 700. Specifically, a heat insulation layer (not shown in drawings) is arranged on one side of the turbine 400 close to the second radial bearing 700. Here, the heat insulation layer may be made of aerogel or other materials.

Figure 18:
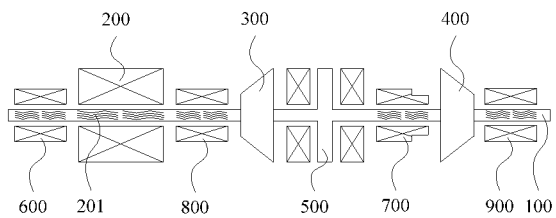
FIG. 18 is a schematic structural diagram in which a magnetic bearing is arranged on a second radial bearing corresponding to FIG. 17.

FIG. 18 is a schematic diagram showing that the magnetic component is arranged in the region of the second radial bearing 700 away from the turbine 400 in FIG. 17.

The remaining portions may refer to the related description in Embodiment 3, and the same technical effect can be achieved. To avoid repetition, detailed will not be described in this embodiment of the present disclosure.

Embodiment 5

When the rotor system of the present disclosure is used in a mobile device, such as an extended-range electromobile, a rotating shaft is in direct contact with a bearing when the rotor system is not working. As the electromobile drives, the rotating shaft is moved radially or axially relative to the bearing due to bumps or vibrations, thereby causing wear between the rotating shaft and the bearing, and further adversely affecting the accuracy and the service life of the bearing.

Therefore, in order to solve the above problems, based on other embodiments of the present disclosure, the rotor system in this embodiment of the present disclosure is provided with a locking device. The locking device is configured to lock the rotating shaft when the rotor system is not working.

In this embodiment of the present disclosure, the structural form and the mounting manner of the locking device are not unique. For the sake of understanding, the following two implementation manners will be described specifically in detail with reference to the accompanying drawings.

Figure 19:
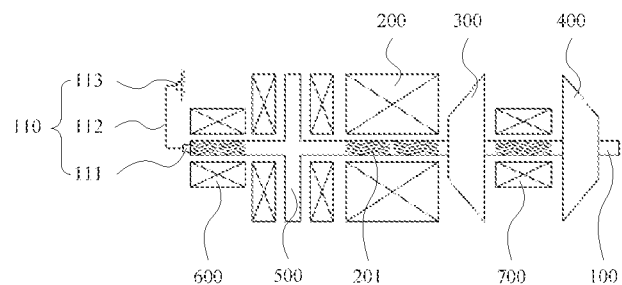
FIG. 19 is a schematic structural diagram in which a locking device is arranged in the rotor system as provided in Embodiment 5.

In one implementation manner, as shown in FIG. 19, the locking device 110 includes a telescopic jacking unit 111, a connecting rod 112, and a fixing component 113. One end of the connecting rod 112 is connected to the fixing component 113, and the other end of the connecting rod 112 is connected to the telescopic jacking unit 111. The telescopic jacking unit 111 rightly faces the end surface of one end of the rotating shaft 100 away from the turbine 400. The other end of the fixing component 113 is fixedly connected to a housing where the rotor system of the present disclosure is mounted.

In the case that the rotor system is stopped, the telescopic jacking unit 111 of the locking device 110 actuates and pushes the rotating shaft 100 in an axial direction of the rotating shaft 100, such that a stator of a thrust bearing 500 contacts a thrust disc, thereby fixing the rotating shaft 100 in the axial direction. Meanwhile, the rotating shaft 100 is radially fixed by using a friction force between the stator of the thrust bearing 500 and the thrust disc.

Further, the telescopic jacking unit 111 is provided with a tip portion (not shown in drawings), and the end surface of one end of the rotating shaft 100 away from the turbine 400 is provided with a tip hole (not shown in drawings). In a locked state, the tip portion is pushed into the tip hole of the rotating shaft 100, such that the rotating shaft 100 can be fixed better, thereby preventing the abrasion and damage to the rotating shaft 100 and the bearing during the running of the electromobile.

Figure 20:
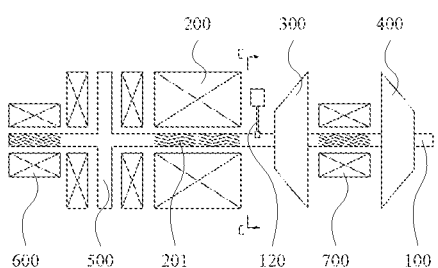
FIG. 20 is a schematic structural diagram in which another locking device arranged in the rotor system as provided in Embodiment 5.
Figure 21:
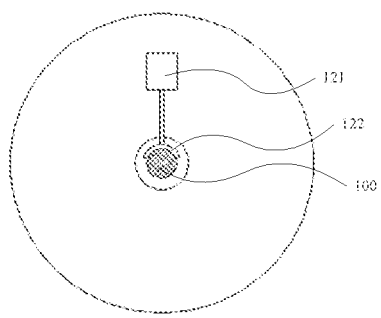
FIG. 21 is a schematic structural diagram in a C-C direction in FIG. 20.

In another implementation manner, as shown in FIGS. 20 and 21, the locking device 120 may also be provided as a locking device of a ferrule structure. Specifically, the locking device 120 includes a telescopic unit 121 and a ferrule 122. The ferrule 122 is connected to a telescopic end of the telescopic unit 122. The ferrule 122 may be a semi-circular ferrule, the radius of which is equal to or slightly larger than the radius of the rotating shaft 100 and the axis of which is parallel to the axis of the rotating shaft 100. The telescopic unit 121 is mounted at a substantially axially intermediate position of the rotating shaft 100 and is fixedly connected to a housing where the rotor system of the present disclosure is mounted.

In the case that the rotor system is stopped, the telescopic unit 121 stretches out, such that the rotating shaft 100 is stuck by the ferrule 122, and is pushed to be in contact with a radial bearing, thereby radially fixing the rotating shaft 100. Meanwhile, the rotating shaft 100 is axially fixed by a friction force between the radial bearing and the rotating shaft 100.

Further, a component such as a piston-type cylinder or a hydraulic cylinder that can implement telescopic control may be selected as the telescopic unit 121.

In this implementation manner, the mounting position of the locking device 120 on the rotating shaft 100 may not be limited. Preferably, the locking device 120 is arranged between two radial bearings that are furthest apart in the rotor system.

It should be noted that the locking devices in FIGS. 19 and 20 are both arranged based on the rotor system shown in FIG. 1. The locking devices provided in the rotor systems in other embodiments of the present disclosure will not be described here one by one.

In this embodiment of the present disclosure, the locking device can be provided to lock the rotating shaft when the rotor system is not working. In this way, the radial or axial movement of the rotating shaft relative to the bearings can be prevented, thereby improving the accuracy of the bearing and prolonging the life of the bearing.

Embodiment 6

When a rotor system of the present disclosure is used in a mobile device, such as an extended-range electromobile, a rotating shaft is in direct contact with a bearing when the rotor system is not working. As the electromobile drives, the rotating shaft is moved radially or axially relative to the bearing due to bumps or vibrations, thereby causing wear between the rotating shaft and the bearing, and further adversely affecting the accuracy and service life of the bearing.

Figure 22:
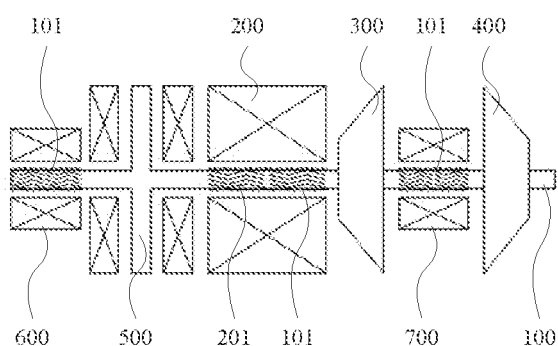
FIG. 22 is a schematic structural diagram in which an anti-wear coating is applied to a rotating shaft as provided in Embodiment 6.

Therefore, in order to solve the above-mentioned problems, based on other embodiments of the present disclosure, according to the rotor system in this embodiment of the present disclosure, a portion of the rotating shaft 100 where the bearing is mounted is coated with an anti-wear coating 101, as shown in FIG. 22.

The portion of the rotating shaft 100 where the bearing is mounted is coated with the anti-wear coating 101, which can effectively prevent the rotating shaft 100 and the bearing from being worn. The anti-wear coating 101 is preferably selected from a material with chemical stability, corrosion resistance, high lubricity and non-stickiness, and good resistance to aging, such as polytetrafluoroethylene.

Any of the rotor systems in Embodiments 1 to 6 may be applicable to a horizontal gas turbine generator set, and particularly applicable to a horizontal micro gas turbine generator set. In the following, a detailed description will be made by taking the rotor system applied to the horizontal gas turbine generator set as an example.

Embodiment 7

Figure 23:
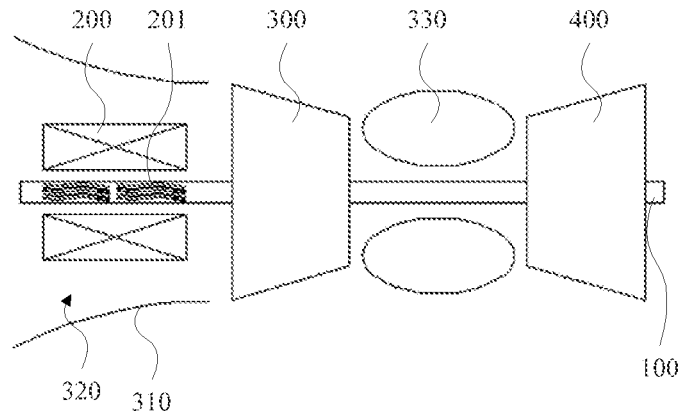
FIG. 23 is a schematic structural diagram of a gas turbine generator set as provided in Embodiment 7.

As shown in FIG. 23, this embodiment of the present disclosure provides a gas turbine generator set, which includes a housing 310, an intake channel 320, a combustion chamber 330, and any one of the rotor systems in Embodiments 1 to 6. The rotor system includes a rotating shaft 100, a motor 200, an air compressor 300, a turbine 400, and a thrust bearing and a radial bearing (not shown in drawings) that are arranged on the rotating shaft 100. The intake channel 320 is communicated with an air inlet of the air compressor 300. An air outlet of the air compressor 300 is communicated with an air inlet of the combustion chamber 300. An air outlet of the combustion chamber 330 is communicated with an air inlet of the turbine 400.

The air compressor 300 may be a centrifugal air compressor 300. A turbine wheel of the turbine 400 may be a centrifugal turbine wheel. A bearing of the motor 200 may be a fluid dynamic pressure bearing. First dynamic pressure generating grooves 201 may be formed in a portion of the rotating shaft 100 corresponding to the bearing of the motor 200. The combustion chamber 300 may be an annular combustion chamber.

Optionally, the intake channel 320 is formed by a housing of the motor 200 and the housing 310 of the gas turbine generator set. In this way, when air enters the air compressor 300 through the intake channel 320, the air flows through the housing of the motor 200 and can function to cool the motor 200.

Optionally, the motor 200 may be a starter-generator integrated motor.

The working process of the gas turbine generator set will be specifically described below.

As shown above, the thrust bearing in the rotor system may be a gas-magnetic hybrid thrust bearing, and the radial bearing may be a gas-magnetic hybrid thrust bearing or a hydrodynamic-hydrostatic gas hybrid radial bearing. For the sake of description, a bearing that can play a lubrication role without rotating the rotating shaft 100 is defined as a static-pressure bearing, and a bearing that can work only when the rotating shaft 100 rotates to a certain speed is defined as a dynamic pressure bearing. According to this logic, a magnetic bearing and a static-pressure gas bearing in the gas-magnetic hybrid thrust bearing, and a static-pressure gas bearing in the hydrodynamic-hydrostatic gas hybrid radial bearing may all be referred to as static-pressure bearings, while a dynamic-pressure gas bearing in the gas-magnetic hybrid thrust bearing and a dynamic-pressure gas bearing in the hydrodynamic-hydrostatic gas hybrid radial bearing may both be referred to as dynamic pressure bearings.

Figure 24:
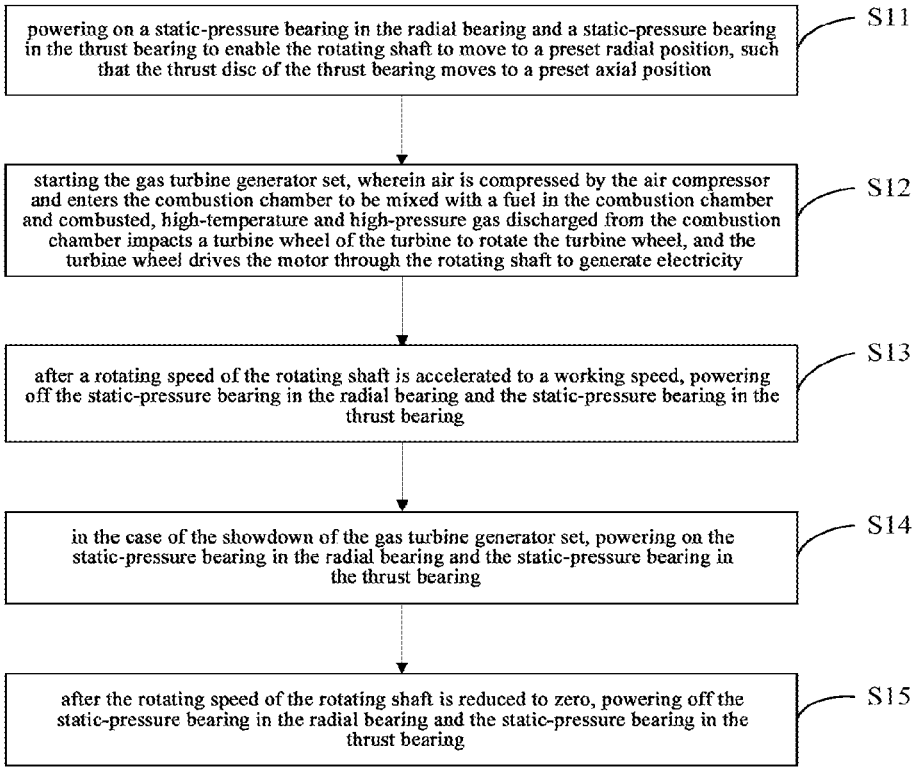
FIG. 24 is a schematic flowchart of a control method for the gas turbine generator set as provided in Embodiment 7.

As shown in FIG. 24, this embodiment of the present disclosure provides a control method of a gas turbine generator set. The control method includes the following steps.

In S11, a static-pressure bearing in the radial bearing and a static-pressure bearing in the thrust bearing are powered on, such that the rotating shaft moves to a preset radial position, and a thrust disc of the thrust bearing moves to a preset axial position.

The step of powering on the static-pressure bearings includes: powering on a magnetic bearing in the corresponding bearing, and/or conveying a gas to a static-pressure intake throttle hole in the bearing.

In S12, the gas turbine generator set is powered on, wherein air is compressed by the air compressor and enters the combustion chamber to be mixed with a fuel in the combustion chamber and combusted, and high-temperature and high-pressure gas discharged from the combustion chamber impacts a turbine wheel of the turbine to rotate the turbine wheel, such that the turbine wheel drives the motor through the rotating shaft to generate electricity.

Taking the motor being a starter-generator integrated motor as an example, a starting process of the gas turbine generator set is specifically described as follows.

After receiving a start signal, an electronic control unit (ECU) for a gas turbine sends a motor drive mode command to a data processing center (DPC) of a motor power controller. The DPC is switched to a motor drive mode. The DPC performs frequency conversion on a direct current of a battery built in a gas turbine to drive the motor to work, and the motor drives the gas turbine to increase a rotating speed.

After the rotating speed of the gas turbine is increased to an ignition speed, a fuel valve is opened to enter an ignition program. Air enters the air compressor via the intake channel to be compressed, then enters a heat regenerator, and is preheated by a high-temperature gas discharged from the turbine wheel. The preheated compressed air enters the combustion chamber to be mixed with a fuel and combusted. The high-temperature and high-pressure gas that is sufficiently combusted in the combustion chamber enters the turbine to impact the turbine wheel, such that the turbine wheel of the turbine rotates. The exhaust gas from the turbine wheel enters the heat regenerator and pre-heats the cold compressed air prior to entering the combustion chamber and then is discharged from an exhaust pipe. Because the turbine is connected to the air compressor and the motor through the rotating shaft, the turbine wheel of the turbine rotates to drive the air compressor to rotate together to a self-sustained speed.

After the gas turbine reaches its self-sustained speed, the DPC suspends. The motor is in an idle state, a throttle is continued to be stepped on, and the turbine wheel continues to increase its power, such that the rotating speed is increased to a working speed. The ECU sends a generator mode command to the DPC. The DPC is switched to a generator mode, and outputs an electric current with a voltage required by a user after an AC output from the motor is rectified and transformed.

The air compressor is a centrifugal air compressor. The centrifugal air compressor includes movable blades and stationary blades arranged in a circumferential direction, wherein the stationary blades are diffusers. In this way, the specific process of air entering the air compressor from the intake channel to be compressed may be as follows: after entering the movable blades of the centrifugal air compressor to be compressed, air enters the diffusers (i.e., the stationary blades) arranged in the circumferential direction to continue to be compressed.

The turbine wheel of the turbine is a centrifugal turbine wheel provided with the movable blades. The stationary blades are arranged at an outlet of the combustion chamber in the circumferential direction, wherein the stationary blades are nozzles. In this way, a specifically process in which the high-temperature and high-pressure gas that is sufficiently combusted in the combustion chamber enters the turbine to work, such that the turbine wheel of the turbine rotates may be as follows: the high-temperature and high-pressure gas that is sufficiently combusted in the combustion chamber is expanded and accelerated by the nozzles (namely, the stationary blades) arranged at the outlet of the combustion chamber in the circumferential direction to impact the movable blades of the turbine wheel, such that the turbine wheel rotates.

In S13, after a rotating speed of the rotating shaft is accelerated to a working speed, the static-pressure bearing in the radial bearing and the static-pressure bearing in the thrust bearing are powered off.

The step of powering off the static-pressure bearings includes: powering off a magnetic bearing in the corresponding bearing, and/or stopping conveying a gas to a static-pressure intake throttle hole in the bearing.

In S14, in the case that the gas turbine generator set is stopped, the static-pressure bearing in the radial bearing and the static-pressure bearing in the thrust bearing are powered on.

In S15, after the rotating speed of the rotating shaft is decelerated to zero, the static-pressure bearing in the radial bearing and the static-pressure bearing in the thrust bearing are powered off.

In the above process, the bearings in the rotor system are controlled, such that the static-pressure bearing in the radial bearing and the static-pressure bearing in the thrust bearing are always powered on until the rotating speed of the rotating shaft reaches the working speed.

In the case that the gas turbine generator set is stopped, the bearings in the rotor system are controlled, such that the static-pressure bearing in the radial bearing and the static-pressure bearing in the thrust bearings are always powered on until the rotating speed of the rotating shaft is zero.

Figure 25:
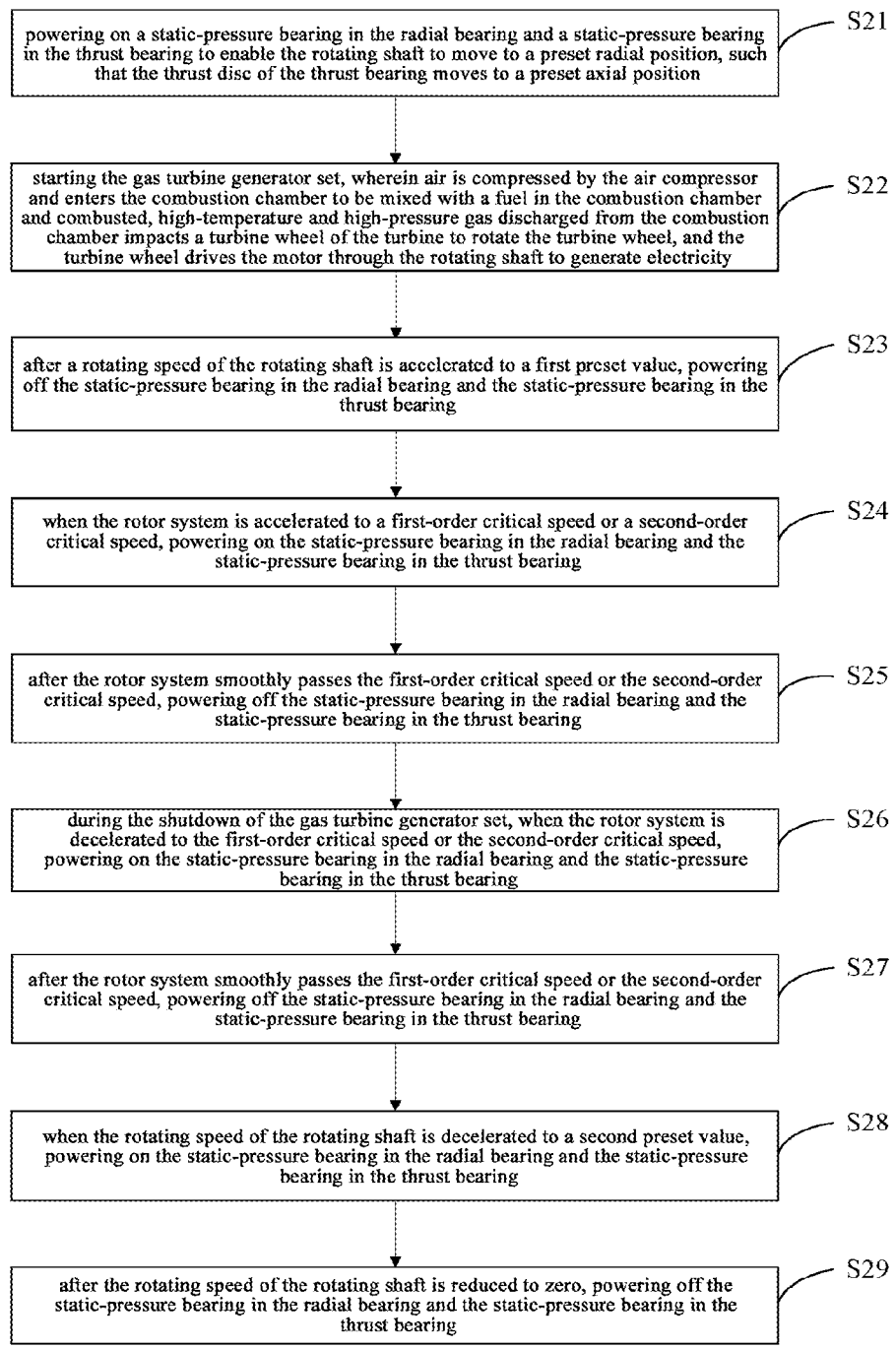
FIG. 25 is a schematic flowchart of another control method for the gas turbine generator set as provided in Embodiment 7.

As shown in FIG. 25, this embodiment of the present disclosure provides another control method of the gas turbine generator set. The control method includes the following steps.

In S21, a static-pressure bearing in the radial bearing and a static-pressure bearing in the thrust bearing are powered on to enable the rotating shaft to move to a preset radial position, such that the thrust disc of the thrust bearing moves to a preset axial position.

The step of powering on the static-pressure bearings includes: turning on a magnetic bearing in the corresponding bearing, and/or conveying a gas to a static-pressure intake throttle hole in the bearing.

In S22, the gas turbine generator set is powered on, wherein air is compressed by the air compressor and enters the combustion chamber to be mixed with a fuel in the combustion chamber and combusted, wherein high-temperature and high-pressure gas discharged from the combustion chamber impacts a turbine wheel of the turbine to rotate the turbine wheel, such that the turbine wheel drives the motor through the rotating shaft to generate electricity.

In S23, after a rotating speed of the rotating shaft is accelerated to a first preset value, the static-pressure bearing in the radial bearing and the static-pressure bearing in the thrust bearing are powered off.

The first preset value may be 5% to 30% of a rated rotating speed.

The step of powering off the static-pressure bearings includes: powering off a magnetic bearing in the corresponding bearing, and/or stopping conveying the gas to the static-pressure intake throttle hole in the bearing.

In S24, when the rotor system is accelerated to a first-order critical speed or a second-order critical speed, the static-pressure bearing in the radial bearing and the static-pressure bearing in the thrust bearing are powered on.

In S25, after the rotor system smoothly passes the first-order critical speed or the second-order critical speed, the static-pressure bearing in the radial bearing and the static-pressure bearing in the thrust bearing are powered off.

In S26, during the shutdown of the gas turbine generator set, when the rotor system is decelerated to the first-order critical speed or the second-order critical speed, the static-pressure bearing in the radial bearing and the static-pressure bearing in the thrust bearing are powered on.

In S27, after the rotor system smoothly passes the first-order critical speed or the second-order critical speed, the static-pressure bearing in the radial bearing and the static-pressure bearing in the thrust bearing are powered off.

In S28, when the rotating speed of the rotating shaft is decelerated to a second preset value, the static-pressure bearing in the radial bearing and the static-pressure bearing in the thrust bearing are powered on.

The second preset value may be equal to or different from the first preset value, and the second preset value may be 5% to 30% of the rated rotating speed.

In S29, after the rotating speed of the rotating shaft is decelerated to zero, the static-pressure bearing in the radial bearing and the static-pressure bearing in the thrust bearing are powered off.

In the above process, before the gas turbine generator set is started, the bearings in the rotor system are controlled, such that the static-pressure bearing in the radial bearing and the static-pressure bearing in the thrust bearing are powered on. In this way, the rotating shaft is lifted to a preset radial position by means of the static-pressure bearing in the radial bearing. The thrust disc is pushed to a preset axial position by means of the static-pressure bearing in the thrust bearing.

After the gas turbine generator set is started, the rotating speed of the rotating shaft gradually increases. When the rotating speed of the rotating shaft reaches the first preset value, for example, 5% to 30% of the rated rotating speed, the bearings in the rotor system are controlled, such that the static-pressure bearing in the radial bearing and the static-pressure bearing in the thrust bearing stop working. When the rotating speed of the rotating shaft reaches the first-order critical speed or the second-order critical speed, the bearings in the rotor system are controlled, such that the static-pressure bearing in the radial bearing and the static-pressure bearing in the thrust bearing are powered on again. After the rotating speed of the rotating shaft smoothly passes the first-order critical speed or the second-order critical speed, the bearings in the rotor system are controlled, such that the static-pressure bearing in the radial bearing and the static-pressure bearing in the thrust bearing stop working again.

During the shutdown of the gas turbine generator set, the rotating speed of the rotating shaft gradually decreases. When the rotating speed of the rotating shaft reaches the second-order critical speed or the first-order critical speed, the bearings in the rotor system are controlled, such that the static-pressure bearing in the radial bearing and the static-pressure bearing in the thrust bearing are powered on again. After the rotating speed of the rotating shaft smoothly passes the second-order critical speed or the first-order critical speed, the bearings in the rotor system are controlled, such that the static-pressure bearing in the radial bearing and the static-pressure bearing in the thrust bearing stop working again. When the rotating speed of the rotating shaft drops to a predetermined value, for example, 5% to 30% of the rated rotating speed, the bearings in the rotor system are controlled, such that the static-pressure bearing in the radial bearing and the static-pressure bearing in the thrust bearing are powered on again until the speed drops to zero. Then, the bearings in the rotor system are controlled, such that the static-pressure bearing in the radial bearing and the static-pressure bearing in the thrust bearing stop working again.

The control method of the rotor system will be specifically described below based on the control method of the gas turbine generator set.

Embodiment 8

Figure 26:
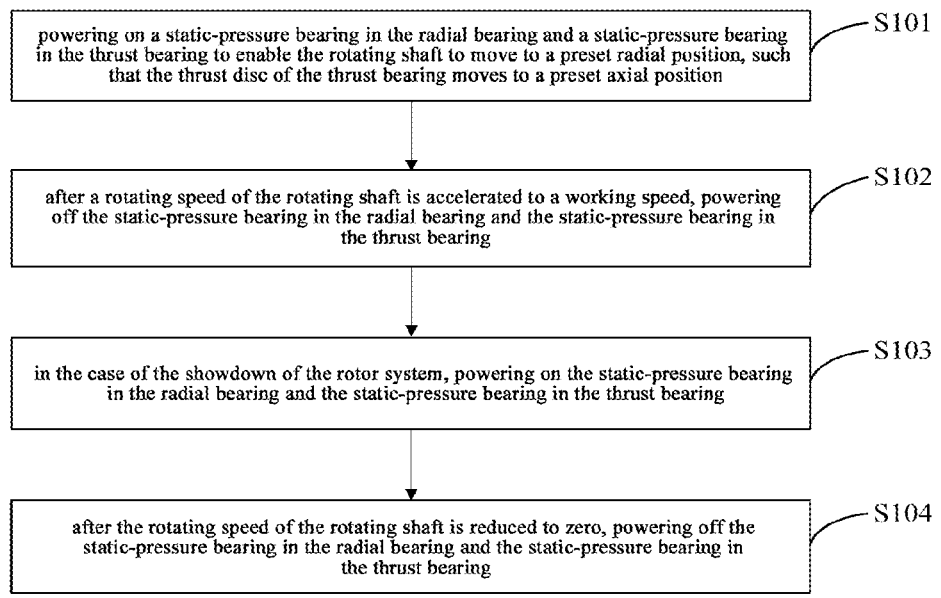
FIG. 26 is a schematic flowchart of a control method for a rotor system as provided in Embodiment 8.

As shown in FIG. 26, an embodiment of the present disclosure provides a control method of a rotor system. The method includes the following steps.

In S101, a static-pressure bearing in the radial bearing and a static-pressure bearing in the thrust bearing are powered on to enable the rotating shaft to move to a preset radial position, such that the thrust disc of the thrust bearing moves to a preset axial position.

The step of powering on the static-pressure bearings includes: powering on a magnetic bearing in the corresponding bearing, and/or conveying a gas to a static-pressure intake throttle hole in the bearing.

In S102, after a rotating speed of the rotating shaft is accelerated to a working speed, the static-pressure bearing in the radial bearing and the static-pressure bearing in the thrust bearing are powered off.

The step of powering off the static-pressure bearings includes: powering off the magnetic bearing in the corresponding bearing, and/or stopping conveying the gas to the static-pressure intake throttle hole.

In S103, in the case that the rotor system is stopped, the static-pressure bearing in the radial bearing and the static-pressure bearing in the thrust bearing are powered on.

In S104, after the rotating speed of the rotating shaft is decelerated to zero, the static-pressure bearing in the radial bearing and the static-pressure bearing in the thrust bearing are powered off.

In the above process, before the rotor system is started, the bearings in the rotor system are controlled, such that the static-pressure bearing in the radial bearing and the static-pressure bearing in the thrust bearing are powered on. In this way, the rotating shaft is lifted to a preset radial position by means of the static-pressure bearing in the radial bearing. The thrust disc is pushed to a preset axial position by means of the static-pressure bearing in the thrust bearing. The static-pressure bearing in the radial bearing and the static-pressure bearing in the thrust bearing are always powered on until the rotating speed of the rotating shaft reaches the working speed.

In the case that the rotor system is stopped, the bearings in the rotor system are controlled, such that the static-pressure bearing in the radial bearing and the static-pressure bearing in the thrust bearing are powered on until the rotating speed of the rotating shaft is zero.

Figure 27:
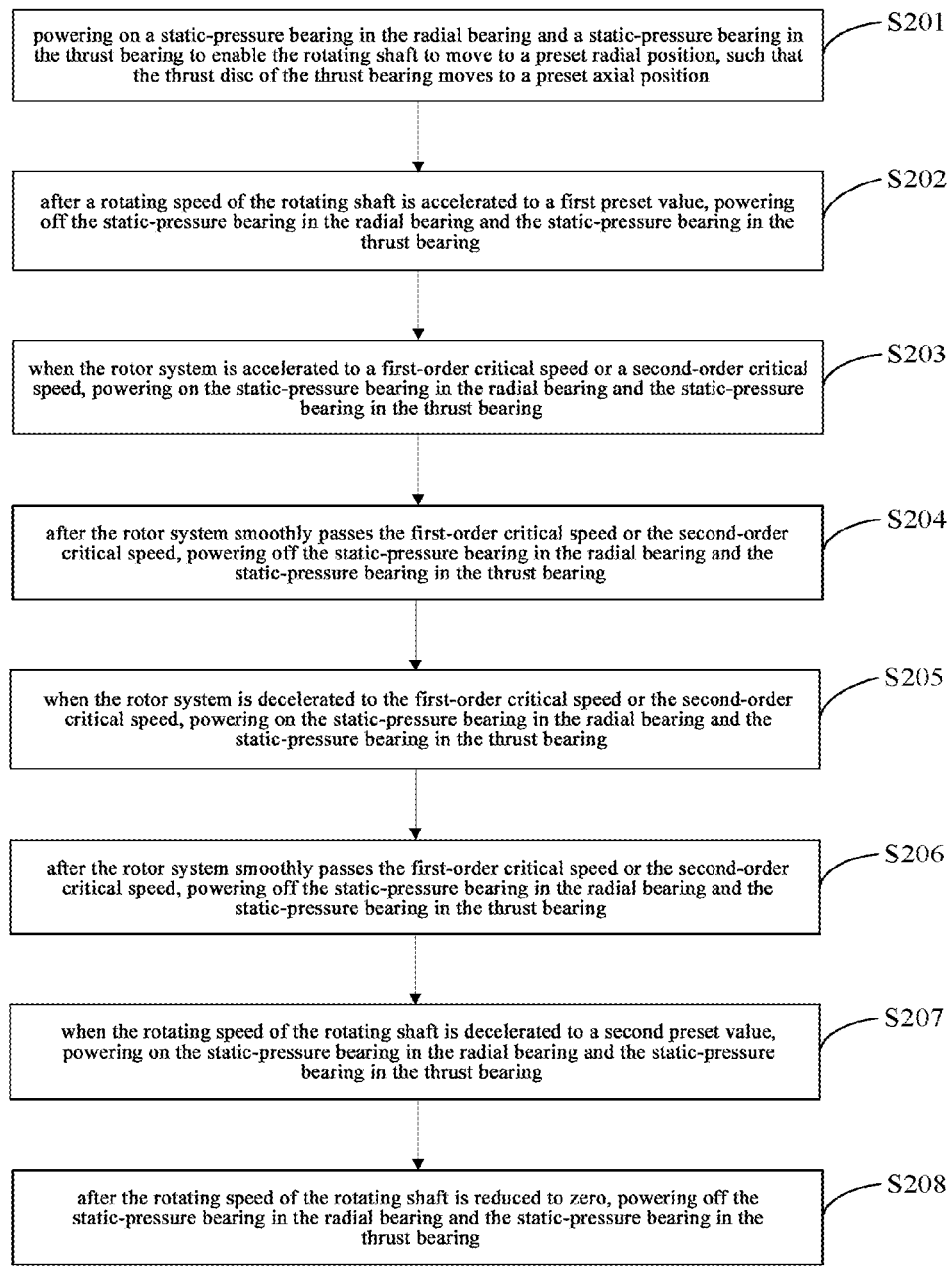
FIG. 27 is a schematic flowchart of another control method for the rotor system as provided in Embodiment 8.
Figure 28:
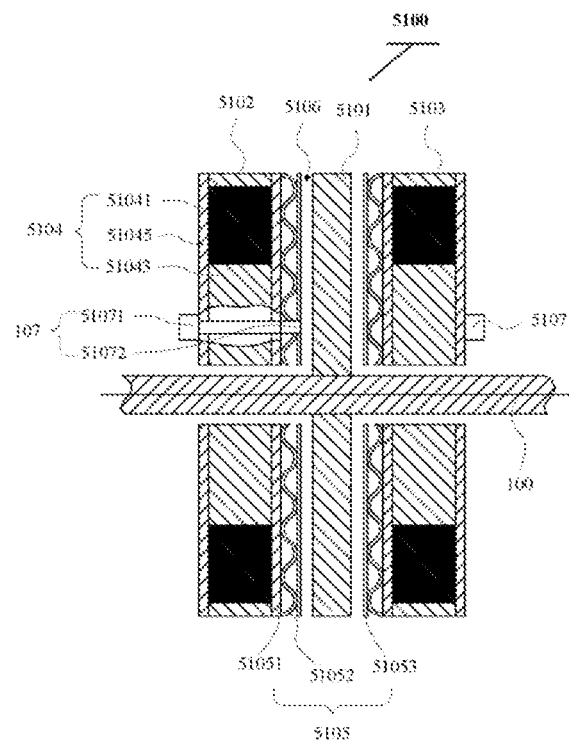
FIG. 28 is a sectional view of a foil-type gas-magnetic hybrid thrust bearing as provided in Embodiment 9.
Figure 29:
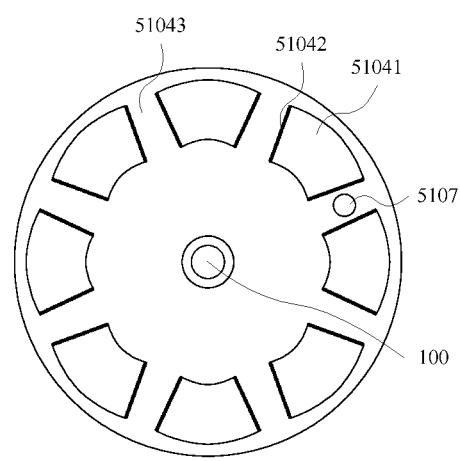
FIG. 29 is a schematic structural diagram of a first magnetic bearing in the foil-type gas-magnetic hybrid thrust bearing as provided in Embodiment 9.
Figure 30:
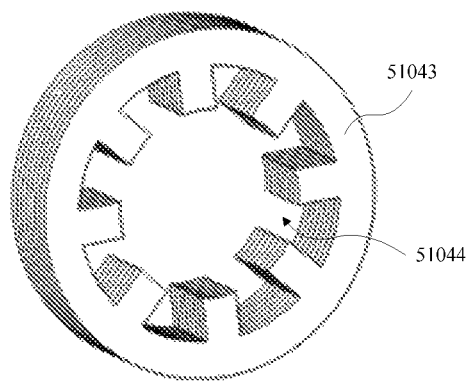
FIG. 30 is a schematic structural diagram of a first magnetic bearing pedestal in the foil-type gas-magnetic hybrid thrust bearing as provided in Embodiment 9.
Figure 31:
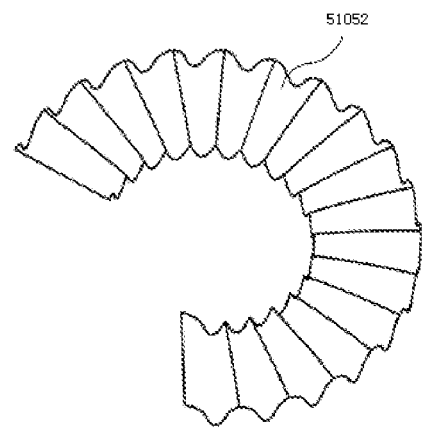
FIG. 31 is a schematic structural diagram of a first foil in the foil-type gas-magnetic hybrid thrust bearing as provided in Embodiment 9.
Figure 32:
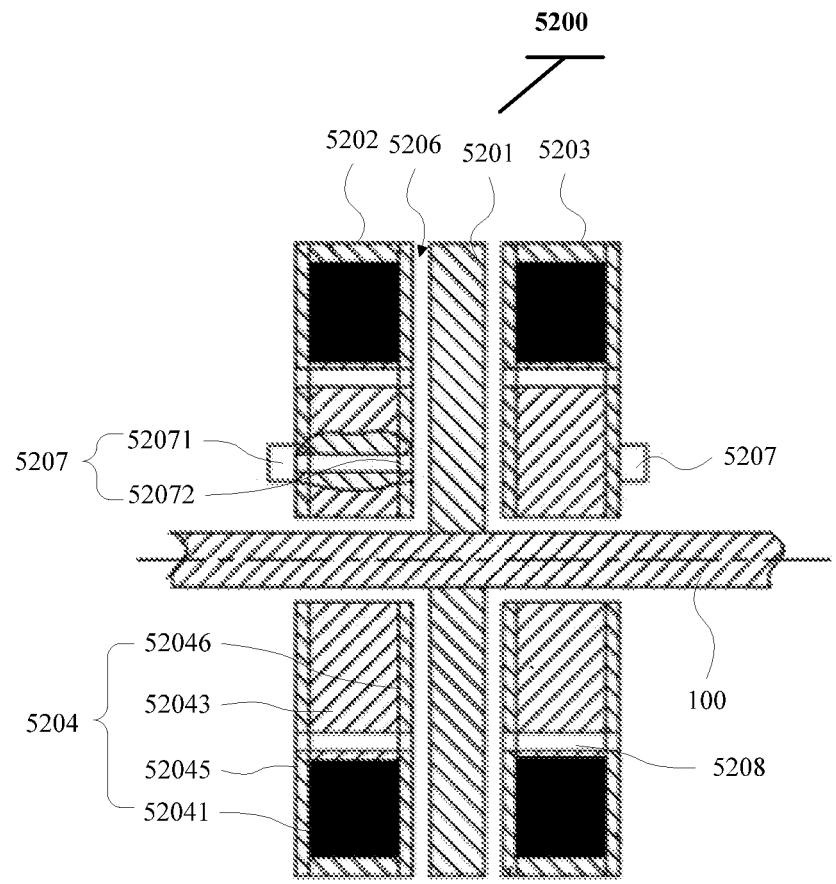
FIG. 32 is a sectional view of a slot-type gas-magnetic hybrid thrust bearing as provided in Embodiment 10.
Figure 33:
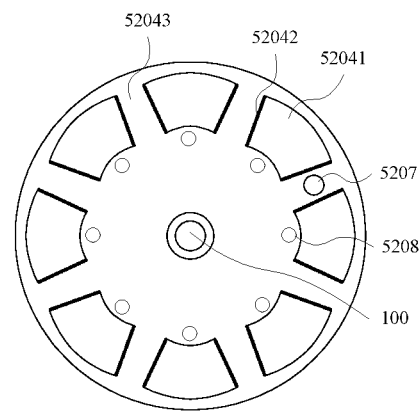
FIG. 33 is a schematic structural diagram of a second magnetic bearing in the slot-type gas-magnetic hybrid thrust bearing as provided in Embodiment 10.
Figure 34:
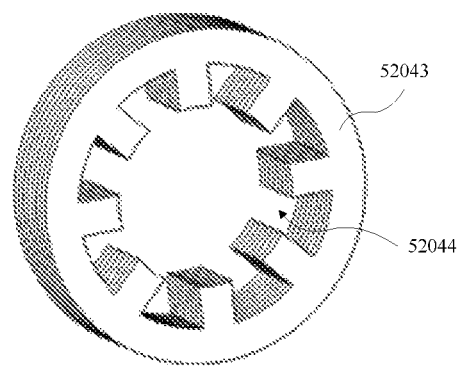
FIG. 34 is a schematic structural diagram of a second magnetic bearing pedestal in the slot-type gas-magnetic hybrid thrust bearing as provided in Embodiment 10.
Figure 35:
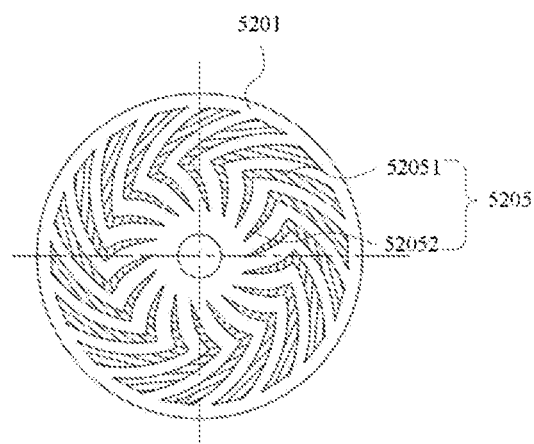
FIG. 35 is one of structural schematic diagrams in which second dynamic pressure generating grooves are formed in a second thrust disc in the slot-type gas-magnetic hybrid thrust bearing as provided in Embodiment 10.
Figure 36:
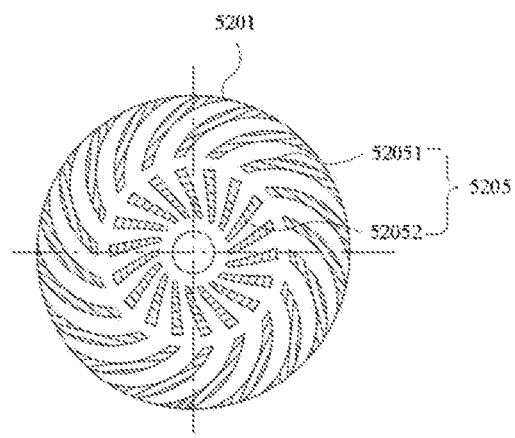
FIG. 36 is the other structural schematic diagram in which the second dynamic pressure generating grooves are formed in the second thrust disc in the slot-type gas-magnetic hybrid thrust bearing as provided in Embodiment 10.
Figure 37:
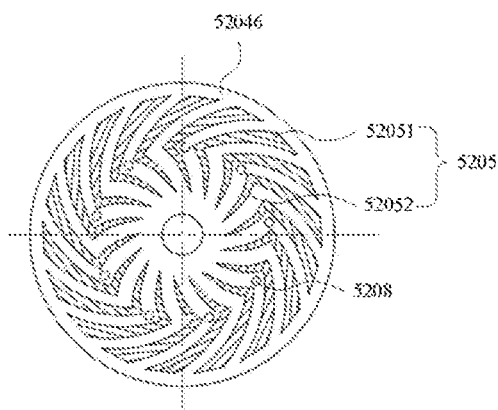
FIG. 37 is one of structural schematic diagrams in which second dynamic pressure generating grooves are formed in a first pressure ring in the slot-type gas-magnetic hybrid thrust bearing as provided in Embodiment 10.
Figure 38:
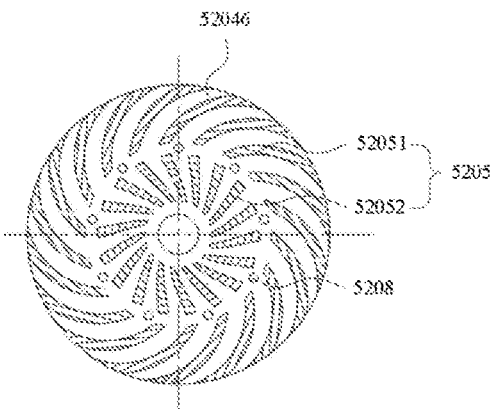
FIG. 38 is the other structural schematic diagram in which the second dynamic pressure generating grooves are formed in the first pressure ring in the slot-type gas-magnetic hybrid thrust bearing as provided in Embodiment 10.
Figure 39:
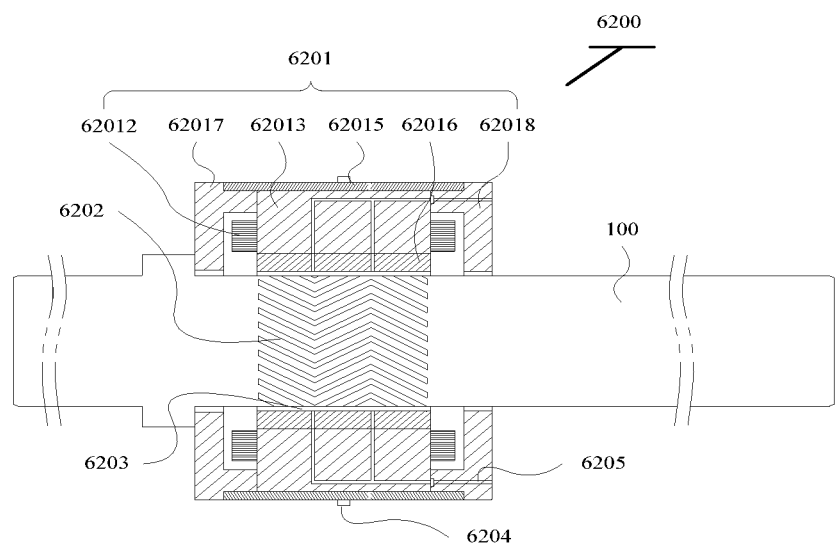
FIG. 39 is a half sectional view of a slot-type gas-magnetic hybrid radial bearing as provided in Embodiment 11.
Figure 40:
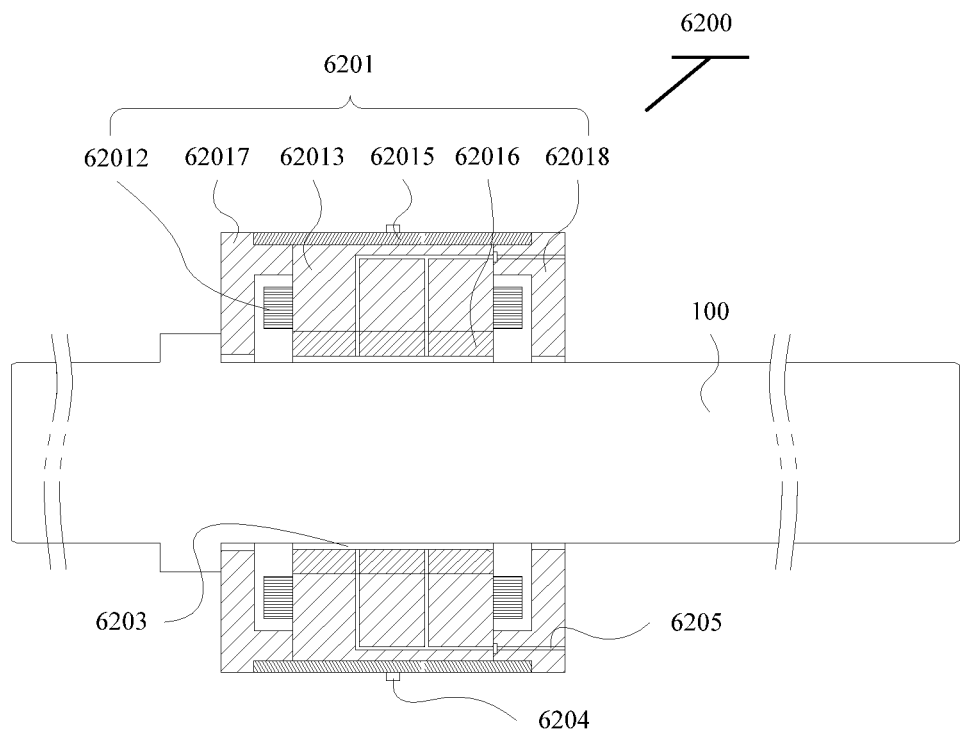
FIG. 40 is a half sectional view of another slot-type gas-magnetic hybrid radial bearing as provided in Embodiment 11.
Figure 41:
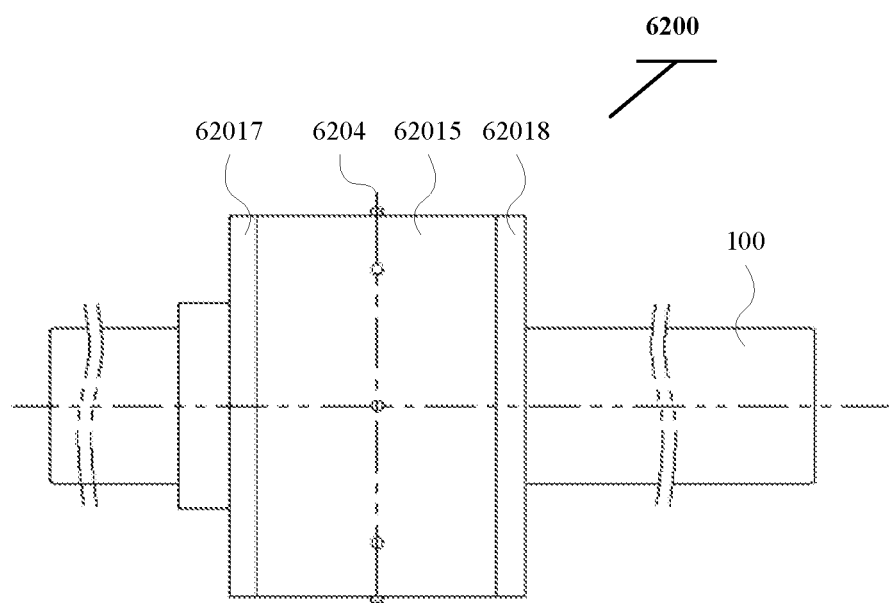
FIG. 41 is an external view of the slot-type gas-magnetic hybrid radial bearing as provided in Embodiment 11.
Figure 42:
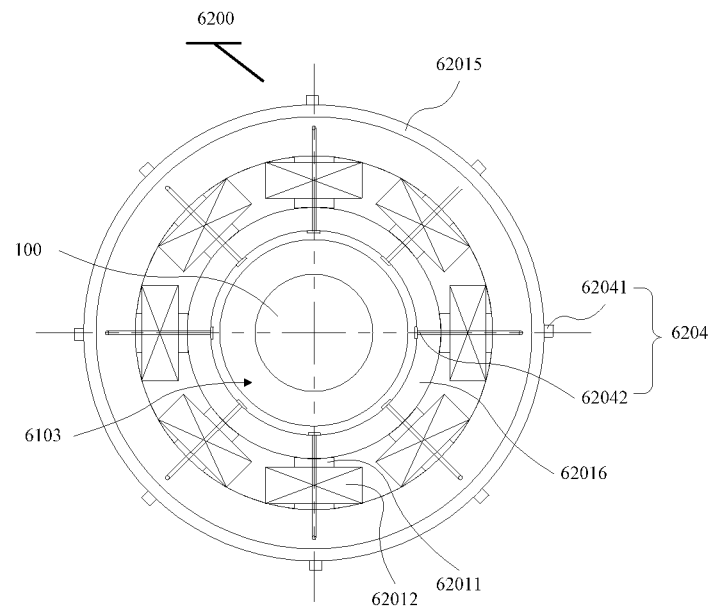
FIG. 42 is a schematic structural diagram of a fourth magnetic bearing in the slot-type gas-magnetic hybrid radial bearing as provided in Embodiment 11.
Figure 43:
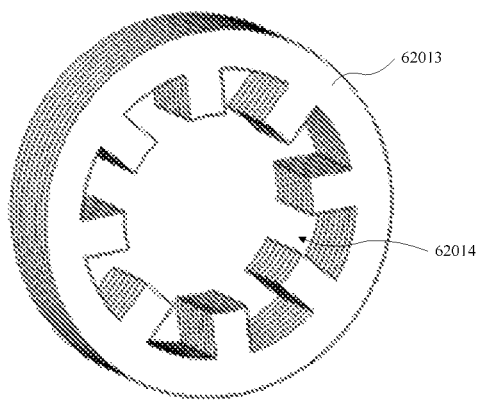
FIG. 43 is a schematic structural diagram of a fourth magnetic bearing pedestal in the slot-type gas-magnetic hybrid radial bearing as provided in Embodiment 11.
Figure 44:
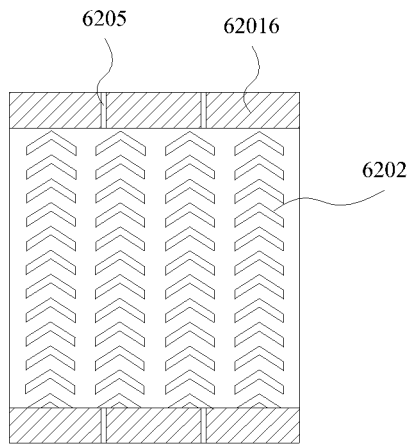
FIG. 44 is one of structural schematic diagrams in which third dynamic pressure generating grooves are formed in a second bearing sleeve in the slot-type gas-magnetic hybrid radial bearing as provided in Embodiment 11.
Figure 45:
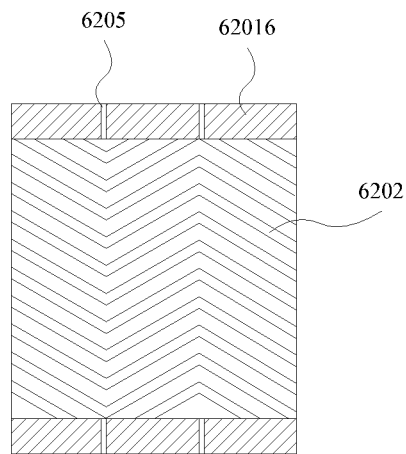
FIG. 45 is the other structural schematic diagram in which the third dynamic pressure generating grooves are formed in the second bearing sleeve in the slot-type gas-magnetic hybrid radial bearing as provided in Embodiment 11.
Figure 46:
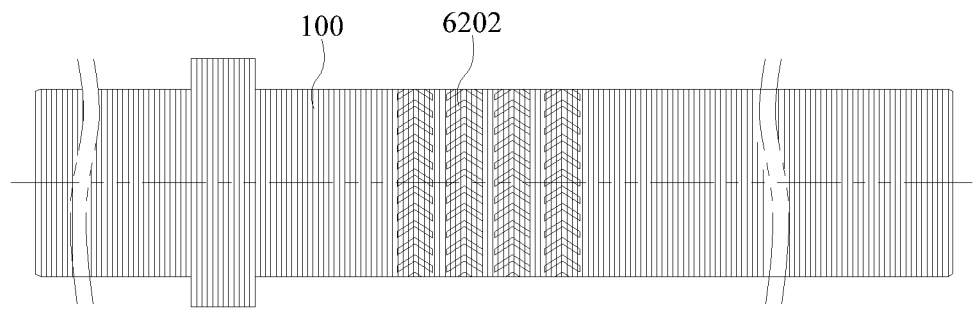
FIG. 46 is a structural schematic diagram in which the third dynamic pressure generating grooves are formed in a rotating shaft in the slot-type gas-magnetic hybrid radial bearing as provided in Embodiment 11.
Figure 47:
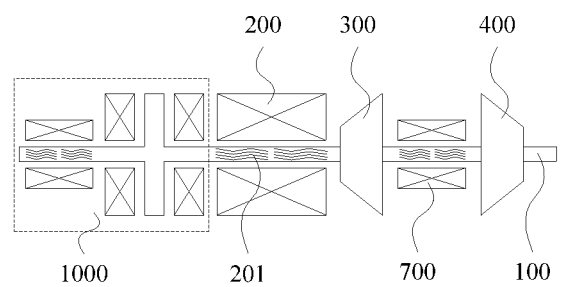
FIGS. 47 to 62 are schematic structural diagrams of a rotor system using an integrated bearing corresponding to FIGS. 1 to 18.
Figure 48:
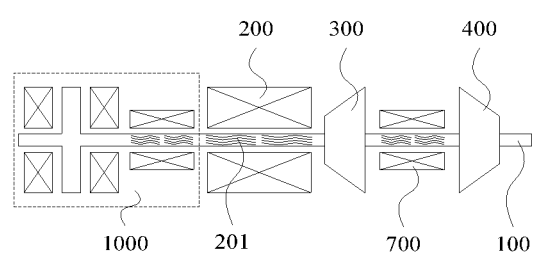
Figure 49:
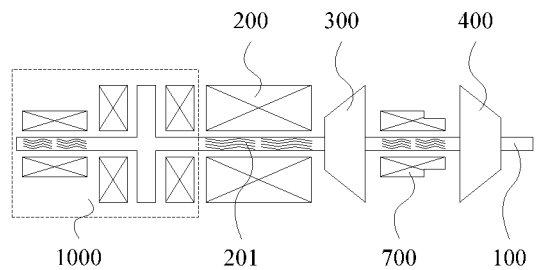
Figure 50:
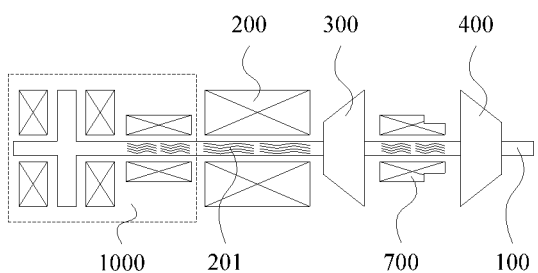
Figure 51:
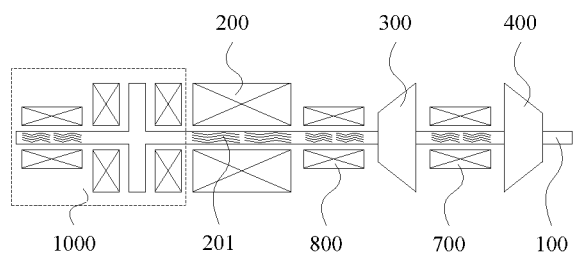
Figure 52:
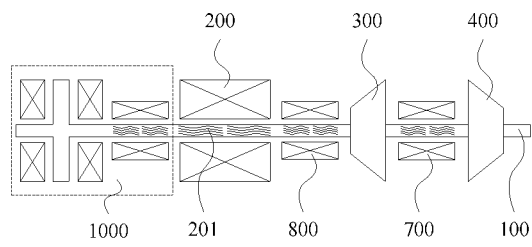
Figure 53:
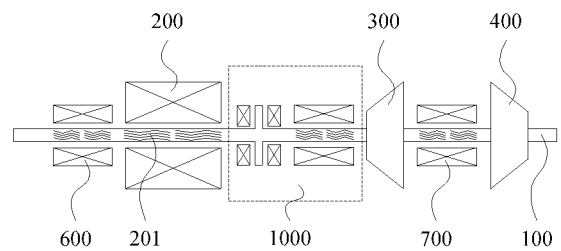
Figure 54:
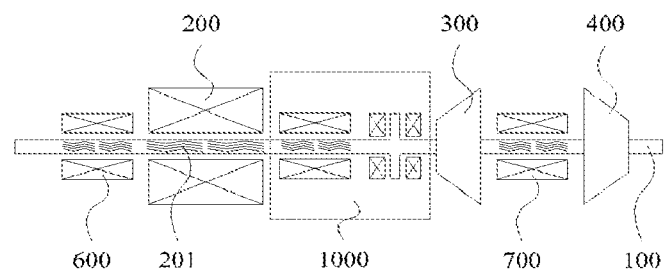
Figure 55:
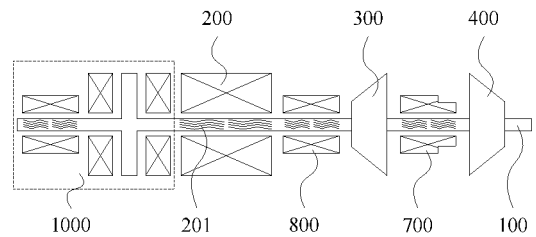
Figure 56:
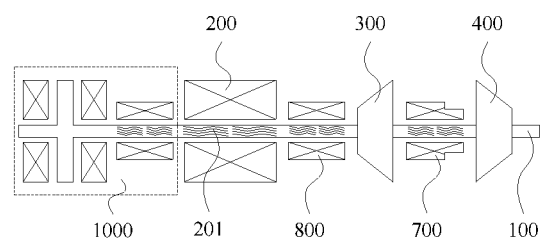
Figure 57:
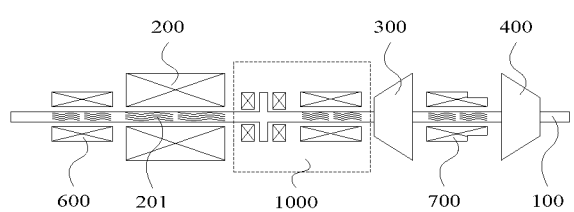
Figure 58:
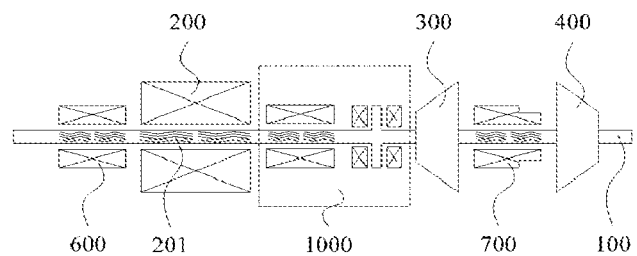
Figure 59:
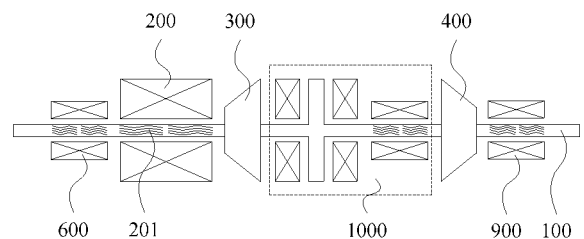
Figure 60:
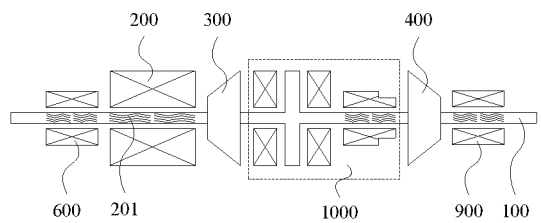
Figure 61:
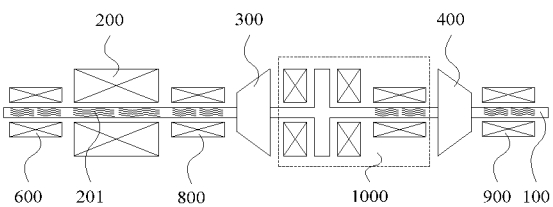
Figure 62:
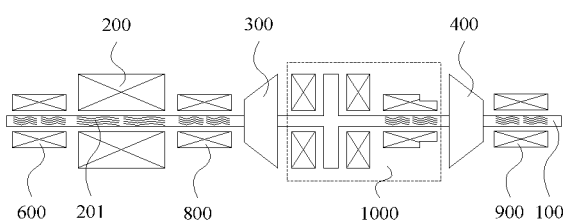
Figure 63:
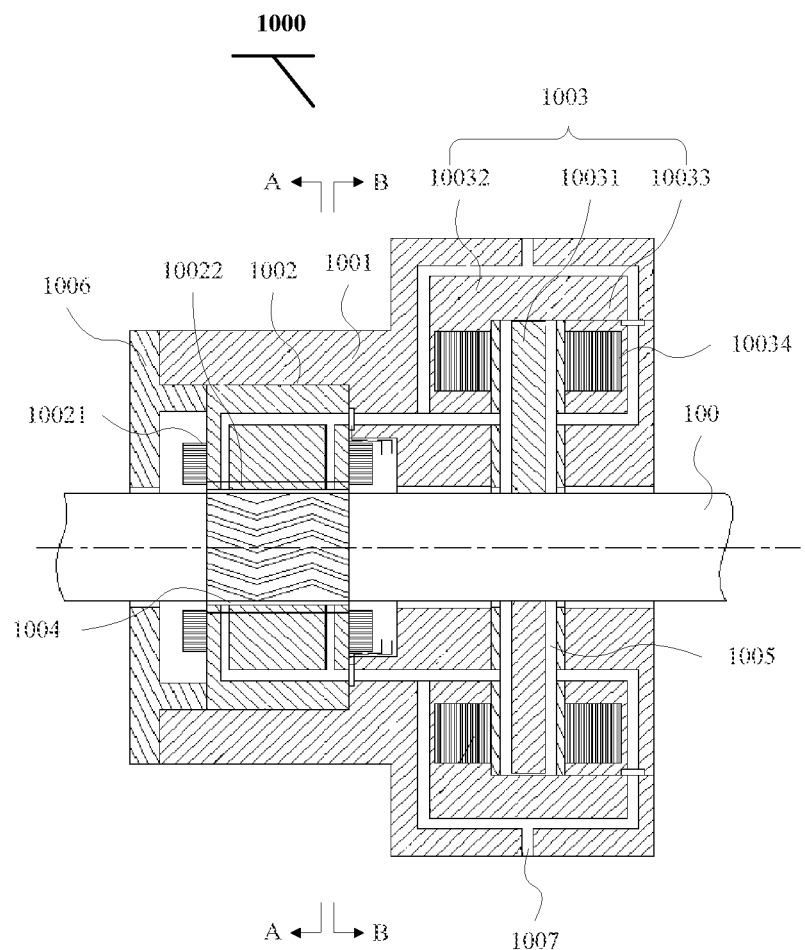
FIG. 63 is a sectional view of an integrated bearing as provided in Embodiment 12.
Figure 64:
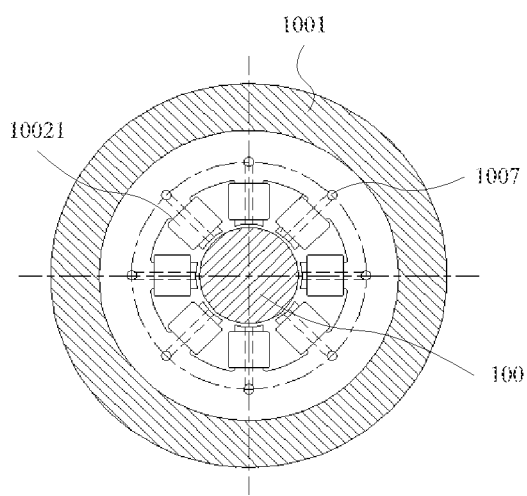
FIG. 64 is a sectional view in an A-A direction in FIG. 63.
Figure 65:
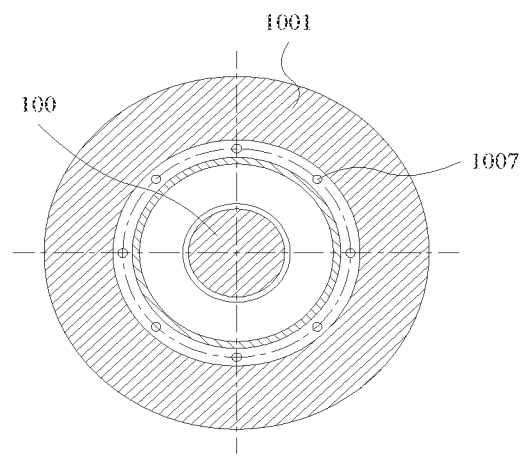
FIG. 65 is a sectional view in a B-B direction in FIG. 63.
Figure 66:
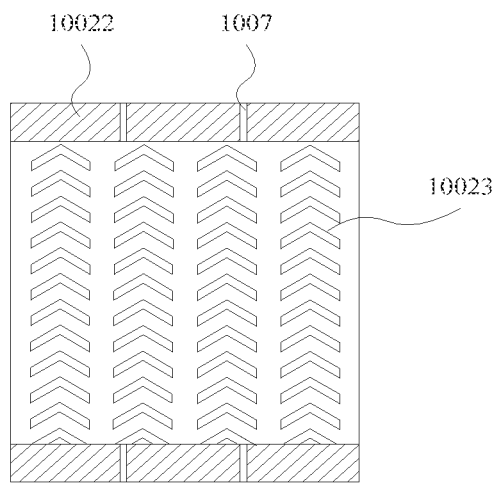
FIG. 66 is one of structural schematic diagrams in which fifth dynamic pressure generating grooves are formed in a third bearing sleeve in the integrated bearing as provided in Embodiment 12.
Figure 67:
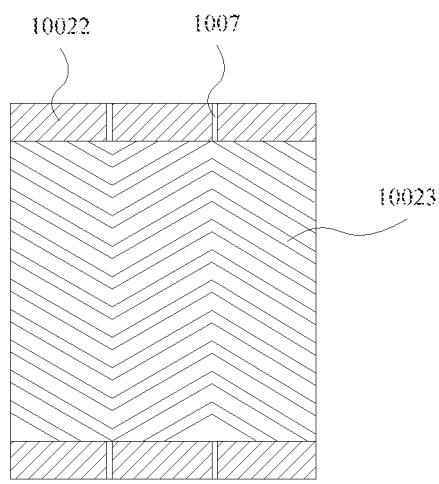
FIG. 67 is the other structural schematic diagram in which the fifth dynamic pressure generating grooves are formed in the third bearing sleeve in the integrated bearing as provided in Embodiment 12.
Figure 68:
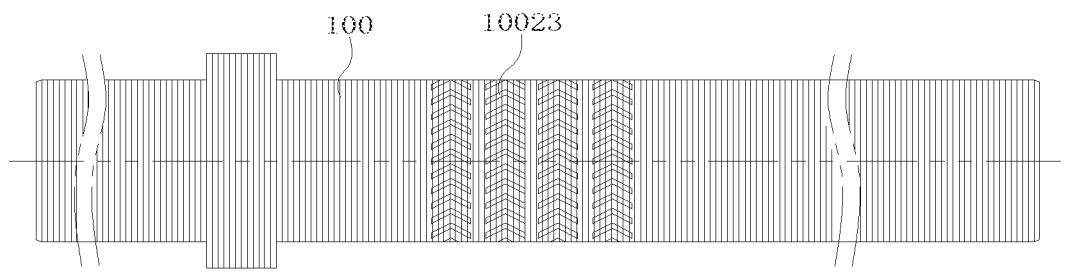
FIG. 68 is a structural schematic diagram in which the fifth dynamic pressure generating grooves are formed in the rotating shaft in the integrated bearing as provided in Embodiment 12.
Figure 69:
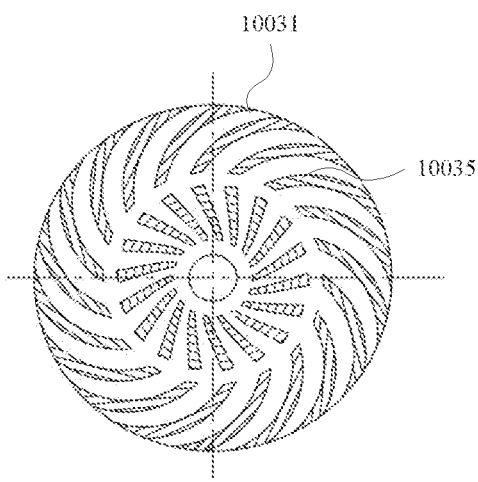
FIG. 69 is one of structural schematic diagrams in which sixth dynamic pressure generating grooves are formed in a third thrust disc in the integrated bearing as provided in Embodiment 12.
Figure 70:
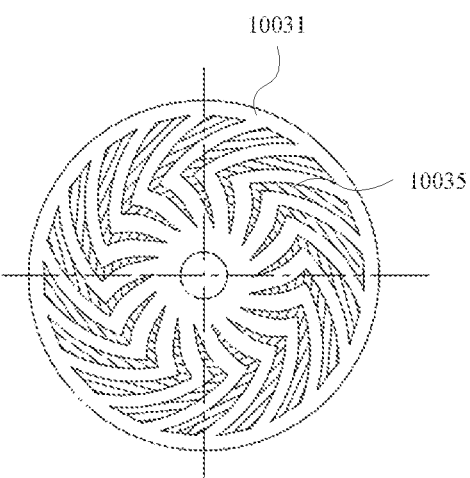
FIG. 70 is the other structural schematic diagram in which the sixth fifth dynamic pressure generating grooves are formed in the third bearing sleeve in the integrated bearing as provided in Embodiment 12.

As shown in FIG. 27, this embodiment of the present disclosure provides yet another control method of the rotor system. The control method includes the following steps.

In S201, a static-pressure bearing in the radial bearing and a static-pressure bearing in the thrust bearing are powered on to enable the rotating shaft to move to a preset radial position, such that the thrust disc of the thrust bearing moves to a preset axial position.

The step of powering on the static-pressure bearings includes: powering on a magnetic bearing in the corresponding bearing, and/or conveying a gas to a static-pressure intake throttle hole in the bearing.

In S202, after a rotating speed of the rotating shaft is accelerated to a first preset value, the static-pressure bearing in the radial bearing and the static-pressure bearing in the thrust bearing are powered off.

The first preset value may be 5% to 30% of a rated rotating speed.

The step of powering off the static-pressure bearings includes: powering off a magnetic bearing in the corresponding bearing, and/or stopping conveying a gas to the static-pressure intake throttle hole in the bearing.

In S203, when the rotor system is accelerated to a first-order critical speed or a second-order critical speed, the static-pressure bearing in the radial bearing and the static-pressure bearing in the thrust bearing are powered on.

In S204, after the rotor system smoothly passes the first-order critical speed or the second-order critical speed, the static-pressure bearing in the radial bearing and the static-pressure bearing in the thrust bearing are powered off.

In S205, when the rotor system is decelerated to the first-order critical speed or the second-order critical speed, the static-pressure bearing in the radial bearing and the static-pressure bearing in the thrust bearing are powered on.

In S206, after the rotor system smoothly passes the first-order critical speed or the second-order critical speed, the static-pressure bearing in the radial bearing and the static-pressure bearing in the thrust bearing are powered off.

In S207, when the rotating speed of the rotating shaft is decelerated to a second preset value, the static-pressure bearing in the radial bearing and the static-pressure bearing in the thrust bearing are powered on.

The second preset value may be equal to or different from the first preset value, and the second preset value may be 5% to 30% of the rated rotating speed.

In S208, after the rotating speed of the rotating shaft is decelerated to zero, the static-pressure bearing in the radial bearing and the static-pressure bearing in the thrust bearing are powered off.

In the above process, before the rotor system is started, the bearings in the rotor system are controlled, such that the static-pressure bearing in the radial bearing and the static-pressure bearing in the thrust bearing are powered on. In this way, the rotating shaft is lifted to a preset radial position by means of the static-pressure bearing in the radial bearing. The thrust disc is pushed to a preset axial position by means of the static-pressure bearing in the thrust bearing.

After the rotor system is started, the rotating speed of the rotating shaft gradually increases. When the rotating speed of the rotating shaft reaches the first preset value, for example, 5% to 30% of the rated rotating speed, the bearings in the rotor system are controlled, such that the static-pressure bearing in the radial bearing and the static-pressure bearing in the thrust bearing stop working. When the rotating speed of the rotating shaft reaches the first-order critical speed or the second-order critical speed, the bearings in the rotor system are controlled, such that the static-pressure bearing in the radial bearing and the static-pressure bearing in the thrust bearing are powered on again. After the rotating speed of the rotating shaft smoothly passes the first-order critical speed or the second-order critical speed, the bearings in the rotor system are controlled, such that the static-pressure bearing in the radial bearing and the static-pressure bearing in the thrust bearing stop working again.

During the shutdown of the rotor system, the rotating speed of the rotating shaft gradually decreases. When the rotating speed of the rotating shaft reaches the second-order critical speed or the first-order critical speed, the bearings in the rotor system are controlled, such that the static-pressure bearing in the radial bearing and the static-pressure bearing in the thrust bearing are powered on again. After the rotating speed of the rotating shaft smoothly passes the second-order critical speed or the first-order critical speed, the bearings in the rotor system are controlled, such that the static-pressure bearing in the radial bearing and the static-pressure bearing in the thrust bearing stop working again. When the rotating speed of the rotating shaft drops to a predetermined value, for example, 5% to 30% of the rated rotating speed, the bearings in the rotor system are controlled, such that the static-pressure bearing in the radial bearing and the static-pressure bearing in the thrust bearing are powered on again until the rotating speed drops to zero. Then, the bearings in the rotor system are controlled, such that the static-pressure bearing in the radial bearing and the static-pressure bearing in the thrust bearing stop working again.

In combination with the above content, the overall structure of the rotor system, the overall structure of the gas turbine generator set using the above-mentioned rotor system, the control method of the gas turbine generator set, and the control method of the rotor system as provided in this embodiment of the present disclosure will be understood clearly.

It should be noted that the thrust bearing and the radial bearing in the rotor system can adopt various structural forms. For a gas-magnetic hybrid thrust bearing, it may include a foil-type gas-magnetic hybrid thrust bearing or a slot-type gas-magnetic hybrid thrust bearing. For a gas-magnetic hybrid radial bearing, it may include a foil-type gas-magnetic hybrid radial bearing or a slot-type gas-magnetic hybrid radial bearing.

Various specific structural forms of the thrust bearings and the radial bearings in the rotor system and the specific control processes of the thrust bearings and the radial bearings in the entire rotor system control will be described in detail below with reference to the accompanying drawings.

Embodiment 9

FIGS. 28 to 31 are schematic structural diagrams of a foil-type gas-magnetic hybrid thrust bearing provided by this embodiment of the present disclosure.

As shown in FIGS. 28 to 31, the foil-type gas-magnetic hybrid thrust bearing 5100 includes: a first thrust disc 5101 which is fixedly connected to the rotating shaft 100; and a first stator 5102 and a second stator 5103 which are disposed on the rotating shaft 100 in a penetrating manner, and are arranged on two opposite sides of the first thrust disc 5101 respectively. Each of the first stator 5102 and the second stator 5103 includes a first magnetic bearing 5104 and a first foil bearing 5105. A plurality of first magnetic components is arranged on each first magnetic bearing 5104 in a circumferential direction. Each first foil bearing 5105 is provided with a second magnetic component capable of generating magnetic forces with the plurality of first magnetic components 5104. Each first foil bearing 5105 is arranged between the corresponding first magnetic bearing 5104 and the first thrust disc 5101 and has a first gap 5106 with the first thrust disc 5101. Each first foil bearing 5105 is movable in an axial direction of the rotating shaft 100 under the magnetic forces between the first magnetic components and the second magnetic component.

In this embodiment of the present disclosure, the first gap 5106 and the first magnetic bearing 5104 are arranged in the thrust bearing 5100, so that the thrust bearing 5100 forms a gas-magnetic hybrid thrust bearing.

When working, a gas bearing in the thrust bearing 5100 can cooperate with the first magnetic bearing 5104. When the thrust bearing 5100 is in a stable working state, it is supported by the gas bearing. When the thrust bearing 5100 is in an unstable working state, the first magnetic bearing 5104 is used to control and respond to the thrust bearing 5100 in a timely manner.

It can be seen that this embodiment of the present disclosure can improve the dynamic performance and stability of the thrust bearing, especially under high-speed operating conditions, and the thrust bearing has a strong anti-disturbance capability, thereby improving the bearing capability of the thrust bearing. The thrust bearing in this embodiment of the present disclosure can meet the requirements of a high-speed rotor system, for example, a gas turbine or a gas-turbine-combined generator set.

In this embodiment of the present disclosure, the outer diameters of the first thrust disc 5101, the first stator 5102, and the second stator 5103 may be the same. In addition, the structures of the first stator 5102 and the second stator 5103 may be completely the same.

When the rotor system in this embodiment of the present disclosure is applied to the gas turbine or the gas-turbine-combined generator set, the first stator 5102 and the second stator 5103 may be connected to a housing of the gas turbine through a connection member.

Optionally, the plurality of first magnetic components includes a plurality of first permanent magnets arranged on the first magnetic bearing 5104 in a circumferential direction. Alternatively, the plurality of first magnetic components includes a plurality of first electromagnets arranged on the first magnetic bearing 5104 in a circumferential direction. Each of the plurality of first electromagnets includes a first magnetic core 51041 arranged on the first magnetic bearing 5104, and a first coil 51042 wound on the first magnetic core.

In this embodiment of the present disclosure, when the foil-type gas-magnetic hybrid thrust bearing 5100 only requires the magnetic components to provide magnetic forces without the need for magnetic control, the first magnetic components are preferably first permanent magnets. When the foil-type gas-magnetic hybrid thrust bearing 5100 requires both magnetic forces and magnetic control, the first magnetic components are preferably first electromagnets.

When the first magnetic components are the first electromagnets, an electric current is introduced to the first coil 51042, such that the first magnetic core 51041 can generate a magnetic force. When electric currents in different intensities are introduced into the first coil 51042, the intensities of the magnetic forces generated by the first magnetic core 51041 are different accordingly. When electric currents in different directions are introduced into the first coil 51042, magnetic poles of the first magnetic core 51041 are different accordingly.

Since a silicon steel sheet or a coiled silicon steel sheet has physical characteristics such as high magnetic permeability and low eddy current loss, in a preferred embodiment of the present disclosure, the first magnetic core 51041 is formed by laminating a plurality of silicon steel sheets or coiled silicon steel sheets.

Optionally, the first magnetic bearing 5104 includes a first magnetic bearing pedestal 51043 and a first end cover 51045. The first magnetic bearing pedestal 51043 is arranged opposite to the first thrust disc 5101. The first magnetic bearing pedestal 51043 is provided with a plurality of first receiving grooves 51044 in a circumferential direction. A plurality of first magnetic components is arranged in the plurality of first receiving grooves 51044, and magnetic poles of the plurality of first magnetic components face a side where the first foil bearing 5105 is located. The first end cover 51045 is arranged on one side of the first magnetic bearing pedestal 51043 away from the first foil bearing 5105, and cooperates with the first foil bearing 5105 to fix the first magnetic components on the first magnetic bearing pedestal 51043. Since the silicon steel sheet or the coiled silicon steel sheet has physical characteristics such as high magnetic permeability and low eddy current loss, in a preferred embodiment of the present disclosure, the first magnetic bearing pedestal 51043 is formed by laminating a plurality of silicon steel sheets or coiled silicon steel sheets. The number of the first receiving grooves 51044 may be, but is not limited to, six or eight, and the first receiving grooves 51044 are uniformly formed in a circumferential direction of the first magnetic bearing pedestal 51043. In this way, the magnetic forces between the first magnetic bearing pedestal 51043 and the first foil bearing 5105 can be more uniform and stable. It should be noted that the plurality of first magnetic components may also be arranged on the first magnetic bearing pedestal 51043 in other manners, which will not be limited herein. The first end cover 51045 may be made of a non-magnetic material, preferably a hard aluminum material.

Optionally, the first foil bearing 5105 includes: a first foil bearing pedestal 51051 fixedly connected to the first magnetic bearing pedestal 51043; and a first foil 51052 and a second foil 51053 arranged on the first foil bearing pedestal 51051. The first foil 51052 is mounted on the first foil bearing pedestal 51051. The second foil 51053 is stacked on one side of the first foil 51052 close to the first thrust disc 5101. The second foil 51053 is a flat foil. The second magnetic component is arranged on the second foil 51053, so that the second foil 51053 is movable in an axial direction of the rotating shaft 100 by means of the magnetic forces between the first magnetic components and the second magnetic component. The first foil 51052 is an elastically deformable foil that is elastically deformable as the second foil 51053 moves.

The first foil bearing pedestal 51051 may be made of a non-magnetic material, and preferably a hard aluminum material. The first foil 51052 is an elastically deformable foil. In consideration of the fact that the magnetically conductive material is hard and brittle in nature, it is not suitable for being used as an elastically deformable foil. Therefore, the first foil 51052 is preferably a non-magnetic-conducting stainless steel strip.

In this embodiment of the present disclosure, the second foil 51053 is provided as a flat foil, which facilitates controlling a distance between the second foil 51053 and the first thrust disc 5101, or controlling the size of the first gap 5106. An elastically deformable foil is adopted as the first foil 51052, and has functions of: on the one hand, connecting the second foil 51053 and the first foil bearing pedestal 51051, and on the other hand, ensuring that the second foil 51053 is movable in the axial direction of the rotating shaft 100 relative to the first foil bearing pedestal 51051.

Optionally, the first foil 51052 is a wave-shaped elastically deformable foil. The first foil 51052 is an open loop with an opening. One end of the opening is a fixed end which is fixed on the first foil bearing pedestal 51051, and the other end of the opening is a movable end.

When the second foil 51053 moves in the axial direction of the rotating shaft 100, the waves on the first foil 51052 stretch or contract. The movable end moves in a circular circumferential direction.

In this embodiment of the present disclosure, the first foil 51052 is provided as a wave-shaped elastically deformable foil, which facilitates pushing the second foil 51053 to move in the axial direction of the rotating shaft 100 by using the stretching or contraction characteristic of the waves.

It should be noted that the shape of the first foil 51052 in this embodiment of the present disclosure is not limited to the wavy shape, and other shapes that can generate elastic deformation may also be applied to the first foil 51052 in this embodiment of the present disclosure.

Optionally, the second magnetic component includes a first magnetic material arranged on a side surface of the second foil 51053 close to the first magnetic bearing 5104.

The first magnetic material is distributed in strips on the second foil 51053 to form a plurality of strip-shaped magnetic portions. The plurality of strip-shaped magnetic portions is distributed radially or annularly.

Alternatively, the first magnetic components are distributed in dots on the second foil 51053.

The second foil 51053 is preferably made of a non-magnetic-conducting material. After the first magnetic material is sprayed to the surface of the second foil 51053 in a masked manner, the first magnetic material may be covered with a ceramic coating. The second foil 51053 may be made by sintering ceramic nanometer powder prepared from 40% of zirconia, 30% of a alumina, and 30% of magnesium aluminate spinel.

If the surface of the second foil 51053 is completely covered with the first magnetic material, the magnetic forces generated between the first magnetic material and the first magnetic components will be greatly increased, thereby likely causing the deformation of the second foil 51053. In view of this, in this embodiment of the present disclosure, by spraying the first magnetic material on the surface of the second foil 51053 in a masked manner, the first magnetic material is distributed in stripes or dots on the second foil 51053. The magnetic forces generated between the first magnetic material and the first magnetic components can be controlled within a reasonable range, thereby preventing the second foil 51053 from being deformed due to excessive magnetic forces.

Optionally, the foil-type gas-magnetic hybrid thrust bearing 5100 further includes a first sensor 5107. A sensor probe of the first sensor 5107 is arranged in the first gap 5106.

In this embodiment of the present disclosure, by providing the first sensor 5107, parameters at the first gap 5106, such as an air film pressure at the first gap 5106, can be detected in real time. In this way, the first magnetic bearing 5104 can actively control the thrust bearing 5100 according to the detection result of the first sensor 5107, and can achieve a higher control accuracy.

Optionally, the first sensor 5107 includes a first sensor cover 51071 and a first sensor probe 51072. A first end of the first sensor probe 51072 is connected to the first sensor cover 51071. The first sensor cover 51071 is fixed on the first magnetic bearing 5104. Each of the first magnetic bearing 5104 and the first foil bearing 5105 is provided with a through hole for the first sensor probe 51072 to pass through. A second end of the first sensor probe 51072 passes through the through hole in the first magnetic bearing 5104 and the through hole in the first foil bearing 5105 and extends to the first gap 5106. In addition, the second end of the first sensor probe 51072 is flush with one side of the first foil bearing 5105 close to the first thrust disc 5101.

In this embodiment of the present disclosure, the first sensor 5107 can be more stably arranged on the first magnetic bearing 5104 by means of the structural form and the mounting manner of the first sensor 5107. The second end of the first sensor probe 51072 is flush with the side of the first foil bearing 5105 close to the first thrust disc 5101. Therefore, on the one hand, the first sensor probe 51072 can be prevented from being touched by the first thrust disc 5101, thereby facilitating the protection of the first sensor probe 51072. On the other hand, an air film in the first gap 5106 will not be affected, without any disturbance.

Optionally, the first sensor 5107 is arranged between two adjacent first magnetic components.

In this embodiment of the present disclosure, each stator should be provided with at least one first sensor 5107, preferably one first sensor 5107. The first sensor 5107 is preferably arranged between two adjacent first magnetic components.

Optionally, the first sensor 5107 is any one or a combination of more of the followings:

a displacement sensor configured to detect a position of the first thrust disc 5101;

a pressure sensor configured to detect an air film pressure at the first gap 5106;

a speed sensor configured to detect a rotating speed of the first thrust disc 5101; and an acceleration sensor configured to detect a rotational acceleration of the first thrust disc 5101.

The specific control method when the foil-type gas-magnetic hybrid thrust bearing in this embodiment of the present disclosure (wherein, the first magnetic components in the first magnetic bearing are electromagnets) participates in the control process of the rotor system will be described in detail.

This embodiment of the present disclosure provides a control method of a foil-type gas-magnetic hybrid thrust bearing. The control method includes the following steps.

In S511, the first magnetic bearings in both the first stator and the second stator are powered on, and the first thrust disc is controlled to move in the axial direction of the rotating shaft under the magnetic forces of the plurality of first magnetic components, such that a first gap between the first thrust disc and the first foil bearing in the first stator is equal to a first gap between the first thrust disc and the first foil bearing in the second stator.

In S512, after a rotating speed of the rotating shaft is accelerated to a working speed, the first magnetic bearings in both the first stator and the second stator are powered off.

In S513, in the case that the rotor system is stopped, the first magnetic bearings in both the first stator and the second stator are powered on.

In S514, after the rotating speed of the rotating shaft is decelerated to zero, the first magnetic bearings in both the first stator and the second stator are powered off.

In the above process, after the first magnetic bearings are powered on, the first thrust disc reaches a predetermined position between the first stator and the second stator under the action of the first magnetic bearings. The first thrust disc has a first gap with each of the end surfaces of the first stator and the second stator.

As the rotating shaft rotates, the first thrust disc starts to rotate relative to the first stator and the second stator under the condition of being lubricated by airflow in the first gap to prevent wear. The specific process of powering on the first magnetic bearings is as follows: an electric current signal of a predetermined value is input to a first coil, and the first thrust disc reaches a predetermined position between the first stator and the second stator under the action of the first magnetic bearings.

As the rotating speed of the rotating shaft is increasing, the rotating speed of the first thrust disc accordingly increases synchronously. When the rotating speed of the rotating shaft reaches a working speed, an air film pressure generated by a dynamic-pressure gas bearing of the thrust bearing (the first gaps are formed between the first thrust disc and the first and second stators, that is, the dynamic-pressure gas bearing of the thrust bearing is formed) can stabilize the first thrust disc, and in this case, the first magnetic bearings can be powered off.

In the case that the rotor system is stopped, the first thrust disc decelerates as the rotating shaft decelerates. In order to keep the rotating shaft stable during the entire shutdown process of the rotor system, the first magnetic bearings are powered on when the rotor system is powered off, and the first magnetic bearing can be powered off after the first thrust disc is completely stopped.

This embodiment of the present disclosure further provides another control method of the foil-type gas-magnetic hybrid thrust bearing. The control method includes the following steps.

In S521, the first magnetic bearings in both the first stator and the second stator are powered on, and the first thrust disc is controlled to move in the axial direction of the rotating shaft under the magnetic forces of the plurality of first magnetic components, such that a first gap between the first thrust disc and the first foil bearing in the first stator is equal to a first gap between the first thrust disc and the first foil bearing in the second stator.

In S522, after the rotating speed of the rotating shaft is accelerated to a first preset value, the first magnetic bearings in both the first stator and the second stator are powered off.

In S523, when the rotating speed of the rotating shaft is decelerated to a second preset value, the first magnetic bearings in both the first stator and the second stator are powered on.

In S524, after the rotating speed of the rotating shaft is decelerated to zero, the first magnetic bearings in both the first stator and the second stator are powered off.

In the above process, after the first magnetic bearings are powered on, the first thrust disc reaches a predetermined position between the first stator and the second stator under the action of the first magnetic bearings. The first thrust disc has a first gap with each of the end surfaces of the first stator and the second stator.

As the rotating shaft rotates, the first thrust disc starts to rotate relative to the first stator and the second stator under the condition of being lubricated by airflow in the first gap to prevent wear. The specific process of powering on the first magnetic bearing is as follows: an electric current signal of a predetermined value is input to a first coil, and the first thrust disc reaches the predetermined position between the first stator and the second stator under the action of the first magnetic bearings.

As the rotating speed of the rotating shaft is increasing, the rotating speed of the first thrust disc accordingly increases synchronously. When the rotating speed of the rotating shaft reaches a first preset value, such as 5% to 30% of the rated rotating speed, an air film pressure generated by a dynamic-pressure gas bearing of the thrust bearing (the first gaps are formed between the first thrust disc and the first and second stators, that is, the dynamic-pressure gas bearing of the foil type gas-magnetic hybrid thrust bearing is formed) can stabilize the first thrust disc, and in this case, the first magnetic bearings can be powered off.

During the shutdown process of the rotor system, the first thrust disc decelerates as the rotating shaft decelerates. When the rotating speed of the rotating shaft is less than a second preset value, such as 5% to 30% of the rated rotating speed, the air film pressure generated by the dynamic-pressure gas bearing of the thrust bearing also decreases as the first thrust disc decelerates. Therefore, the first magnetic bearings need to be powered on to keep the first thrust disc stable, and the first magnetic bearings can be powered off until the first thrust disc is completely stopped.

Optionally, the method further includes: when a load is applied to the first thrust disc, moving the first thrust disc in the axial direction of the rotating shaft under the applied load, and when the first gap between the first thrust disc and the first foil bearing in the first stator is not equal to the first gap between the first thrust disc and the first foil bearing in the second stator, powering on the first magnetic bearings in both the first stator and the second stator; and when the first gap between the first thrust disc and the first foil bearing in the first stator is equal to the first gap between the first thrust disc and the first foil bearing in the second stator, powering off the first magnetic bearings in both the first stator and the second stator.

When the load is applied to the first thrust disc such that the first gap between the first thrust disc and the first foil bearing in the first stator or the second stator becomes smaller and approaches the first foil bearing on that side, a first sensor (the first sensor here is preferably a pressure sensor) obtains a signal that an air pressure increases. In this case, the first magnetic bearings need to be involved. The first magnetic bearings do not completely directly apply a magnetic force to the first thrust disc to move the first thrust disc to the first foil bearing on the other side, but use the magnetic force to move the first foil bearing on the other side in a direction away from the first thrust disc, so that the first gap between the first thrust disc and the first foil bearing on the other side is increased, thereby increasing the pressure on the side where the first gap becomes smaller. Thus, the weight of the load on the first thrust disc is adapted, and the airflow on the two first gaps is automatically redistributed. When the first thrust disc reaches a new balanced position, the first magnetic bearings stop working.

Specifically, if the first gap between the first thrust disc and the first foil bearing in the first stator is smaller than the first gap between the first thrust disc and the first foil bearing in the second stator, the first foil bearing in the second stator is controlled to move in the axial direction of the rotating shaft in a direction away from the first thrust disc under the magnetic forces between the plurality of first magnetic components and the second magnetic component.

If the first gap between the first thrust disc and the first foil bearing in the second stator is smaller than the first gap between the first thrust disc and the first foil bearing in the first stator, the first foil bearing in the first stator is controlled to move in the axial direction of the rotating shaft in a direction away from the first thrust disc under the magnetic forces between the plurality of first magnetic components and the second magnetic component.

Optionally, the step of, when the load is applied to the first thrust disc, moving the first thrust disc in the axial direction of the rotating shaft under the applied load, and when the first gap between the first thrust disc and the first foil bearing in the first stator is not equal to the first gap between the first thrust disc and the first foil bearing in the second stator, powering on the first magnetic bearings in both the first stator and the second stator, includes:

when a load is applied to the first thrust disc, moving the first thrust disc in the axial direction of the rotating shaft under the applied load, and when the first gap between the first thrust disc and the first foil bearing in the first stator is not equal to the first gap between the first thrust disc and the first foil bearing in the second stator, controlling the first magnetic bearings in both the first stator and the second stator to be powered on at a maximum power; or when a load is applied to the first thrust disc, moving the first thrust disc in the axial direction of the rotating shaft under the applied load, and when the first gap between the first thrust disc and the first foil bearing in the first stator is not equal to the first gap between the first thrust disc and the first foil bearing in the second stator, controlling the first magnetic bearings in both the first stator and the second stator to be powered on in a stroboscopic manner according to a preset frequency.

When an external impact disturbance occurs, the first thrust disc may quickly approach the first foil bearing on one side, possibly causing the first gap on that side to be excessively small instantly, such that the local gas velocity at the first gap on that side approaches or even reaches the velocity of sound, thereby causing the shock waves to generate an air hammer self-excitation phenomenon. The generation of shock waves will cause disturbances and chaos in the local gas flow. When the velocity of a fluid changes from a sonic speed to a subsonic speed, the pressure of the fluid drops significantly in steps. In this case, the first foil bearing on that side needs to actively "avoid" the first thrust disc, so that the first gap on that side is increased to maintain the airflow velocity within the subsonic range as much as possible, thereby maintaining its normal fluid pressure. Specifically, the first magnetic bearings in both the first stator and the second stator need to be controlled at the same time, so that the magnetic poles of the first magnetic bearings are excited with the same polarity. That is, a suction generated on a side where the first gap is reduced is configured to suck back the first foil bearing on that side, and a suction generated on a side where the first gap is increased is configured to pull back the first thrust disc. In this way, a magnetic force difference is generated by using the difference in the acting distances of the magnetic forces on both sides, so as to pull the first thrust disc to restore the first gaps between the first thrust disc and the first foil bearings on both sides to normal. Therefore, the first thrust disc returns to a balanced state again.

In the above process, by using the advantage that the first magnetic bearings are conveniently controlled in real time, the factors causing excessive offset of the first thrust disc caused by the unbalanced mass of the first thrust disc or the vortex of the first thrust disc are balanced actively, such that the first thrust disc is fixed within a certain extremely small range in the axial direction of the rotating shaft. In addition, during the acceleration of the first thrust disc, the position where the shock waves are generated (i.e., a portion where the linear velocity exceeds the velocity of sound) can be accurately positioned. By controlling the intensity and direction of the electric current of the first magnetic bearings, the first magnetic bearings generate opposite forces to balance the shock wave effect. After the shock waves are stable, the control strategy for the first magnetic bearings is adjusted again to fix the first thrust disc within an extremely small range in a most energy-saving manner.

In summary, this embodiment of the present disclosure has the following beneficial effects.

1. The electromagnetic bearings and the gas bearings cooperate with each other to improve the dynamic performance and stability of the bearings under high-speed running conditions and achieve a strong anti-disturbance capability, thereby improving the bearing capability of the bearings. Meanwhile, the electromagnetic bearings and the gas bearings adopt a parallel structure, thereby simplifying the structures, achieving a high degree of integration, being easy to machine, manufacture and operate, and improving the overall performance of the bearings. When the rotor system is started or stopped, the thrust disc of each bearing and the corresponding stator can be rotated in a gap between the bearings by using the electromagnetic bearings, thereby improving the low-speed performance of the bearings, prolonging the service life of the bearings, and improving the safety and reliability of the bearings and the entire system.

2. Compared with the conventional hydrodynamic-hydrostatic gas hybrid thrust bearing in which a static-pressure gas bearing and a dynamic-pressure gas bearing are combined, the foil-type gas-magnetic hybrid thrust bearing in this embodiment of the present disclosure has the advantage of fast response speed.

3. By providing the magnetic material on the foil, the foil can be appropriately deformed by the attraction of the magnetic poles of the electromagnetic bearings, thereby improving the maximum pressure on one side of a lubricating air film in the bearing, preventing the leakage of the lubricating airflow, improving the ability of the thrust disc to resist eccentric collision with the wall, and further improving the bearing capability of the bearings.

4. A lower-cost pressure sensor is used to collect changes in the air film pressure. The deformation of the foil is controlled by a simple control method to provide higher rotor damping, thereby improving the rotor stability. In addition, because the control method is simple, the machining accuracy of the bearings is not high.

Embodiment 10

FIGS. 32 to 38 are schematic structural diagrams of a slot-type gas-magnetic hybrid thrust bearing provided by this embodiment of the present disclosure.

As shown in FIGS. 32 to 38, the slot-type gas-magnetic hybrid thrust bearing 5200 includes: a second thrust disc 5201 fixedly connected to the rotating shaft 100 and provided with a third magnetic component; and a third stator 5202 and a fourth stator 5203 which are disposed on the rotating shaft 100 in a penetrating manner, and are arranged on two opposite sides of the second thrust disc 5201 respectively. Each of the third stator 5202 and the fourth stator 5203 includes a second magnetic bearing 5204. A plurality of fourth magnetic components capable of generating magnetic forces with the third magnetic component is arranged on each second magnetic bearing 5204 in a circumferential direction. Each second magnetic bearing 5204 has a second gap 5206 with the second thrust disc 5201. The second thrust disc 5201 is movable in the axial direction of the rotating shaft 100 under the magnetic forces between the third magnetic component and the plurality of fourth magnetic components. Second dynamic pressure generating grooves 5205 are formed in an end surface of the second thrust disc 5201 facing the third stator 5202 and the fourth stator 5203, or end surfaces of the third stator 5202 and the fourth stator 5203 facing the second thrust disc 5201.

In this embodiment of the present disclosure, the thrust bearing 5200 is provided with the second gap 5206 and the second magnetic bearings 5204, so that the thrust bearing 5200 forms a gas-magnetic hybrid thrust bearing.

When working, a gas bearing in the thrust bearing 5100 cooperates with the second magnetic bearings 5204. When the thrust bearing 5200 is in a stable working state, it is supported by the gas bearing. When the thrust bearing 5200 is in an unstable working state, the second magnetic bearings 5204 are used to control and respond to the thrust bearing 5200 in a timely manner.

It can be seen that this embodiment of the present disclosure can improve the dynamic performance and stability of the thrust bearing, especially under high-speed running conditions; and the thrust bearing has a strong anti-disturbance capability, thereby improving the bearing capability of the thrust bearing. The thrust bearing in this embodiment of the present disclosure can meet the requirements of a high-speed rotor system, for example, a gas turbine or a gas-turbine-combined generator set.

In this embodiment of the present disclosure, the outer diameters of the second thrust disc 5201, the third stator 5202, and the fourth stator 5203 may be the same. In addition, the structures of the third stator 5202 and the fourth stator 5203 may be completely the same.

When the rotor system in this embodiment of the present disclosure is applied to a gas turbine, the third stator 5202 and the fourth stator 5203 may be connected to a housing of the gas turbine through a connection member.

In this embodiment of the present disclosure, as the second thrust disc 5201 rotates, the flowing gas existing in the second gap 5206 is pressed into the second dynamic pressure generating grooves 5205, thereby generating a pressure for maintaining the second thrust disc 5201 in an axial direction in a non-contact manner. The intensity of the pressure generated by the second dynamic pressure generating grooves 5205 varies with angles, groove widths, groove lengths, groove depths, the number of grooves, and the flatness of the second dynamic pressure generating grooves 5205. In addition, the intensity of the pressure generated by the second dynamic pressure generating grooves 5205 is related to a rotating speed of the second thrust disc 5201 and the second gap 5206. The parameters of the second dynamic pressure generating grooves 5205 can be designed according to actual working conditions. The second dynamic pressure generating grooves 5205 may be formed on the third stator 5202 and the fourth stator 5203 by means of forging, rolling, etching or stamping. Alternatively, the second dynamic pressure generating grooves 5205 may be formed on the second thrust disc 5201 by means of forging, rolling, etching, or stamping.

Optionally, the plurality of fourth magnetic components includes a plurality of second permanent magnets which is arranged on the second magnetic bearing 5204 in a circumferential direction. Alternatively, the plurality of fourth magnetic components includes a plurality of second electromagnets which is arranged on the second magnetic bearing 5204 in a circumferential direction. Each of the plurality of second electromagnets includes a second magnetic core 52041 arranged on the second magnetic bearing 5204 and a second coil 52022 wound on the second magnetic core 52041.

In this embodiment of the present disclosure, when the slot-type gas-magnetic hybrid thrust bearing 5200 only needs the magnetic components to provide magnetic forces without the need for magnetic control, the fourth magnetic components are preferably second permanent magnets.

When the slot-type gas-magnetic hybrid thrust bearing 5200 needs both magnetic forces and magnetic control, the fourth magnetic components are preferably second electromagnets.

When the fourth magnetic components are second electromagnets, an electric current is introduced to the second coil 52042, such that the second magnetic core 52041 can generate a magnetic force. When electric currents in different intensities are introduced into the second coil 52042, the magnitudes of the magnetic force generated by the second magnetic core 52041 are different accordingly. When electric currents in different directions are introduced into the second coil 52042, magnetic poles of the second magnetic core 52041 are different accordingly.

Since a silicon steel sheet or coiled silicon steel sheet has physical characteristics such as high magnetic permeability and low eddy current loss, in a preferred embodiment of the present disclosure, the second magnetic core 52041 may be formed by laminating a plurality of silicon steel sheets or coiled silicon steel sheets.

Optionally, the second magnetic bearing 5204 includes a second magnetic bearing pedestal 52043, a second end cover 52045 and a first pressure ring 52046. The second magnetic bearing pedestal 52043 is arranged opposite to the second thrust plate 5201. The second magnetic bearing pedestal 52043 is provided with a plurality of second receiving grooves 52044 in a circumferential direction. A plurality of fourth magnetic components is provided in the plurality of second receiving grooves 52044. Magnetic poles of the plurality of fourth magnetic components face a side where the second thrust disc 5201 is located. The second end cover 52045 is arranged on one side of the second magnetic bearing pedestal 52043 away from the second thrust disc 5201. The first pressure ring 52046 is arranged on one side of the second magnetic bearing pedestal 52043 close to the second thrust disc 5201. The second end cover 52045 cooperates with the first pressure ring 52046 to fix the plurality of fourth magnetic components on the second magnetic bearing pedestal 52043.

Since the silicon steel sheet or coiled silicon steel sheet has physical characteristics such as high magnetic permeability and low eddy current loss, in a preferred embodiment of the present disclosure, the second magnetic bearing pedestal 52043 may be formed by laminating a plurality of silicon steel sheets or coiled silicon steel sheets. The number of the second receiving grooves 52044 may be, but is not limited to, six or eight, and the second receiving grooves 52044 are uniformly formed in a circumferential direction of the second magnetic bearing pedestal 52043. In this way, the magnetic forces between the second magnetic bearing 5204 and the second thrust disc 5201 can be more uniform and stable. It should be noted that the plurality of fourth magnetic components may also be arranged on the second magnetic bearing pedestal 52043 in other manners, which will not be limited herein. The second end cover 52045 may be made of a non-magnetic material, preferably a hard aluminum material. The first pressing ring 52046 may be made of a non-magnetic material, preferably the hard aluminum material.

In this embodiment of the present disclosure, second dynamic pressure generating grooves 5205 may be formed in the first pressure ring 52046. To facilitate the machining of the second dynamic pressure generating grooves 5205, the first pressure ring 52046 may be made of stainless steel.

Optionally, the third magnetic component includes a second magnetic material (not shown in drawings) provided on the end surface of the second thrust disc 5201 facing the third stator 5202 and the fourth stator 5203. The second magnetic material is distributed in strips on the second thrust disc 5201 to form a plurality of strip-shaped magnetic portions which is distributed radially or annularly. Alternatively, the second magnetic components are distributed in dots on the second thrust disc 5201.

In this embodiment of the present disclosure, the second magnetic material is distributed in strips or dots on the second thrust disc 5201, such that the magnetic forces generated between the second magnetic material and the fourth magnetic components can be controlled within a reasonable range.

Optionally, the second dynamic pressure generating grooves 5205 are arranged in a radial or concentric circle shape. In this way, an air film is more evenly distributed in the second gap 5206.

Optionally, each second dynamic pressure generating groove 5205 includes a first spiral groove 52051 and a second spiral groove 52052. The first spiral groove 52051 surrounds the second spiral groove 52052. The spiral directions of the first spiral groove 52051 and the second spiral groove 52052 are opposite. One end of the first spiral groove 52051 close to the second spiral groove 52052 is connected to or disconnected from one end of the second spiral groove 52052 close to the first spiral groove 52051.

A distance between one end of the first spiral groove 52051 close to the second spiral groove 52052 and the axis of the rotating shaft 100 is equal to a distance between one end of the first spiral groove 52051 close to the second spiral groove 52052 and a peripheral edge of the third stator 5202 or the fourth stator 5203 or the second thrust disc 5201. Alternatively, a distance between one end of the second spiral groove 52052 close to the first spiral groove 52051 and the axis of the rotating shaft 100 is equal to a distance between one end of the second spiral groove 52052 close to the first spiral groove 52051 and a peripheral edge of the third stator 5202 or the fourth stator 5203 or the second thrust disc 5201.

In this embodiment of the present disclosure, by means of the arrangement manner of the second dynamic pressure generating grooves 5205 as described above, the second thrust disc 5201 can be held by a non-contact way in a desired manner in the case that the rotating shaft 100 rotates forward or backward. Therefore, the rotating shaft 100 has the advantages of high load capacity and good stability.

Optionally, each of the third stator 5202 and the fourth stator 5203 is further provided with first static-pressure intake throttle holes 5208. One end of each first static-pressure intake throttle hole 5208 is communicated with the second gap 5206, and the other end of the first static-pressure intake throttle hole 5208 is connected to an external gas source so as to convey the external gas source into the second gap 5206.

In this embodiment of the present disclosure, a static-pressure gas bearing can be formed by providing the first static-pressure intake throttle holes 5208, and thus the thrust bearing 5200 can form a hydrodynamic-hydrostatic gas and magnetic hybrid thrust bearing. A flow diameter of each first static-pressure intake throttle hole 5208 may be adjusted according to the actual working conditions such as the demand for air volume.

Optionally, each of the third stator 5202 and the fourth stator 5203 is provided with a plurality of first static-pressure intake throttle holes 5208. The plurality of first static-pressure intake throttle holes 5208 is arranged at intervals in a circumferential direction of each stator.

In this embodiment of the present disclosure, the plurality of first static-pressure intake throttle holes 5208 is arranged at intervals in the circumferential direction of each stator, and is preferably arranged at even intervals in the circumferential direction of the stator. In this way, the air film pressure in the second gap 5206 is more uniform.

Optionally, in the third stator 5202 and the fourth stator 5203, a distance between each first static-pressure intake throttle hole 5208 and the axis of the rotating shaft 100 is greater than or equal to a distance between the first static-pressure intake throttle hole 5208 and the peripheral edge of each stator.

In this embodiment of the present disclosure, by means of the arrangement manner of the first static-pressure intake throttle holes 5208 as described above, the static-pressure gas bearing is more stable. If the static-pressure intake throttle holes are excessively close to the axis of the rotating shaft 100, an air film cannot be distributed over the entire end surface of the second thrust disc 5201 in a timely and effective manner, such that the rotation of the second thrust disc 5201 is not stable enough. Preferably, the distance between each first static-pressure intake throttle hole 5208 and the axis of the rotating shaft 100 is equal to the distance between the first static-pressure intake throttle hole 5208 and the peripheral edge of each stator.

Optionally, the slot-type gas-magnetic hybrid thrust bearing 5200 further includes a second sensor 5207. A sensor probe of the second sensor 5207 is arranged in the second gap 5206.

In this embodiment of the present disclosure, by providing the second sensor 5207, parameters at the second gap 5206, such as an air film pressure at the second gap 5206 can be detected in real time. In this way, the second magnetic bearing 5204 can actively control the thrust bearing 5200 according to the detection result of the second sensor 5207, and can achieve a higher control accuracy.

Optionally, the second sensor 5207 includes a second sensor cover 52071 and a second sensor probe 52072. A first end of the second sensor probe 52072 is connected to the second sensor cover 52071. The second sensor cover 52071 is fixed on the second magnetic bearing 5204. The second magnetic bearing 5204 is provided with a through hole allowing the second sensor probe 52072 to pass through. A second end of the second sensor probe 52072 passes through the through hole in the second magnetic bearing 5204 and extends to the second gap 5206. In addition, the second end of the second sensor probe 52072 is flush with the side of the second magnetic bearing 5204 close to the second thrust disc 5201.

In this embodiment of the present disclosure, the second sensor 5207 can be more stably arranged on the second magnetic bearing 5204 by means of the structural form and the mounting manner of the second sensor 5207. Moreover, the second end of the second sensor probe 52072 is flush with the side of the second magnetic bearing 5204 close to the second thrust disc 5201. Therefore, on the one hand, the second sensor probe 52072 can be prevented from being touched by the second thrust disc 5201, thereby protecting the second sensor probe 52072. On the other hand, the air film in the second gap 5206 will not be affected, without any disturbance.

Optionally, the second sensor 5207 is arranged between two adjacent fourth magnetic components.

In this embodiment of the present disclosure, each stator should be provided with at least one second sensor 5207, and preferably one second sensor 5207. The second sensor 5207 is preferably arranged between two adjacent fourth magnetic components.

Optionally, the second sensor 5207 is any one or a combination of more of the followings:

a displacement sensor configured to detect a position of the second thrust disc 5201;

a pressure sensor configured to detect an air film pressure at the second gap 5206;

a speed sensor configured to detect a rotating speed of the second thrust disc 5201; and an acceleration sensor configured to detect a rotational acceleration of the second thrust disc 5201.

The specific control method when the slot-type gas-magnetic hybrid thrust bearing in this embodiment of the present disclosure (in which the fourth magnetic components in the second magnetic bearing are electromagnets) participates in the control process of the rotor system will be described below in detail.

This embodiment of the present disclosure further provides a control method of a slot-type gas-magnetic hybrid thrust bearing. The control method includes the following steps.

In S531, the second magnetic bearings in both the third stator and the fourth stator are powered on, and the second thrust disc is controlled to move in the axial direction of the rotating shaft under the magnetic forces between the third magnetic component and the plurality of fourth magnetic components, such that a difference between a second gap between the second thrust disc and the second magnetic bearing in the third stator and a second gap between the second thrust disc and the second magnetic bearing in the fourth stator is less than or equal to a predetermined value.

In S532, after a rotating speed of the rotating shaft is accelerated to a working speed, the second magnetic bearings in both the third stator and the fourth stator are powered off.

In S533, in the case that the rotor system is stopped, the second magnetic bearings in the third stator and the second stator are powered on.

In S534, after the rotating speed of the rotating shaft is decelerated to zero, the second magnetic bearings in both the third stator and the fourth stator are powered off.

In the above process, after the second magnetic bearings are powered on, the second thrust disc reaches a predetermined position between the third stator and the fourth stator under the action of the second magnetic bearings. The second thrust disc has a second gap with each of the end faces of the third stator and the fourth stator.

As the rotating shaft rotates, the second thrust disc starts to rotate relative to the third stator and the fourth stator under the condition of being lubricated by airflow in the second gap to prevent wear. The specific process of powering on the second magnetic bearings is as follows: an electric current signal of a predetermined value is input to a second coil, and the second thrust disc reaches the predetermined position between the third stator and the fourth stator under the action of the second magnetic bearings.

As the rotating speed of the rotating shaft is increasing, the rotating speed of the second thrust disc also increases synchronously. When the rotating speed of the rotating shaft reaches a working speed, an air film pressure generated by a dynamic-pressure gas bearing in the thrust bearing (the second gaps are formed between the second thrust disc and the third and fourth stators, that is, the dynamic-pressure gas bearing in the thrust bearing is formed) can stabilize the second thrust disc, and in this case, the second magnetic bearing can be powered off.

In the case that the rotor system is stopped, the second thrust disc decelerates as the rotating shaft decelerates. In order to keep the rotating shaft stable during the entire shutdown process of the rotor system, the second magnetic bearings are powered on when the rotor system is powered off, and the second magnetic bearings can be powered off after the second thrust disc is completely stopped.

This embodiment of the present disclosure further provides a control method of another slot-type gas-magnetic hybrid thrust bearing. The method includes the following steps.

In S541, the second magnetic bearings in both the third stator and the fourth stator are powered on, and the second thrust disc is controlled to move in the axial direction of the rotating shaft under the magnetic forces between the third magnetic component and the plurality of fourth magnetic components, such that a difference between a second gap between the second thrust disc and the second magnetic bearing in the third stator and a second gap between the second thrust disc and the second magnetic bearing in the fourth stator is less than or equal to a predetermined value.

In S542, after a rotating speed of the rotating shaft is accelerated to a first preset value, the second magnetic bearings in both the third stator and the fourth stator are powered off.

In S543, when the rotating speed of the rotating shaft is decelerated to a second preset value, the second magnetic bearings in both the third stator and the fourth stator are powered on.

In S544, after the rotating speed of the rotating shaft is decelerated to zero, the second magnetic bearings in both the third stator and the fourth stator are powered off.

In the above process, after the second magnetic bearings are powered on, the second thrust disc reaches a predetermined position between the third stator and the fourth stator under the action of the second magnetic bearings. The second thrust disc has a second gap with each of the end faces of the third stator and the fourth stator. As the rotating shaft rotates, the second thrust disc starts to rotate relative to the third stator and the fourth stator under the condition of being lubricated by airflow in the second gap to prevent wear. The specific process of powering on the second magnetic bearings is as follows: an electric current signal of a predetermined value is input to a second coil, and the second thrust disc reaches the predetermined position between the third stator and the fourth stator under the action of the second magnetic bearings.

As the rotating speed of the rotating shaft is increasing, the rotating speed of the second thrust disc accordingly increases synchronously. When the rotating speed of the rotating shaft reaches a second preset value, such as 5% to 30% of the rated rotating speed, an air film pressure generated by a dynamic-pressure gas bearing in the thrust bearing (the second gaps are formed between the second thrust disc and the third and fourth stators, that is, the dynamic-pressure gas bearing in the foil-type gas-magnetic hybrid thrust bearing is formed) can stabilize the second thrust disc, and in this case, the second magnetic bearings can be powered off.

During the shutdown process of the rotor system, the second thrust disc decelerates as the rotating shaft decelerates. When the rotating speed of the rotating shaft is less than a second preset value, such as 5% to 30% of the rated rotating speed, the air film pressure generated by the dynamic-pressure gas bearing in the thrust bearing also decreases as the second thrust disc decelerates. Therefore, the second magnetic bearings need to be powered on to keep the second thrust disc stable, and the second magnetic bearings can be powered off until the second thrust disc is completely stopped.

Optionally, the method further includes:

when a load is applied to the second thrust disc, moving the second thrust disc in the axial direction of the rotating shaft under the applied load, and when a difference between the second gap between the second thrust disc and the second magnetic bearing in the third stator and the second gap between the second thrust disc and the second magnetic bearing in the fourth stator is greater than a predetermined value, powering on the second magnetic bearing in the third stator or the fourth stator; and when the difference between the second gap between the second thrust disc and the second magnetic bearing in the third stator and the second gap between the second thrust disc and the second magnetic bearing in the fourth stator is less than or equal to the predetermined value, powering off the second magnetic bearing in the third stator or the fourth stator.

When the load is applied to the second thrust disc such that the second gap between the second thrust disc and the second magnetic bearing in the third stator or the fourth stator becomes smaller and approaches the second magnetic bearing on that side, a second sensor (the second sensor here is preferably a pressure sensor) obtains a signal that an air pressure increases. At this time, the second magnetic bearings need to be involved. The second magnetic bearing applies a magnetic force to the second thrust disc to move the second thrust disc to the second magnetic bearing on the other side. When the second thrust disc reaches a new balanced position, the second magnetic bearing stops working.

Specifically, if the second gap between the second thrust disc and the second magnetic bearing in the third stator is smaller than the second gap between the second thrust disc and the second magnetic bearing in the fourth stator, and the difference between the second gap between the second thrust disc and the second magnetic bearing in the third stator and the second gap between the second thrust disc and the second magnetic bearing in the fourth stator is greater than the predetermined value, the second magnetic bearing in the fourth stator is controlled to move in the axial direction of the rotating shaft in a direction away from the fourth stator under the magnetic forces between the third magnetic component and the plurality of fourth magnetic components.

If the second gap between the second thrust disc and the second magnetic bearing in the fourth stator is smaller than the second gap between the second thrust disc and the second magnetic bearing in the third stator, and the difference between the second gap between the second thrust disc and the second magnetic bearing in the third stator and the second gap between the second thrust disc and the second magnetic bearing in the fourth stator is greater than the predetermined value, the second magnetic bearing in the third stator is controlled to move the second thrust disc in the axial direction of the rotating shaft in a direction away from the third stator under the magnetic forces between the third magnetic component and the plurality of fourth magnetic components.

Optionally, the step of, when the load is applied to the second thrust disc, moving the second thrust disc in the axial direction of the rotating shaft under the applied load, and when the difference between the second gap between the second thrust disc and the second magnetic bearing in the third stator and the second gap between the second thrust disc and the second magnetic bearing in the fourth stator is greater than the predetermined value, powering on the second magnetic bearing in the third stator or the fourth stator, includes:

when a load is applied to the second thrust disc, moving the second thrust disc in the axial direction of the rotating shaft under the applied load, and when the difference between the second gap between the second thrust disc and the second magnetic bearing in the third stator and the second gap between the second thrust disc and the second magnetic bearing in the fourth stator is greater than the predetermined value, controlling the second magnetic bearing in the third stator or the fourth stator to be powered on at a maximum power; or when a load is applied to the second thrust disc, moving the second thrust disc in the axial direction of the rotating shaft under the applied load, and when the difference between the second gap between the second thrust disc and the second magnetic bearing in the third stator and the second gap between the second thrust disc and the second magnetic bearing in the fourth stator is greater than the predetermined value, controlling the second magnetic bearing in the third stator or the fourth stator to be powered on in a stroboscopic manner.

When an external impact disturbance occurs, the second thrust disc may quickly approach the second foil bearing on one side, possibly causing the second gap on that side to be excessively small instantly. As a result, the local gas velocity at the second gap on that side approaches or even reaches the velocity of sound, thereby causing the shock waves to generate an air hammer self-excitation phenomenon. The generation of shock waves will cause disturbances and chaos in the local gas flow. When the velocity of a fluid changes from a sonic speed to a subsonic speed, the pressure of the fluid drops significantly in steps. In this case, it is necessary to control the second magnetic bearing in the third stator or the fourth stator to be powered on at a maximum power, or control the second magnetic bearing in the third stator or the fourth stator to be powered on in turn in a stroboscopic manner according to a preset frequency to provide a damping effect on the disturbance, thereby effectively suppressing the external disturbance. When the second thrust disc returns to the balanced state again, the second magnetic bearing stops working.

It should be noted that, in this embodiment of the present disclosure, in the case that an electromagnetic bearing (the fourth magnetic components in each second magnetic bearing are electromagnets, that is, the electromagnetic bearing is formed) and a static-pressure gas bearing (first static-pressure intake throttle holes are formed in the third stator and the fourth stator, that is, the static-pressure gas bearing is formed) are provided at the same time, the electromagnetic bearing and the static-pressure gas bearing can back up each other. In the event that one of them breaks down, or has a fault, or cannot meet the powering-on conditions, the other can serve as a backup bearing to play the same role. For example, when it is detected that the electromagnetic bearing breaks down, the external gas source is controlled to be opened to perform corresponding actions instead of the electromagnetic bearing, thereby improving the safety and reliability of the bearings.

In this embodiment of the present disclosure, the step of "powering on the static-pressure bearings in the thrust bearing to move the thrust disc of the thrust bearing to a preset axial position" in the case that the electromagnetic bearing and the static-pressure gas bearing are provided at the same time may include the following implementations manners:

powering on the second magnetic bearings in both the third stator and the fourth stator; and/or starting an external gas source, and conveying a gas to the second gap via the first static-pressure intake throttle holes; and controlling the second thrust disc to move in the axial direction of the rotating shaft under the magnetic forces between the third magnetic component and the fourth magnetic components, and/or under the pushing action of the gas, such that the difference between the second gap between the second thrust disc and the second magnetic bearing in the third stator and the second gap between the second thrust disc and the second magnetic bearing in the fourth stator is less than or equal to a predetermined value.

In the above process, by using the advantage that the second magnetic bearings are conveniently controlled in real time, the factors causing excessive offset of the second thrust disc caused by the unbalanced mass of the second thrust disc or the vortex of the second thrust disc are balanced actively, such that the second thrust disc is fixed within a certain extremely small range in the axial direction of the rotating shaft. In addition, during the acceleration process of the second thrust disc, the position where the shock waves are generated (that is, a portion where the linear velocity exceeds the velocity of sound) can be accurately positioned. By controlling the magnitude and direction of the electric current of the second magnetic bearings, the second magnetic bearings generate opposite forces to balance the shock wave effect. After the shock waves are stable, the control strategy of the second magnetic bearings is adjusted again to fix the second thrust disc within an extremely small range in a most energy-saving manner.

In summary, this embodiment of the present disclosure has the following beneficial effects.

1. The electromagnetic bearing and the gas bearing cooperate with each other to improve the dynamic performance and stability of the bearings under high-speed running conditions. Meanwhile, the electromagnetic bearing and the gas bearing adopt a parallel structure, thereby simplifying the structures, achieving a high degree of integration, being easy to machine, manufacture and operate, and improving the overall performance of the bearings. When the rotor system is started or stopped, the thrust disc of the bearing and the stator can be rotated in the second gap between the bearings by using the electromagnetic bearing, thereby improving the low-speed performance of the bearings, prolonging the service life of the bearings, and improving the safety and reliability of the bearings and the entire system.

2. Compared with the conventional hydrodynamic-hydrostatic gas hybrid thrust bearing in which the static-pressure gas bearing and the dynamic-pressure gas bearing are combined, the slot-type gas-magnetic hybrid thrust bearing in this embodiment of the present disclosure has the advantage of fast response speed.

3. The static-pressure gas bearing is provided additionally to form the slot-type hydrodynamic-hydrostatic gas and magnetic hybrid thrust bearing. In the case that the electromagnetic bearing and the static-pressure gas bearing are provided at the same time, the bearing capability of the bearings is further increased. The electromagnetic bearing and the static-pressure gas bearing can back up each other. In the event that one of them beaks down, or has a fault, or cannot meet the powering-on conditions, the other can serve as a backup bearing to play the same role. For example, when it is detected that the electromagnetic bearing breaks down, the static-pressure gas bearing is controlled to be powered on by a control system to perform corresponding actions instead of the electromagnetic bearing, thereby improving the safety and reliability of the bearings.

Embodiment 11

FIGS. 39 to 46 are schematic structural diagrams of a slot-type gas-magnetic hybrid radial bearing provided by this embodiment of the present disclosure.

As shown in FIGS. 39 to 46, the slot-type gas-magnetic hybrid radial bearing 6200 includes: a fourth magnetic bearing 6201 arranged on the rotating shaft 100 in a sleeving manner and provided with a plurality of seventh magnetic components in a circumferential direction. Third dynamic pressure generating grooves 6202 are formed in a sidewall of the fourth magnetic bearing 6201 facing the rotating shaft 100, or a circumferential surface of the rotating shaft 100 facing the fourth magnetic bearing 6201. The fourth magnetic bearing 6201 has a fourth gap 6203 with the rotating shaft 100, and the rotating shaft 100 is movable in the radial direction of the rotating shaft 100 under magnetic forces of the plurality of seventh magnetic components.

In this embodiment of the present disclosure, the radial bearing 6200 is provided with the fourth gap 6203 and the fourth magnetic bearing 6201 inside, so that the radial bearing 6200 forms a gas-magnetic hybrid radial bearing.

When working, a gas bearing in the radial bearing 6200 cooperate with the fourth magnetic bearing 6201. When the radial bearing 6200 is in a stable working state, it is supported by the gas bearing. When the radial bearing 6200 is in an unstable working state, the fourth magnetic bearing 6201 is used to control and respond to the radial bearing 6200 in a timely manner.

It can be seen that this embodiment of the present disclosure can improve the dynamic performance and stability of the radial bearing, especially under high-speed running conditions; and the radial bearing has a strong anti-disturbance capability, thereby improving the bearing capability of the radial bearing. The radial bearing in this embodiment of the present disclosure can meet the requirements of a high-speed rotor system, for example, a gas turbine or a gas-turbine-combined generator set.

In this embodiment of the present disclosure, since a silicon steel sheet or a coiled silicon steel sheet has physical characteristics such as high magnetic permeability and low eddy current loss, the rotating shaft 100 may be formed by laminating a plurality of silicon steel sheets or coiled silicon steel sheets.

In this embodiment of the present disclosure, as the rotating shaft 100 rotates, a flowing gas existing in the fourth gap 6203 is pressed into the third dynamic pressure generating grooves 6202 to generate a pressure, such that the rotating shaft 100 floats up to maintain the rotating shaft 100 by a non-contact way in a radial direction. The intensity of the pressure generated by the third dynamic pressure generating grooves 6202 varies with angles, groove widths, groove lengths, groove depths, the number of grooves, and the flatness of the third dynamic pressure generating grooves 6202. In addition, the intensity of the pressure generated by the third dynamic pressure generating grooves 6202 is related to a rotating speed of the rotating shaft 100 and the fourth gap 6203. The parameters of the third dynamic pressure generating grooves 6202 can be designed according to actual working conditions. The third dynamic pressure generating grooves 6202 may be formed on the fourth stator 6202 or the rotating shaft by means of forging, rolling, etching or stamping.

Optionally, the plurality of seventh magnetic components includes a plurality of fourth permanent magnets arranged on the fourth magnetic bearing 6201 in a circumferential direction. Alternatively, the plurality of seventh magnetic components includes a plurality of fourth electromagnets arranged on the fourth magnetic bearing 6201 in a circumferential direction. Each of the plurality of fourth electromagnets includes a fourth magnetic core 62011 arranged on the fourth magnetic bearing 6201 and a fourth coil 62012 wound on the fourth magnetic core 62011.

In this embodiment of the present disclosure, when the slot-type gas-magnetic hybrid radial bearing 6200 only needs the magnetic components to provide magnetic forces without the need for magnetic control, the seventh magnetic components are preferably fourth permanent magnets. When the foil-type gas-magnetic hybrid thrust bearing needs both magnetic forces and magnetic control, the seventh magnetic components are preferably fourth electromagnets.

When the seventh magnetic components are the fourth electromagnets, an electric current is introduced to the fourth coil 62012, such that the fourth magnetic core 62011 can generate a magnetic force. When electric currents in different intensities are introduced into the fourth coil 62012, the magnitudes of the magnetic force generated by the fourth magnetic core 62011 are different accordingly. When electric currents in different directions are introduced into the fourth coil 62012, magnetic poles of the fourth magnetic core 62011 are different accordingly.

Since the silicon steel sheet or coiled silicon steel sheet has physical characteristics such as high magnetic permeability and low eddy current loss, in a preferred embodiment of the present disclosure, the fourth magnetic core 62011 is formed by laminating a plurality of silicon steel sheets or coiled silicon steel sheets.

Optionally, the fourth magnetic bearing 6201 includes: a fourth magnetic bearing pedestal 62013, a second bearing shell 62015, a second bearing sleeve 62016, a fifth end cover 62017 and a sixth end cover 62018. The fourth magnetic bearing pedestal 62013 is arranged on the rotating shaft 100 in a sleeving manner. The fourth magnetic bearing pedestal 62013 is provided with a plurality of fourth receiving grooves 62014 in a circumferential direction. The plurality of seventh magnetic components is arranged in the plurality of fourth receiving grooves 62014. In addition, the magnetic poles of the plurality of seventh magnetic components face the rotating shaft 100. The second bearing shell 62015 is arranged outside the fourth magnetic bearing shell 62013 in a sleeving manner. The second bearing sleeve 62016 is arranged between the fourth magnetic bearing pedestal 62013 and the rotating shaft 100 in a sleeving manner. The fifth end cover 62017 and the sixth end cover 62018 are respectively arranged at both ends of the second bearing shell 62015. The second bearing sleeve 62016, the fifth end cover 62017 and the sixth end cover 62018 cooperate to fix the plurality of seventh magnetic components on the fourth magnetic bearing pedestal 62013.

In this embodiment of the present disclosure, the gap between the fourth magnetic core 62011 and the fourth coil 62012 can be sealed by the second bearing sleeve 62016, thereby forming a stable and uniform air film pressure between the second bearing sleeve 62016 and the rotating shaft 100. In addition, the sizes of the fourth gap 6203 can be adjusted and controlled conveniently by providing the second bearing sleeves 62016 with different radial thicknesses.

The width of the fourth gap 6203 between the second bearing sleeve 62016 and the rotating shaft 100 may be 5 μm to 12 μm, and preferably 8 μm to 10 μm.

Since the silicon steel sheet or coiled silicon steel sheet has physical characteristics such as high magnetic permeability and low eddy current loss, in a preferred embodiment of the present disclosure, the fourth magnetic bearing pedestal 62013 may be formed by laminating a plurality of silicon steel sheets or coiled silicon steel sheets. The number of the fourth receiving grooves 62014 may be, but is not limited to, six or eight, and the fourth receiving grooves 62013 are uniformly arranged in the circumferential direction of the fourth magnetic bearing pedestal 62013. In this way, the magnetic forces between the fourth magnetic bearing 6201 and the rotating shaft 100 can be more uniform and stable. It should be noted that the plurality of seventh magnetic components may also be arranged on the fourth magnetic bearing pedestal 52043 in other manners, which will not be limited herein. The fifth end cover 62017 and the sixth end cover 62018 may be made of a non-magnetic material, preferably a hard aluminum material. The second bearing sleeve 62016 may be made of a non-magnetic material, preferably a hard aluminum material. The second bearing shell 62015 may be made of a non-magnetic material, preferably a hard aluminum material.

Preferably, each of the fifth end cover 62017 and the sixth end cover 62018 is provided with a boss having the same outer diameter as the inner diameter of the second bearing shell 62015. The bosses on the fifth end cover 62017 and the sixth end cover 62018 are used for fixing and pressing the silicon steel sheets or the coiled silicon steel sheets constituting the fourth magnetic bearing pedestal 62013 from both ends.

In this embodiment of the present disclosure, third dynamic pressure generating grooves 6202 may be formed in the second bearing sleeve 62016. To facilitate the machining of the third dynamic pressure generating grooves 6202, the second bearing sleeve 62016 may be made of stainless steel. Specifically, the third dynamic pressure generating grooves 6202 may be formed in the middle portion of the rotating shaft 100 corresponding to the circumferential surface of the second bearing sleeve 62016, or may be provided as two parts of mutually independent third dynamic pressure generating grooves 6202 that are symmetrically distributed on both sides of the middle portion. The third dynamic pressure generating grooves 6202 may also be formed in the middle portion on the inner wall of the second bearing sleeve 62016, or may be provided as two parts of mutually independent third dynamic pressure generating grooves 6202 that are symmetrically distributed on both ends of the inner wall of the second bearing sleeve 62016.

Optionally, the third dynamic pressure generating grooves 6202 are arranged in a matrix. In this way, an air film is more evenly distributed in the fourth gap 6203.

Optionally, the third dynamic pressure generating grooves 6202 are V-shaped grooves provided continuously or at intervals.

In this embodiment of the present disclosure, by means of the arrangement manner of the third dynamic pressure generating grooves 6202 as described above, the rotating shaft can be held non-contactably in a desired manner in the case where the rotating shaft 100 rotates forward or backward. Therefore, the rotating shaft 100 has the advantages of high load capacity and good stability. The third dynamic pressure generating grooves 6202 may be provided as herringbone-shaped grooves or other-shaped grooves except for V-shaped grooves.

Optionally, the fourth magnetic bearing 6201 is further provided with second static-pressure intake throttle holes 6205. One end of each second static-pressure intake throttle hole 6205 is communicated with the fourth gap 6203, and the other end of the second static-pressure intake throttle hole 6205 is connected to an external gas source so as to convey the external gas source into the fourth gap 6203.

In this embodiment of the present disclosure, a static-pressure gas bearing may be formed by providing the second static-pressure intake throttle holes 6205, and thus the slot-type gas-magnetic hybrid radial bearing 6200 can form a slot-type hydrodynamic-hydrostatic gas and magnetic hybrid radial bearing. A flow diameter of each second static-pressure intake throttle hole 6205 may be adjusted according to the actual working conditions such as the demand for air volume.

Optionally, each second static-pressure intake throttle hole 6205 is divided into at least two branches in the fourth magnetic bearing 6201, the at least two branches being communicated into the fourth gap 6203.

In this embodiment of the present disclosure, each second static-pressure intake throttle hole 6205 may pass through the fifth end cover 62017 or the sixth end cover 62018, the fourth magnetic bearing 6201 and the second bearing sleeve 62016 in sequence to communicate the external gas source with the fourth gap 6203. Further, each second static-pressure intake throttle hole 6205 may be divided into two or more branches to be communicated to the fourth gap 6203, so that an air film pressure in the fourth gap 6203 is more uniform. Further, each of the fifth end cover 62017 or the sixth end cover 62018 may be provided with an annular groove. A plurality of second static-pressure intake throttle holes 6205 may be formed in an annular region of the fourth magnetic bearing 6201 corresponding to the annular groove. For example, the second static-pressure intake throttle holes 6205 may be formed in each fourth magnetic core 62011 or in two adjacent fourth magnetic cores 62011. Flow diameters of the second static-pressure intake throttles 6205 and the branches thereof can be adjusted according to the actual working conditions such as the demand for air volume.

Optionally, the slot-type gas-magnetic hybrid radial bearing 6200 further includes a plurality of fourth sensors 6204 disposed at intervals in a circumferential direction of the fourth magnetic bearing 6201. A sensor probe of each of the fourth sensors 6204 is arranged in the fourth gap 6203.

In this embodiment of the present disclosure, by providing the fourth sensors 6204, parameters at the fourth gap 6203, such as an air film pressure at the fourth gap 6203 can be detected in real time. In this way, the fourth magnetic bearing 6201 can actively control the radial bearing 6200 according to the detection result of the fourth sensors 6201, and can achieve a higher control accuracy.

Optionally, each of the fourth sensors 6204 includes a fourth sensor cover 62041 and a fourth sensor probe 62042. A first end of each fourth sensor probe 62042 is connected to the corresponding fourth sensor cover 62041. The fourth sensor cover 62041 is fixed on the fourth magnetic bearing 6201. The fourth magnetic bearing 6201 is provided with a through hole allowing each fourth sensor probe 62042 to pass through. A second end of the fourth sensor probe 62042 passes through the through hole in the fourth magnetic bearing 6201 and extends to the fourth gap 6203. In addition, the second end of the fourth sensor probe 62040 is flush with one side of the fourth magnetic bearing 6201 close to the rotating shaft 100.

In this embodiment of the present disclosure, the fourth sensors 6204 can be more stably arranged on the fourth magnetic bearing 6201 by means of the structural form and the mounting manner of the fourth sensor 6204. Moreover, the second end of each fourth sensor probe 62042 is flush with the side of the fourth magnetic bearing 6201 close to the rotating shaft 100. Therefore, on the one hand, the fourth sensor probes 62042 can be prevented from being touched by the rotating shaft 100, thereby protecting the fourth sensor probes 62042. On the other hand, the air film in the fourth gap 6203 will not be affected, without any disturbance.

In this embodiment of the present disclosure, the number of the fourth sensors 6204 may be the same as the number of the seventh magnetic components. Each of the fourth sensors 6204 may be arranged between every two adjacent seventh magnetic components, or may pass through the seventh magnetic components, which will not be limited in this embodiment of the present disclosure. Each fourth sensor 6204 is preferably arranged in the middle of the fourth magnetic bearing 6201.

Optionally, the plurality of fourth sensors 6204 may be any one or a combination of more of the followings:

a displacement sensor configured to detect a position of the rotating shaft 100;

a pressure sensor configured to detect an air film pressure at the fourth gap 6203;

a speed sensor configured to detect a rotating speed of the rotating shaft 100; and an acceleration sensor configured to detect a rotational acceleration of the rotating shaft 100.

The specific control method when the slot-type gas-magnetic hybrid radial bearing in this embodiment of the present disclosure (in which the seventh magnetic components in the fourth magnetic bearing are electromagnets) participates in the control process of the rotor system will be described below in detail.

This embodiment of the present disclosure further provides a control method of a slot-type gas-magnetic hybrid radial bearing. The control method includes the following steps.

In S631, the fourth magnetic bearing is powered on, and the rotating shaft is controlled to move in the radial direction of the rotating shaft under the magnetic forces of the plurality of seventh magnetic components to push the rotating shaft to a preset radial position.

In S632, after a rotating speed of the rotating shaft is accelerated to a working speed, the fourth magnetic bearing is powered off.

In S633, in the case that the rotor system is stopped, the fourth magnetic bearing is powered on.

In S634, after the rotating speed of the rotating shaft is decelerated to zero, the fourth magnetic bearing is powered off.

In the above process, after the fourth magnetic bearing is powered on, the rotating shaft is lifted up by the fourth magnetic bearing and reaches the preset radial position. The fourth magnetic bearing has a fourth gap with the rotating shaft.

As the rotating shaft rotates, the rotating shaft starts to rotate under the condition of being lubricated by airflow in the fourth gap to prevent wear. The specific process of powering on the fourth magnetic bearing is as follows: an electric current signal of a predetermined value is input to a fourth coil, and the rotating shaft is lifted up by the fourth magnetic bearing and reaches the preset radial position.

As the rotating speed of the rotating shaft is increasing, when the rotating speed of the rotating shaft reaches a working speed, an air film pressure generated by a dynamic-pressure gas bearing in this radial bearing (the fourth gap is formed between the fourth thrust disc and the rotating shaft, that is, the dynamic-pressure gas bearing in the radial bearing is formed) can stabilize the rotating shaft, and in this case, the fourth magnetic bearing can be powered off.

When the rotor system stops, the rotating shaft decelerates. In order to keep the rotating shaft stable during the entire shutdown process of the rotor system, the fourth magnetic bearing is powered on when the rotor system is stopped, and the fourth magnetic bearing can be powered off after the rotating shaft is completely stopped.

An embodiment of the present disclosure further provides another slot-type gas-magnetic hybrid radial bearing control method. The method includes the following steps.

In S641, the fourth magnetic bearing is started, and the rotating shaft is controlled to move in the radial direction of the rotating shaft under the magnetic forces of the plurality of seventh magnetic components to push the rotating shaft to a preset radial position.

In S642, after a rotating speed of the rotating shaft is accelerated to a first preset value, the fourth magnetic bearing is powered off.

In S643, when the rotating speed of the rotating shaft is accelerated to a first-order critical speed or a second-order critical speed, the fourth magnetic bearing is powered on.

Specifically, when the gas flow velocity at the fourth gap between the rotating shaft and the fourth magnetic bearing reaches the first-order critical speed or the second-order critical speed, the fourth magnetic bearing is powered on until the rotating shaft returns to a balanced radial position.

Optionally, the step of, when the rotating speed of the rotating shaft is accelerated to the first-order critical speed or the second-order critical speed, powering on the fourth magnetic bearing, includes:

when the rotating speed of the rotating shaft is accelerated to the first-order critical speed or the second-order critical speed, controlling the fourth magnetic bearing to be powered on at a maximum power; or when the rotating speed of the rotating shaft is accelerated to the first-order critical speed or the second-order critical speed, controlling the fourth magnetic bearing to be powered on in a stroboscopic manner according to a preset frequency.

In S644, after the rotor system smoothly passes the first-order critical speed or the second-order critical speed, the fourth magnetic bearing is powered off.

In S645, during the shutdown process of the rotor system, when the rotor system decelerates to the first-order critical speed or the second-order critical speed, the fourth magnetic bearing is powered on.

Specifically, when the gas flow velocity at the fourth gap between the rotating shaft and the fourth magnetic bearing decelerates to the first-order critical speed or the second-order critical speed, the fourth magnetic bearing is powered on until the rotating shaft returns to a balanced radial position.

Optionally, the step of, when the rotating speed of the rotating shaft decelerates to the first-order critical speed or the second-order critical speed, powering on the fourth magnetic bearing, includes:

when the rotating speed of the rotating shaft is decelerated to the first-order critical speed or the second-order critical speed, controlling the fourth magnetic bearing to be powered on at a maximum power; or when the rotating speed of the rotating shaft is decelerated to the first-order critical speed or the second-order critical speed, controlling the fourth magnetic bearing to be powered on in a stroboscopic manner according to a preset frequency.

In S646, after the rotor system smoothly passes the first-order critical speed or the second-order critical speed, the fourth magnetic bearing is powered off.

In S647, when the rotating speed of the rotating shaft is decelerated to a second preset value, the fourth magnetic bearing is powered on.

In S648, after the rotating speed of the rotating shaft is decelerated to zero, the fourth magnetic bearing is powered off.

In the above process, after the fourth magnetic bearing is powered on, the rotating shaft is lifted up by the fourth magnetic bearing and reaches a preset radial position. The fourth magnetic bearing has a fourth gap with the rotating shaft.

As the rotating shaft rotates, the rotating shaft starts to rotate under the condition of being lubricated by airflow in the fourth gap to prevent wear. The specific process of powering on the fourth magnetic bearing is as follows: an electric current signal of a predetermined value is input to a fourth coil, and the rotating shaft is lifted up by the fourth magnetic bearing and reaches the preset radial position.

As the rotating speed of the rotating shaft is increasing, when the rotating speed of the rotating shaft reaches a first preset value, such as 5% to 30% of the rated rotating speed, an air film pressure generated by a dynamic-pressure gas bearing in the radial bearing (the fourth gap is formed between the fourth magnetic bearing and the rotating shaft, that is, the dynamic-pressure gas bearing in the radial bearing is formed) can stabilize the rotating shaft, and in this case, the fourth magnetic bearing can be powered off.

During the shutdown process of the rotor system, the rotating shaft decelerates. When the rotating speed of the rotating shaft drops to the second preset value, for example, 5% to 30% of the rated rotating speed, the fourth magnetic bearing is powered on, and the fourth magnetic bearing can be powered off until the rotating shaft is completely stopped.

Optionally, the method further includes:

when the fourth gap between the rotating shaft and the fourth magnetic bearing changes, powering on the fourth magnetic bearing, such that the rotating shaft moves in a direction away from a side where the gap becomes smaller under the magnetic forces of the plurality of seventh magnetic components; and after the rotating shaft is in a balanced radial position, powering off the fourth magnetic bearing.

When a load is applied to the rotating shaft such that the rotating shaft gradually descends and approaches the fourth magnetic bearing below, a fourth sensor (the fourth sensor here is preferably a pressure sensor) obtains a signal that an air pressure increases. At this time, the fourth magnetic bearing needs to be involved. The fourth magnetic bearing applies a magnetic force to the rotating shaft to move the rotating shaft to suspend upwards. When the rotating shaft reaches a new balanced position, the fourth magnetic bearing stops working.

When an external impact disturbance occurs, the rotating shaft may quickly approach the fourth magnetic bearing, possibly casing the gap between the rotating shaft and the fourth magnetic bearing to be excessively small instantly. As a result, the local gas velocity at the reduced gap approaches or even reaches the velocity of sound, thereby causing the shock waves to generate an air hammer self-excitation phenomenon. The generation of shock waves will cause disturbances and chaos in the local gas flow. When the velocity of a fluid changes from a sonic speed to a subsonic speed, the pressure of the fluid drops significantly in steps. In this case, it is necessary to control the seventh magnetic components of the fourth magnetic bearing to be powered on in turn at a preset frequency to provide a damping effect on the disturbance, thereby effectively suppressing the external disturbance. When the rotating shaft returns to a new balanced radial position, the fourth magnetic bearing stops working.

It should be noted that, in this embodiment of the present disclosure, in the case that an electromagnetic bearing (the seventh magnetic components in the fourth magnetic bearing are electromagnets, that is, the electromagnetic bearing is formed) and a static-pressure gas bearing (the second static-pressure intake throttle holes are formed in the fourth magnetic bearing, that is, the static-pressure gas bearing is formed) are provided at the same time, the electromagnetic bearing and the static-pressure gas bearing can back up each other. In the event that one of them breaks down, or has a fault, or cannot meet the powering-on conditions, the other can serve as a backup bearing to play the same role. For example, when it is detected that the electromagnetic bearing breaks down, the external gas source is controlled to be opened to perform corresponding actions instead of the electromagnetic bearing, thereby improving the safety and reliability of the bearings.

In this embodiment of the present disclosure, the step of "powering on the static-pressure bearing in the radial bearing to move the rotating shaft to the preset axial position" in the case that the electromagnetic bearing and the static-pressure gas bearing are provided at the same time may include the following implementations manners:

powering on the fourth magnetic bearing; and/or starting an external gas source, and conveying a gas to the fourth gap via the second static intake throttle holes; and controlling the rotating shaft to move in the radial direction of the rotating shaft under the magnetic forces of the plurality of seventh magnetic components and/or under the pushing force of the gas to move the rotating shaft to the preset radial position.

In the above process, by using the advantage that the fourth magnetic bearing is conveniently controlled in real time, the factors causing excessive offset of the rotating shaft caused by the unbalanced mass of the rotating shaft or the vortex of the rotating shaft are balanced actively, such that the rotating shaft is fixed within an extremely small range in the axial direction of the rotating shaft. In addition, during the acceleration process of the rotating shaft, the position where the shock waves are generated (i.e., the linear velocity exceeds the velocity of sound) can be accurately positioned. By controlling the intensity and direction of the electric current of the fourth magnetic bearing, the fourth magnetic bearing generates opposite forces to balance the shock wave effect. After the shock waves are stable, the control strategy for the fourth magnetic bearing is adjusted again to fix the rotating shaft within a certain extremely small range in a most energy-saving manner.

In summary, this embodiment of the present disclosure has the following beneficial effects.

1. The electromagnetic bearing and the gas bearing cooperate with each other to improve the dynamic performance and stability of the bearings under high-speed running conditions, and the bearings have a strong anti-disturbance capability, thereby further improving the bearing capability of the bearings. Meanwhile, the electromagnetic bearing and the gas bearing adopt a nested structure, thereby simplifying the structures, achieving a high degree of integration, being easy to machine, manufacture and operate, and improving the overall performance of the bearings. When the rotor system is started or stopped, the thrust disc of the bearing and the stator can be rotated in the first gap between the bearings by using the electromagnetic bearing, thereby improving the low-speed performance of the bearings, prolonging the service life of the bearings, and improving the safety and reliability of the bearings and the entire system.

2. Compared with the conventional hydrodynamic-hydrostatic gas hybrid thrust bearing in which the static-pressure gas bearing and the dynamic-pressure gas bearing are combined, the slot-type gas-magnetic hybrid radial bearing in this embodiment of the present disclosure has the advantage of fast response speed.

3. The static-pressure gas bearing is provided additionally to form the slot-type hydrodynamic-hydrostatic gas and magnetic hybrid thrust bearing. In the case that the electromagnetic bearing and the static-pressure gas bearing are provided at the same time, the bearing capability of the bearings is further increased. The electromagnetic bearing and the static-pressure gas bearing can back up each other. In the event that one of them breaks down, or has a fault, or cannot meet the powering-on conditions, the other can serve as a backup bearing to play the same role. For example, when it is detected that the electromagnetic bearing breaks down, the static-pressure gas bearing is controlled by the control system to be opened to perform corresponding actions instead of the electromagnetic bearing, thereby improving the safety and reliability of the bearings.

Embodiment 12

In a rotor system, a thrust bearing and a radial bearing adjacent to the thrust bearing can be integrated to form an integrated bearing. Corresponding to the rotor system shown in FIGS. 1 to 18, respectively, FIGS. 47 to 62 show schematic structural diagrams in which a thrust bearing and a radial bearing adjacent to the thrust bearing are integrated into an integrated bearing 1000.

FIGS. 63 to 70 are schematic structural diagrams of the integrated bearing provided by this embodiment of the present disclosure.

As shown in FIGS. 63 to 70, the integrated bearing 1000 includes: a third bearing shell 1001, a radial sub-bearing 1002, and a thrust sub-bearing 1003. The third bearing shell 1001 is a hollow rotating body, and is provided with a first receiving cavity and a second receiving cavity. The radial sub-bearing 1002 is arranged in the first receiving cavity and disposed on a rotating shaft 100 in a penetrating manner, and has a fifth gap 1004 with the rotating shaft 100. The thrust sub-bearing 1003 is arranged in the second receiving cavity. The thrust sub-bearing 1003 includes a third thrust disc 10031, and a fifth stator 10032 and a sixth stator 10033 respectively arranged on both sides of the third thrust disc 10031. The third thrust disc 10031 is fixedly connected to the rotating shaft 100. The fifth stator 10032 and the sixth stator 10033 are both arranged on the rotating shaft 100 in a penetrating manner. Each of the fifth stator 10032 and the sixth stator 10033 has a sixth gap 1005 with the third thrust disc 10031.

In this embodiment of the present disclosure, the radial sub-bearing 1002 and the thrust sub-bearing 1003 are integrated in a bearing shell, which is easy to machine and mount, has the characteristics of simplified structure and high degree of integration, and can effectively ensure the coaxiality requirements of the radial sub-bearing 1002 and the thrust sub-bearing 1003 during machining and mounting.

In addition, the fifth gap 1004 is formed in the radial sub-bearing 1002, and the sixth gap 1005 is formed in the thrust sub-bearing 1003, so that the bearings of the present disclosure are non-contact bearings, which can meet the requirement of high-speed rotation of the rotor.

The third bearing housing 1001 may be made of a non-magnetic material, preferably a hard aluminum material.

The fifth stator 10032 and the third bearing shell 1001 may be integrally formed, and the sixth stator 10033 and the third bearing shell 1001 may be detachably connected.

When the rotor system in this embodiment of the present disclosure is applied to a gas turbine or a gas-turbine-combined generator set, the third bearing shell 1001 may be connected to a housing of the gas turbine through a connecting member.

In this embodiment of the present disclosure, each of the radial sub-bearing 1002 and the thrust sub-bearing 1003 may include a magnetic bearing. The structural form of the magnetic bearing in the radial sub-bearing 1002 is as follows: the radial sub-bearing 1002 includes a fifth magnetic bearing 10021 arranged on the rotating shaft 100 in a sleeving manner; the fifth magnetic bearing 10021 is detachably mounted in the first receiving cavity; and a plurality of eighth magnetic components is arranged on the fifth magnetic bearing 10021 in a circumferential direction. The rotating shaft 100 is movable in the radial direction of the rotating shaft 100 under magnetic forces of the plurality of eighth magnetic components.

Further, the fifth magnetic bearing 10021 includes a fifth magnetic bearing pedestal and a third bearing sleeve 10022. The fifth magnetic bearing pedestal is arranged on the rotating shaft 100 in a sleeving manner, and provided with a plurality of fifth receiving grooves in a circumferential direction. The plurality of eighth magnetic components is formed in the plurality of fifth receiving grooves, and the magnetic poles of the plurality of eighth magnetic members face the rotating shaft 100. The third bearing sleeve 10022 is arranged between the fifth magnetic bearing pedestal and the rotating shaft 100 in a sleeving manner and cooperates with the fifth magnetic bearing pedestal to fix the plurality of eighth magnetic components on the fifth magnetic bearing pedestal.

Other specific implementation manners of the magnetic bearing in the radial sub-bearing 1002 described above may refer to the related description in Embodiment 10, and can achieve the same beneficial effects. To avoid repetition, details will not be described herein.

In this embodiment of the present disclosure, the integrated bearing 1000 may further include a seventh end cover 1006. The seventh end cover 1006 is arranged at an end of the third bearing shell 1001 close to the first receiving cavity, and props against the fifth magnetic bearing pedestal for fixing the radial sub-bearing 1002 inside the first receiving cavity.

In this embodiment of the present disclosure, each of the radial sub-bearing 1002 and the thrust sub-bearing 1003 may include a magnetic bearing. The structural form of the magnetic bearing in the thrust sub-bearing 1003 is as follows.

Each of the fifth stator 10032 and the sixth stator 10033 includes a sixth magnetic bearing 10034 on which a plurality of ninth magnetic components is arranged in a circumferential direction.

A tenth magnetic component is arranged on the third thrust disc 10031, and the third thrust disc 10031 is movable in the axial direction of the rotating shaft 100 under the magnetic forces between the plurality of ninth magnetic components and the tenth magnetic component.

Further, the sixth magnetic bearing 10034 includes a sixth magnetic bearing pedestal and a second pressure ring. The sixth magnetic bearing pedestal is disposed opposite to the third thrust disc 10031 and is provided with a plurality of sixth receiving grooves in a circumferential direction. A plurality of ninth magnetic components is arranged in the plurality of sixth receiving grooves, and magnetic poles of the plurality of ninth magnetic components face a side where the third thrust disc 10031 is located. The second pressure ring is arranged on a side of the sixth magnetic bearing pedestal close to the third thrust disc 10031, and cooperates with the sixth magnetic bearing pedestal to fix the plurality of ninth magnetic components on the sixth magnetic bearing pedestal.

Other specific implementation manners of the magnetic bearing in the thrust sub-bearing 1003 described above may refer to the related description in Embodiment 10, and can achieve the same beneficial effects. To avoid repetition, details will not be described herein.

In this embodiment of the present disclosure, by providing the magnetic bearing, especially an electromagnetic bearing (the eighth magnetic components in the fifth magnetic bearing 10021 are electromagnets, and the ninth magnetic component in the sixth magnetic bearing 10034 is the electromagnet) in the integrated bearing 1000, when the rotor system is started or stopped, the thrust disc and the stators in the integrated bearing 100, and the rotating shaft and the bearing sleeve can rotate within the gap by using the electromagnetic bearing, thereby improving the low-speed performance of the integrated bearing 1000, prolonging the service life of the integrated bearing 1000 and improving the safety and reliability of the integrated bearing 1000 and the entire rotor system.

In this embodiment of the present disclosure, the fifth stator 10032 and the third bearing shell 1001 may be integrally formed, and the sixth stator 10033 and the third bearing shell 1001 may be detachably connected.

In this embodiment of the present disclosure, each of the radial sub-bearing 1002 and the thrust sub-bearing 1003 may be provided with dynamic pressure generating grooves. The structural form of the dynamic pressure generating grooves in the radial sub-bearing 1002 is as follows.

Fourth dynamic pressure generating grooves 10023 are formed in a sidewall of the radial sub-bearing 1002 facing the rotating shaft 100, or a circumferential surface of the rotating shaft 100 facing the radial sub-bearing 1002.

Further, the fourth dynamic pressure generating grooves 10023 are arranged in a matrix.

Further, the fourth dynamic pressure generating grooves 6202 are V-shaped grooves provided continuously or at intervals.

Other specific implementation manners of the dynamic pressure generating grooves in the radial sub-bearing 1002 described above may refer to the related description in Embodiment 11, and can achieve the same beneficial effects. To avoid repetition, details will not be repeated herein.

In this embodiment of the present disclosure, each of the radial sub-bearing 1002 and the thrust sub-bearing 1003 may be provided with dynamic pressure generating grooves. The structural form of the dynamic pressure generating grooves in the thrust sub-bearing 1003 is as follows.

Fifth dynamic pressure generating grooves 10035 are formed in an end surface of the third thrust disc 10031 facing the fifth stator 10032 and the sixth stator 10033, or end surfaces of the fifth stator 10032 and the sixth stator 10033 facing the third thrust disc 10031.

Further, the fifth dynamic pressure generating grooves 10035 are arranged radially or concentrically.

Further, the fifth dynamic pressure generating grooves 10035 include a first spiral groove and a second spiral groove. The first spiral groove surrounds the second spiral groove. The first spiral groove and the second spiral groove have opposite spiral directions. One end of the first spiral groove close to the second spiral groove is connected to or disconnected from one end of the second spiral groove close to the first spiral groove.

Other specific implementation manners of the dynamic pressure generating groove in the thrust sub-bearing 1003 described above may refer to the related description in Embodiment 10, and can achieve the same beneficial effects. To avoid repetition, details will not be described herein.

In this embodiment of the present disclosure, the integrated bearing 1000 includes the dynamic-pressure gas bearing by providing the dynamic pressure generating grooves in the integrated bearing 1000. In the case that an electromagnetic bearing and the dynamic-pressure gas bearing are provided at the same time, the dynamic performance and stability of the integrated bearing 1000 under high-speed running conditions are improved, and the anti-disturbance capability is strong, thereby improving the bearing capability of the bearings. Meanwhile, the electromagnetic bearing and the dynamic-pressure gas bearing adopt a nested parallel structure, so that the structure is simplified, the degree of integration is high, machining, manufacturing and operating are easy, and the comprehensive performance of the integrated bearing 1000 is improved.

In this embodiment of the present disclosure, the integrated bearing 1000 may further be provided with static-pressure intake throttle holes. The structural form of the static-pressure intake throttle holes is as follows.

The third bearing shell 1001 is further provided with third static-pressure intake throttle holes 1007, wherein one end of each third static-pressure intake throttle hole 1007 is connected to an external gas source, and the other end of the third static-pressure intake throttle hole 1007 is communicated with the fifth gap 1004 via the radial sub-bearing 1002, and/or communicated with the sixth gap 1005 via the fifth stator 10032 and the sixth stator 10033 so as to convey the external gas source to the fifth gap 1004 and/or the sixth gap 1005.

In this embodiment of the present disclosure, the integrated bearing 1000 may further be provided with the static-pressure intake throttle holes, so that the integrated bearing 1000 includes a static-pressure gas bearing. In the case that the electromagnetic bearing and the static-pressure gas bearing are provided at the same time, the bearing capability of the integrated bearing 1000 is further increased. Moreover, the electromagnetic bearing and the static-pressure gas bearing can back up. In the event that one of them breaks down, or has a fault, or cannot meet the powering-on conditions, the other can serve as a backup bearing to play the same role. For example, when it is detected that the electromagnetic bearing breaks down, the static-pressure gas bearing is controlled to be powered on to perform corresponding actions instead of the electromagnetic bearing, thereby improving the safety and reliability of the integrated bearing 1000.

Other specific implementations of the static-pressure intake throttle holes in the integrated bearing 1000 described above may refer to the related description in Embodiment 10 and Embodiment 11, and can achieve the same beneficial effects. To avoid repetition, details will not be repeated herein.

In this embodiment of the present disclosure, each of the radial sub-bearing 1002 and the thrust sub-bearing 1003 may be provided with a sensor. The structural forms of the sensors are as follows respectively.

Fifth sensors (not shown in drawings) are arranged on the radial sub-bearing 1002, and a sensor probe of each fifth sensor is arranged in the fifth gap 1004.

In this embodiment of the present disclosure, parameters at the fifth gap 1004, such as an air film pressure at the fifth gap 1004, can be detected in real time. In this way, the fifth magnetic bearing 10021 can actively control the radial sub-bearing 102 according to the detection result of the fifth sensor, and can achieve a higher control accuracy.

Optionally, each of the fifth sensors includes a first sensor cover and a fifth sensor probe. A first end of each fifth sensor probe is connected to the corresponding fifth sensor cover. The fifth sensor cover is fixed on the fifth magnetic bearing 10021. The fifth magnetic bearing 10021 is provided with a through hole allowing each fifth sensor probe to pass through. A second end of the fifth sensor probe passes through the through hole in the fifth magnetic bearing 10021 and extends to the fifth gap 1004. In addition, the second end of the fifth sensor probe is flush with the side of the fifth magnetic bearing 10021 close to the rotating shaft 100.

In this way, the fifth sensors 5107 can be more stably arranged on the fifth magnetic bearing 10021. Moreover, the second end of each sensor probe is flush with one side of the fifth magnetic bearing 10021 close to the rotating shaft 100. Therefore, on the one hand, the sensor probes can be prevented from being touched by the rotating shaft 100, thereby protecting the sensor probes. On the other hand, the air film in the fifth gap 1004 will not be affected, without any disturbance.

Sixth sensors (not shown in drawings) are arranged on the thrust sub-bearing 1003, wherein a sensor probe of each sixth sensor is arranged in the sixth gap 1005.

In this way, parameters at the sixth gap 1005, such as an air film pressure at the sixth gap 1005, can be detected in real time. In this way, the sixth magnetic bearing 10034 can actively control the thrust sub-bearing 103 according to the detection result of the sixth sensors, and can achieve a higher control accuracy.

Optionally, each sixth sensor includes a sixth sensor cover and a sixth sensor probe. A first end of the sixth sensor probe is connected to the sixth sensor cover. The sixth sensor cover is fixed on the sixth magnetic bearing 10034. The sixth magnetic bearing 10034 is provided with a through hole allowing each sixth sensor probe to pass through. A second end of the sixth sensor probe passes through the through hole in the sixth magnetic bearing 10034 and extends to the sixth gap 1005. In addition, the second end of the sixth sensor probe is flush with one side of the sixth magnetic bearing 10034 close to the third thrust disc 10031.

In this way, the sixth sensors can be more stably arranged on the sixth magnetic bearing 10034. Moreover, the second end of the sixth sensor probe is flush with the side of the sixth magnetic bearing 10034 close to the third thrust disc 10031. Therefore, on the one hand, the sixth sensor probes can be prevented from being touched by the third thrust disc 10031, thereby protecting the sixth sensor probes. On the other hand, the air film in the sixth gap 1005 will not be affected, without any disturbance.

Other specific implementation manners of the sensors in the radial bearing and the thrust bearing described above may refer to the related description in Embodiment 11 and Embodiment 10, and can achieve the same beneficial effects. To avoid repetition, details will not be described herein.

It should be noted that the related technical solutions in Embodiments 9 to 11 are also applicable to the embodiments of the present disclosure and can achieve the same beneficial effects. To avoid repetition, details will not be described herein.

The specific control method when the integrated bearing in this embodiment of the present disclosure (in which the eighth magnetic components in the fifth magnetic bearing are electromagnets, and the ninth magnetic component in the sixth magnetic bearing is the electromagnet) participates in the control process of the rotor system may be refer to the related descriptions in Embodiment 11 and Embodiment 10, and can achieve the same beneficial effect. To avoid repetition, details will not be repeated herein.

The above description is only the specific embodiments of the present disclosure, but the protection scope of the present disclosure is not limited thereto. Any changes or replacements easily conceivable by a person skilled in the art within the technical scope of the present disclosure should be included within the protection scope of the present disclosure. Therefore, the protection scope of the present disclosure should be subjected to the protection scope of the claims.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A rotor system, comprising:
a rotating shaft (100), a shaft body of the rotating shaft being of an integrated structure and the rotating shaft being horizontally arranged;
a motor (200), an air compressor (300) and a turbine (400) which are each arranged on the rotating shaft in sequence; and
at least two radial bearings (600, 700) and a thrust bearing (500) which are each arranged on the rotating shaft (100) and are all non-contact bearings, wherein
the at least two radial bearings (600, 700) comprise a first radial bearing (600) and a second radial bearing (700), the first radial bearing (600) being arranged on one side of the motor (200) away from the air compressor (300), and the second radial bearing (700) being arranged between the air compressor (300) and the turbine (400), wherein
the thrust bearing (500) is arranged between the first radial bearing (600) and the motor (200); or
the thrust bearing (500) is arranged on one side of the first radial bearing (600) away from the motor (200); or
the thrust bearing (500) is arranged between the motor (200) and the air compressor (300);
wherein
the gas-magnetic hybrid thrust bearing is a foil-type gas-magnetic hybrid thrust bearing (5100) comprising:
a first thrust disc (5101) fixedly connected to the rotating shaft (100); and
a first stator (5102) and a second stator (5103) which are disposed on the rotating shaft (100) and are arranged on two opposite sides of the first thrust disc (5101) respectively, wherein
each of the first stator (5102) and the second stator (5103) comprises a first magnetic bearing (5104) and a first foil bearing (5105); a plurality of first magnetic components is arranged on each respective first magnetic bearing (5104) in a circumferential direction; each respective first foil bearing (5105) is provided with a second magnetic component capable of interacting with the respective plurality of first magnetic components and generating a plurality of magnetic forces with the respective plurality of first magnetic components, wherein
each respective first foil bearing (5105) is arranged between the corresponding first magnetic bearing (5104) and the first thrust disc (5101) and has a first gap (5106) with the first thrust disc (5101), and each respective first foil bearing (5105) is movable in an axial direction of the rotating shaft under the respective magnetic forces between the respective first magnetic components and the respective second magnetic component.

2. The rotor system according to claim 1, wherein the at least two radial bearings further comprise a third radial bearing (800) arranged between the motor (200) and the air compressor (300).

3. The rotor system according to claim 2, wherein the at least two radial bearings further comprise a fourth radial bearing (900) arranged on one side of the turbine (400) away from the air compressor (300), wherein
the thrust bearing (500) is arranged between the first radial bearing (600) and the motor (200); or
the thrust bearing (500) is arranged on the one side of the first radial bearing (600) away from the motor (200); or
the thrust bearing (500) is arranged between the motor (200) and the air compressor (300); or
the thrust bearing (500) is arranged between the air compressor (300) and the second radial bearing (700).

4. The rotor system according to claim 1, wherein the at least two radial bearings further comprise a fourth radial bearing (900) arranged on one side of the turbine (400) away from the air compressor (300), wherein
the thrust bearing (500) is arranged between the first radial bearing (600) and the motor (200); or
the thrust bearing (500) is arranged on the one side of the first radial bearing (600) away from the motor (200); or
the thrust bearing (500) is arranged between the motor (200) and the air compressor (300); or
the thrust bearing (500) is arranged between the air compressor (300) and the second radial bearing (700).

5. The rotor system according to claim 4, wherein the fourth radial bearing (900) is a hydrodynamic-hydrostatic gas hybrid radial bearing.

6. The rotor system according to claim 1, wherein a heat insulation layer is arranged on one side of the turbine (400) close to the second radial bearing (700).

7. The rotor system according to claim 1, wherein the motor (200) is a dynamic-pressure bearing motor, and a portion of the rotating shaft corresponding to a bearing of the motor is provided with a first dynamic pressure generating groove (201).

8. The rotor system according to claim 1, wherein the motor (200) is a starter-generator integrated motor.

9. The rotor system according to claim 1, wherein
the rotor system further comprises a locking device (120) configured to lock the rotating shaft when the rotating shaft is in a static state.

10. The rotor system according to claim 1, wherein
a portion of the rotating shaft where each bearing is mounted is coated with an anti-wear coating (101).

11. A rotor system control method applied to the rotor system according to claim 1, the method comprising the following steps:
powering on a static-pressure bearing in each of the at least two radial bearings (600,700) and a static-pressure bearing in the thrust bearing to enable the rotating shaft to move to a preset radial position, such that the thrust disc of the thrust bearing moves to a preset axial position (S101);
after a rotating speed of the rotating shaft is accelerated to a working speed, powering off the static-pressure bearing in each of the at least two radial bearings (600,700) and the static-pressure bearing in the thrust bearing (S102);
in a case that the rotor system is stopped, powering on the static-pressure bearing in each of the at least two radial bearings (600,700) and the static-pressure bearing in the thrust bearing (S103); and
after the rotating speed of the rotating shaft is reduced to zero, powering off the static-pressure bearing in each of the at least two radial bearings (600,700) and the static-pressure bearing in the thrust bearing (S104), wherein
powering on each of the static-pressure bearings comprises: powering on a magnetic bearing in each of the corresponding static-pressure bearings, and/or conveying a gas to a static-pressure intake throttle hole in each of the corresponding static-pressure bearings; and
powering off each of the static-pressure bearings comprises: powering off the magnetic bearing in each of the corresponding static-pressure bearings, and/or stopping conveying the gas to the static-pressure intake throttle hole in each of the corresponding static-pressure bearings.

12. A gas turbine generator set, comprising an intake channel (320), a combustion chamber (330), and the rotor system according to claim 1, wherein the intake channel (320) is communicated with an air inlet of the air compressor (300), an air outlet of the air compressor (300) is communicated with an air inlet of the combustion chamber (330), and an air outlet of the combustion chamber (330) is communicated with an air inlet of the turbine (400).

13. A gas turbine generator set control method applied to the gas turbine generator set according to claim 12, the method comprising the following steps:
powering on a static-pressure bearing in in each of the at least two radial bearings (600,700) and a static-pressure bearing in the thrust bearing to enable the rotating shaft to move to a preset radial position, such that the thrust disc of the thrust bearing moves to a preset axial position (S11);
starting the gas turbine generator set, wherein air is compressed by the air compressor and enters the combustion chamber to be mixed with a fuel in the combustion chamber and combusted, and high-temperature and high-pressure gas discharged from the combustion chamber impacts a turbine wheel of the turbine to rotate the turbine wheel, such that the turbine wheel drives the motor to rotate through the rotating shaft to generate electricity (S12);
after a rotating speed of the rotating shaft is accelerated to a working speed, powering off the static-pressure bearing in each of the at least two radial bearings (600,700) and the static-pressure bearing in the thrust bearing (S13);
in a case of a shutdown of the gas turbine generator set, powering on the static-pressure bearing in each of the at least two radial bearings (600,700) and the static-pressure bearing in the thrust bearing (S14); and
after the rotating speed of the rotating shaft is reduced to zero, powering off the static-pressure bearing in each of the at least two radial bearings (600,700) and the static-pressure bearing in the thrust bearing (S15), wherein
powering on each of the static-pressure bearings comprises: powering on a magnetic bearing in each of the corresponding static pressure bearings, and/or conveying a gas to a static-pressure intake throttle hole in each of the corresponding static-pressure bearings; and
powering off each of the static-pressure bearings comprises: powering off the magnetic bearing in each of the corresponding static-pressure bearings, and/or stopping conveying the gas to the static-pressure intake throttle hole in each of the corresponding static-pressure bearings.

14. The gas turbine generator set according to claim 12, wherein
the at least two radial bearings further comprise a third radial bearing (800) arranged between the motor (200) and the air compressor (300).

15. The gas turbine generator set according to claim 12, wherein
the at least two radial bearings further comprise a fourth radial bearing (900) arranged on one side of the turbine (400) away from the air compressor (300), wherein
the thrust bearing (500) is arranged between the first radial bearing (600) and the motor (200); or
the thrust bearing (500) is arranged on the one side of the first radial bearing (600) away from the motor (200); or
the thrust bearing (500) is arranged between the motor (200) and the air compressor (300); or
the thrust bearing (500) is arranged between the air compressor (300) and the second radial bearing (700).

16. The gas turbine generator set according to claim 15, wherein
the fourth radial bearing (900) is a hydrodynamic-hydrostatic gas hybrid radial bearing.

17. The gas turbine generator set according to claim 12, wherein
a heat insulation layer is arranged on one side of the turbine (400) close to the second radial bearing (700).

18. The gas turbine generator set according to claim 12, wherein the motor (200) is a dynamic-pressure bearing motor, and a portion of the rotating shaft corresponding to a bearing of the motor is provided with a first dynamic pressure generating groove (201).

19. The gas turbine generator set according to claim 12, wherein the motor (200) is a starter-generator integrated motor.

20. The gas turbine generator set according to claim 12, wherein
the rotor system further comprises a locking device (120) configured to lock the rotating shaft when the rotating shaft is in a static state.

\* \* \* \* \*